United States Patent
Jhu et al.

(10) Patent No.: US 12,120,355 B2
(45) Date of Patent: Oct. 15, 2024

(54) METHODS AND DEVICES FOR HIGH-LEVEL SYNTAX IN VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Yi-Wen Chen, San Diego, CA (US); Xiaoyu Xiu, San Diego, CA (US); Tsung-Chuan Ma, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 107 days.

(21) Appl. No.: 17/959,021

(22) Filed: Oct. 3, 2022

(65) Prior Publication Data
US 2023/0103542 A1    Apr. 6, 2023

Related U.S. Application Data

(63) Continuation of application No. PCT/US2021/025635, filed on Apr. 2, 2021.
(Continued)

(51) Int. Cl.
*H04N 19/44* (2014.01)
*H04N 19/159* (2014.01)
(Continued)

(52) U.S. Cl.
CPC ........... *H04N 19/70* (2014.11); *H04N 19/159* (2014.11); *H04N 19/172* (2014.11); *H04N 19/176* (2014.11); *H04N 19/44* (2014.11)

(58) Field of Classification Search
CPC ....... H04N 19/70; H04N 19/159; H04N 19/44
(Continued)

(56) References Cited

U.S. PATENT DOCUMENTS

2012/0269271 A1* 10/2012 Chen .................... H04N 19/597
                                                       375/E7.243
2017/0134732 A1   5/2017 Chen
(Continued)

FOREIGN PATENT DOCUMENTS

| WO | 2019001785 A1 | 1/2019 |
|---|---|---|
| WO | 2020058567 A1 | 3/2020 |
| WO | 2020060843 A1 | 3/2020 |

OTHER PUBLICATIONS

Benjamin Bross et al., "Versatile Video Coding (Draft 8)", Joint Video Experts Team (JVET) of ITU-T SG 16 WP 3 and 1S0/IEC JTC 1/SC 29/WG 11, NET-Q2001-vE, 17th Meeting: Brussels, BE, Jan. 7-17, 2020, (510p).

Benjamin Bross et al., "Versatile Video Coding (Draft 6)", Joint Video Experts Team (JVET) of ITU-T SG 16 WP 3 and 1S0/IEC JTC 1/SC 29/WG 11, NET-O2001-vE, 15th Meeting: Gothenburg, SE, Jul. 3-12, 2019, (170p).
(Continued)

*Primary Examiner* — Jeffery A Williams
(74) *Attorney, Agent, or Firm* — Arch & Lake LLP

(57) ABSTRACT

Methods, devices, and storage mediums are provided for decoding video signals. A decoder receives at least one versatile video coding (VVC) syntax flag. The decoder receives, in response to a syntax element indicating that inter prediction is allowed, inter related syntax elements. The decoder obtains a first reference picture $I^{(0)}$ and a second reference picture $I^{(1)}$ associated with a video block in a bitstream. The decoder obtains first prediction samples $I^{(0)}(i,j)$ of the video block from a reference block in the first reference picture $I^{(0)}$. The decoder obtains second prediction samples $I^{(1)}(i,j)$ of the video block from a reference block in the second reference picture $I^{(1)}$. The decoder obtains bi-prediction samples based on the at least one VVC syntax
(Continued)

flag, the inter related syntax elements, the first prediction samples $I^{(0)}(i,j)$, and the second prediction samples $I^{(1)}(i,j)$.

12 Claims, 6 Drawing Sheets

Related U.S. Application Data

(60) Provisional application No. 63/005,203, filed on Apr. 3, 2020, provisional application No. 63/005,309, filed on Apr. 4, 2020.

(51) Int. Cl.
  *H04N 19/172* (2014.01)
  *H04N 19/176* (2014.01)
  *H04N 19/70* (2014.01)
(58) Field of Classification Search
  USPC .................................................. 375/240.16
  See application file for complete search history.

(56) References Cited

U.S. PATENT DOCUMENTS

2019/0166381 A1    5/2019   Sugio et al.
2019/0327488 A1   10/2019   Boon et al.

OTHER PUBLICATIONS

International Search Report of International Application No. PCT/US2021/025635 dated Jul. 19, 2021, (3p).
Bross, Benjamin et al., "Versatile Video Coding (Draft 8)", Joint Video Experts Team (JVET) of ITU-T SG 16 WP 3 and ISO/IEC JTC 1/SC 29/WG 11, JVET-Q2001-vE, 17th Meeting: Brussels, Jan. 7-17, 2020, (512p).
Hong-Jheng Jhu, et al., "AHG9: On syntax signaling order in SPS," Joint Video Experts Team (JVET) of ITU-T SG 16 WP 3 and ISO/IEC JTC 1/SC 29/WG 11, 18th Meeting: by teleconference, Apr. 15-24, 2020, (13p).
Hong-Jheng Jhu, et al., "AHG9: On SPS inter slice related syntaxes," Joint Video Experts Team (JVET) of ITU-T SG 16 WP 3 and ISO/IEC JTC 1/SC 29/WG 11, 18th Meeting: by teleconference, Apr. 15-24, 2020, (14p).

* cited by examiner

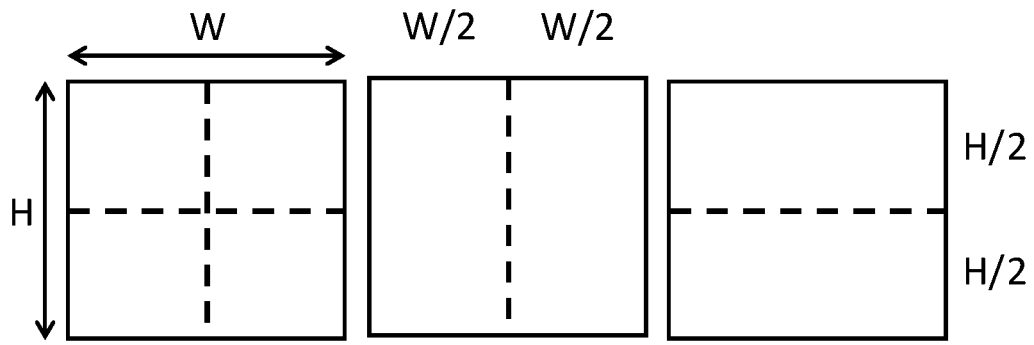
FIG. 3A  FIG. 3B  FIG. 3C
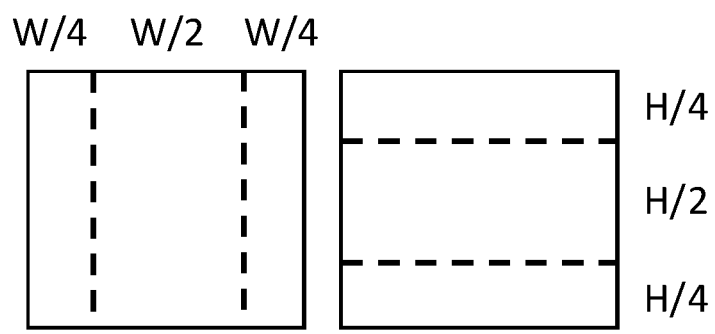
FIG. 3D  FIG. 3E
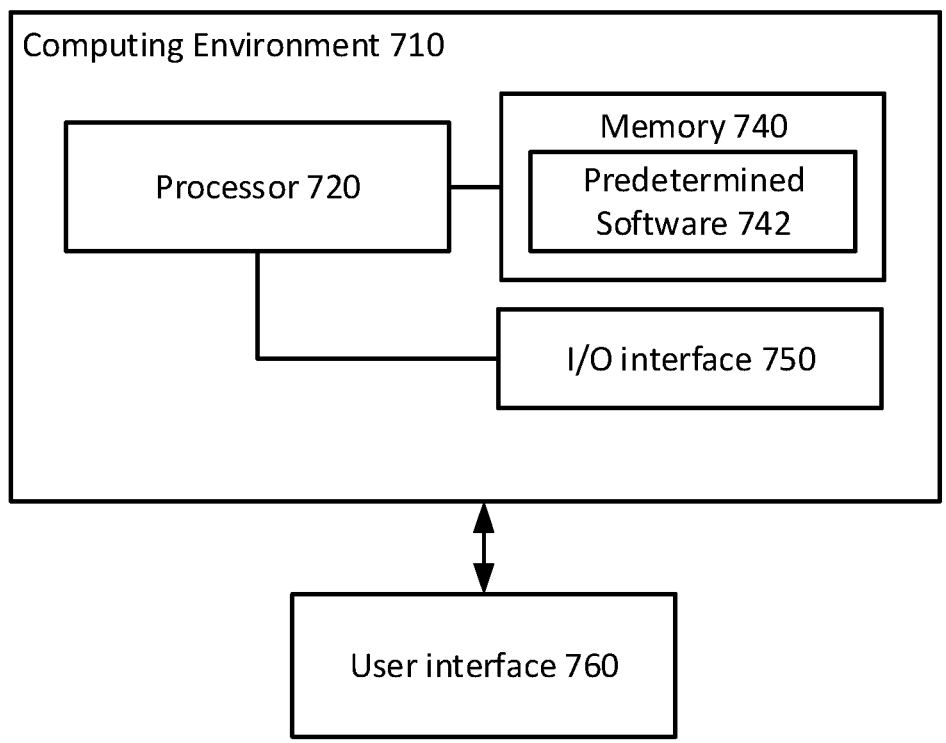
FIG. 7

METHODS AND DEVICES FOR HIGH-LEVEL SYNTAX IN VIDEO CODING

CROSS-REFERENCE TO RELATED APPLICATIONS

This application is a continuation of International Application No. PCT/CN2021/025635, filed on Apr. 2, 2021, which is based upon and claims priority to Provisional Applications No. 63/005,203 filed on Apr. 3, 2020, and 63/005,309 filed on Apr. 4, 2020, the entire contents thereof are incorporated herein by reference in their entireties for all purposes.

TECHNICAL FIELD

This disclosure is related to video coding and compression. More specifically, this application relates to high-level syntax in video bitstream applicable to one or more video coding standards.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods and apparatus for lossless coding in video coding.

According to a first aspect of the present disclosure, a method for decoding a video signal is provided. The method may include a decoder receiving at least one versatile video coding (VVC) syntax flag. The at least one VVC syntax flag may include a first VVC syntax flag that may indicate whether inter prediction is allowed in a corresponding coding level. The decoder may also receive, in response to a syntax element indicating that inter prediction is allowed, inter related syntax elements. The decoder may also obtain a first reference picture) $I^{(0)}$ and a second reference picture $I^{(1)}$ associated with a video block in a bitstream. The first reference picture $I^{(0)}$ may be before a current picture and the second reference picture $I^{(1)}$ may be after the current picture in display order. The decoder may also obtain first prediction samples $I^{(0)}(i,j)$ of the video block from a reference block in the first reference picture $I^{(0)}$. The i and j may represent a coordinate of one sample with the current picture. The decoder may also obtain second prediction samples $I^{(1)}(i,j)$ of the video block from a reference block in the second reference picture $I^{(1)}$ The decoder may also obtain bi-prediction samples based on the at least one VVC syntax flag, the inter related syntax elements, the first prediction samples $I^{(0)}(i,j)$, and the second prediction samples $I^{(1)}(i,j)$.

According to a second aspect of the present disclosure, a method for decoding a video signal is provided. The method may include a decoder receiving arranged partition constraint syntax elements in sequence parameter set (SPS) level. The arranged partition constraint syntax elements are arranged so that inter prediction related syntax elements are grouped in VVC syntax at a coding level. The decoder may also obtain a first reference picture) $I^{(0)}$ and a second reference picture $I^{(1)}$ associated with a video block in a bitstream. The first reference picture $I^{(0)}$ may be before a current picture and the second reference picture $I^{(1)}$ may be after the current picture in display order. The decoder may also obtain first prediction samples $I^{(0)}(i,j)$ of the video block from a reference block in the first reference picture $I^{(0)}$. The i and j may represent a coordinate of one sample with the current picture. The decoder may also obtain second prediction samples $I^{(1)}(i,j)$ of the video block from a reference block in the second reference picture $I^{(1)}$. The decoder may also obtain bi-prediction samples based on the arranged partition constraint syntax elements, the first prediction samples $I^{(0)}(i,j)$, and the second prediction samples $I^{(1)}(i,j)$.

According to a third aspect of the present disclosure, a computing device is provided. The computing device may include one or more processors, a non-transitory computer-readable memory storing instructions executable by the one or more processors. The one or more processors may be configured to receive at least one VVC syntax flag. The at least one VVC syntax flag comprises a first VVC syntax flag that indicates whether inter prediction is allowed in a corresponding coding level. The one or more processors may further be configured to receive, in response to a syntax element indicating that inter prediction is allowed, inter related syntax elements. The one or more processors may further be configured to obtain a first reference picture $I^{(0)}$ and a second reference picture $I^{(1)}$ associated with a video block in a bitstream. The first reference picture $I^{(0)}$ may be before a current picture and the second reference picture $I^{(1)}$ may be after the current picture in display order. The one or more processors may further be configured to obtain first prediction samples $I^{(0)}(i,j)$ of the video block from a reference block in the first reference picture $I^{(0)}$. The i and j may represent a coordinate of one sample with the current picture. The one or more processors may further be configured to obtain second prediction samples $I^{(1)}(i,j)$ of the video block from a reference block in the second reference picture $I^{(1)}$. The one or more processors may further be configured to obtain bi-prediction samples based on the at least one VVC syntax flag, the inter related syntax elements, the first prediction samples $I^{(0)}(i,j)$, and the second prediction samples $I^{(1)}(i,j)$.

According to a fourth aspect of the present disclosure, a non-transitory computer-readable storage medium having stored therein instructions is provided. When the instructions are executed by one or more processors of the apparatus, the instructions may cause the apparatus to receive arranged partition constraint syntax elements in SPS level. The arranged partition constraint syntax elements are arranged so that inter prediction related syntax elements are grouped in VVC syntax at a coding level. The instructions may also cause the apparatus to obtain a first reference picture $I^{(0)}$ and a second reference picture $I^{(1)}$ associated with a video block in a bitstream. The first reference picture $I^{(0)}$ may be before a current picture and the second reference picture $I^{(1)}$ may be after the current picture in display order. The instructions may also cause the apparatus to obtain first prediction samples $I^{(0)}(i,j)$ of the video block from a reference block in the first reference picture $I^{(0)}$. The i and j may represent a coordinate of one sample with the current picture. The instructions may also cause the apparatus to obtain second prediction samples $I^{(1)}(i,j)$ of the video block from a reference block in the second reference picture $I^{(1)}$. The instructions may also cause the apparatus to obtain bi-prediction samples based on the arranged partition constraint syntax elements, the first prediction samples $I^{(0)}(i,j)$, and the second prediction samples $I^{(1)}(i,j)$.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 7 is a diagram illustrating a computing environment coupled with a user interface, according to an example of the present disclosure.

DETAILED DESCRIPTION

Figure 1:
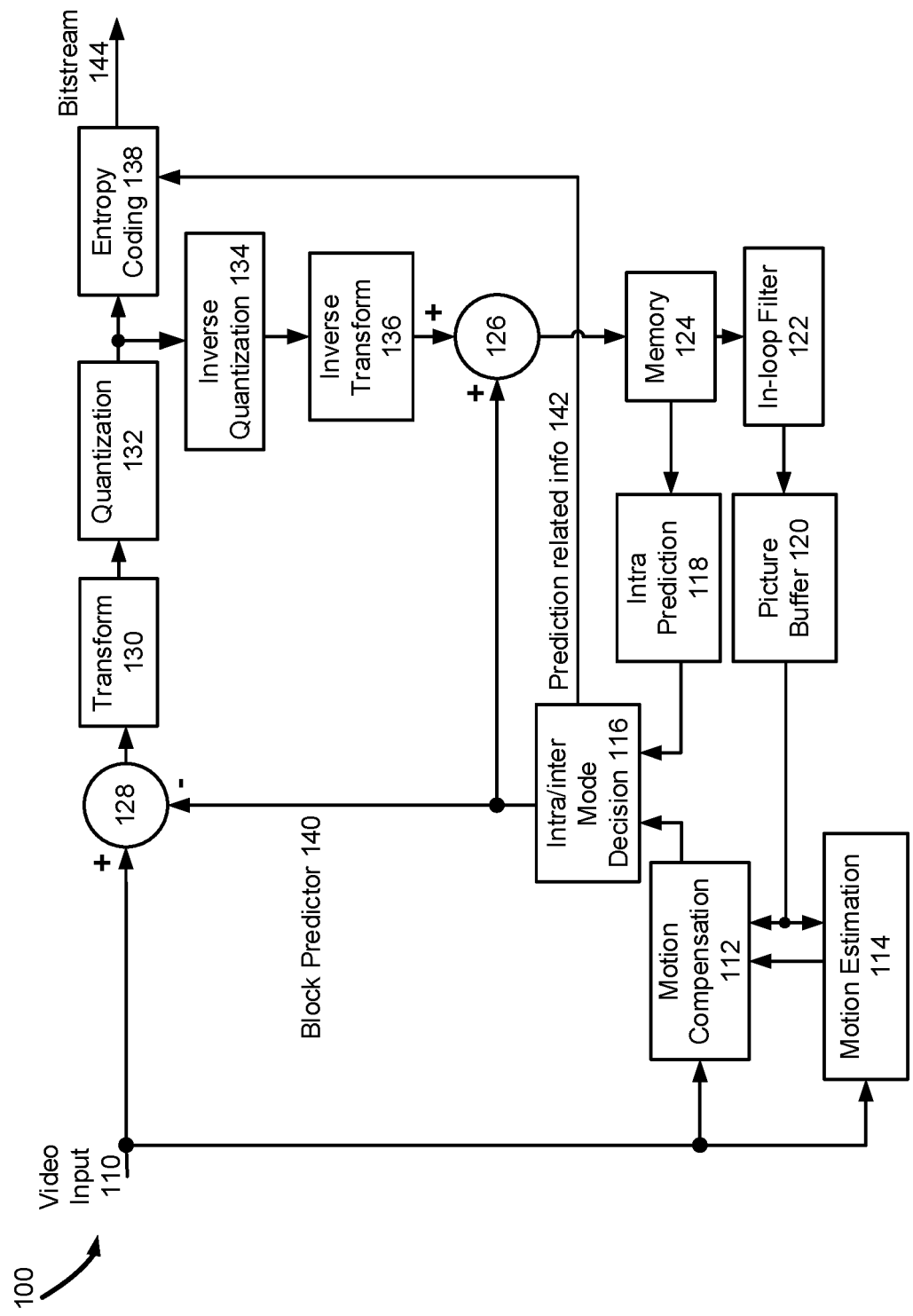
FIG. 1 is a block diagram of an encoder, according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (WET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard named Versatile Video Coding (VVC). In the same month, one reference software codebase, called VVC test model (VTM), was established for demonstrating a reference implementation of the VVC standard. Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU), and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces the temporal redundancy inherent in the video signal. The temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example, based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO), and adaptive in-loop filter (ALF) may be applied on the reconstructed CU before it is put in the reference picture storage and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
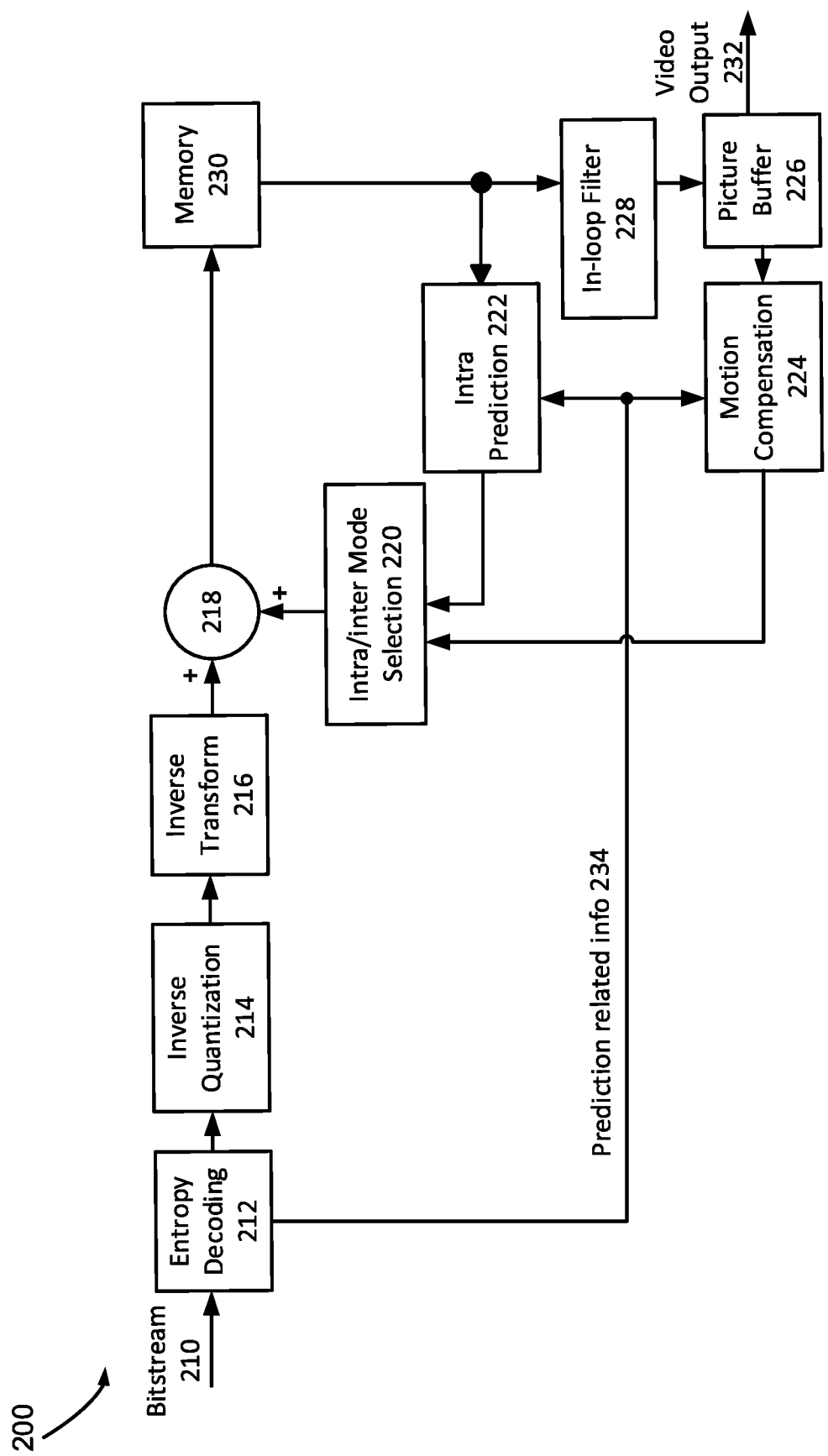
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at entropy decoding unit. The coding mode and prediction information are sent to either the spatial prediction unit (if intra coded) or the temporal prediction unit (if inter-coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in a reference picture storage. The reconstructed video in the reference picture storage is then sent out to drive a display device, as well as used to predict future video blocks.

In general, the basic intra prediction scheme applied in the VVC is kept the same as that of the HEVC, except that several modules are further extended and/or improved, e.g., matrix weighted intra prediction (MIP) coding mode, intra sub-partition (ISP) coding mode, extended intra prediction with wide-angle intra directions, position-dependent intra prediction combination (PDPC) and 4-tap intra interpolation. The main focus of the disclosure is to improve the existing high-level syntax design in the VVC standard. The related background knowledge is elaborated in the following sections.

Like HEVC, VVC uses a Network Abstraction Layer (NAL) unit-based bitstream structure. A coded bitstream is partitioned into NAL units which, when conveyed over lossy packet networks, should be smaller than the maximum transfer unit size. Each NAL unit consists of a NAL unit header followed by the NAL unit payload. There are two conceptual classes of NAL units. Video coding layer (VCL) NAL units containing coded sample data, e.g., coded slice NAL units, whereas non-VCL NAL units that contain metadata typically belonging to more than one coded picture, or where the association with a single coded picture would be meaningless, such as parameter set NAL units, or where the information is not needed by the decoding process, such as SEI NAL units.

In VVC, a two-byte NAL unit header was introduced with the anticipation that this design is sufficient to support future extensions. The syntax and the associated semantic of the NAL unit header in the current VVC draft specification are illustrated in Table 1 and Table 2, respectively. How to read Table 1 is illustrated in the appendix section of this invention, which could also be found in the VVC specification.

TABLE 1

NAL unit header syntax

|  | Descriptor |
|---|---|
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

TABLE 2

NAL unit header semantics forbidden_zero_bit shall be equal to 0.
nuh_reserved_zero_bit shall be equal to 0. The value 1 of nuh_reserved_zero_bit may be specified in the future by ITU-T | ISO/IEC. Decoders shall ignore (i.e., remove from the bitstream and discard) NAL units with nuh_reserved_zero_bit equal to 1.
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T | ISO/IEC.
The value of nuh_layer_id shall be the same for all VCL NAL units of a coded picture. The value of nuh_layer_id of a coded picture or a PU is the value of the nuh_layer_id of the VCL NAL units of the coded picture or the PU.
The value of nuh_layer_id for AUD, PH, EOS, and FD NAL units is constrained as follows:
- If nal_unit_type is equal to AUD NUT, nuh_layer_id shall be equal to vps_layer_id[ 0 ]. [Ed. (YK): Check whether it's better to treat the nuh_layer_id of AUD in the same way as for DCI NAL unit, VPS, and EOB, i.e., not constrained.]
- Otherwise, when nal_unit_type is equal to PH NUT, EOS NUT, or FD NUT, nuh_layer_id shall be equal to the nuh_layer_id of the associated VCL NAL unit.
NOTE 1 - The value of nuh_layer_id of DCI, VPS, and EOB NAL units is not constrained.
The value of nal_unit_type shall be the same for all pictures of a CVSS AU.
nal_unit_type specifies the NAL unit type, i.e., the type of RBSP data structure contained in the NAL unit as specified in Table 3.

TABLE 3

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 ... 6 | RSV_VCL_4 ... RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | GDR_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

VVC inherits the parameter set concept of HEVC with a few modifications and additions. Parameter sets can be either part of the video bitstream or can be received by a decoder through other means (including out-of-band transmission using a reliable channel, hard coding in encoder and decoder, and so on). A parameter set contains an identification, which is referenced, directly or indirectly, from the slice header, as discussed in more detail later. The referencing process is known as "activation." Depending on the parameter set type, the activation occurs per picture or per sequence. The concept of activation through referencing was introduced, among other reasons, because implicit activation by virtue of the position of the information in the bitstream (as common for other syntax elements of a video codec) is not available in case of out-of-band transmission.

The video parameter set (VPS) was introduced to convey information that is applicable to multiple layers as well as sub-layers. The VPS was introduced to address these shortcomings as well as to enable a clean and extensible high-level design of multilayer codecs. Each layer of a given video sequence, regardless of whether they have the same or different sequence parameter sets (SPS), refer to the same VPS. The syntax and the associated semantic of the video parameter set in the current VVC draft specification are illustrated in Table 4 and Table 5, respectively. How to read Table 4 is illustrated in the appendix section of this invention, which could also be found in the VVC specification.

TABLE 4

Video parameter set RBSP syntax

| | Descriptor |
|---|---|
| video_parameter_set_rbsp( ) { | |
|   vps_video_parameter_set_id | u(4) |

TABLE 4-continued

Video parameter set RBSP syntax

| | Descriptor |
|---|---|
| vps_max_layers_minus1 | u(6) |
| vps_max_sublayers_minus1 | u(3) |
| if( vps_max_layers_minus1 > 0 && vps max_sublayers_minus1 > 0 ) | |
|   vps_all_layers_same_num_sublayers_flag | u(1) |
| if( vps_max_layers_minus1 > 0 ) | |
|   vps_all_independent_layers_flag | u(1) |
| for( i = 0; i <= vps_max_layers_minus1; i++ ) { | |
|   vps_layer_id[ i ] | u(6) |
|   if( i > 0 && !vps_all_independent_layers_flag ) { | |
|     vps_independent_layer_flag[ i ] | u(1) |
|     if( !vps_independent_layer_flag[ i ] ) { | |
|       for( j = 0; j < i; j++ ) | |
|         vps_direct_ref_layer_flag[ i ][ j ] | u(1) |
|       max_tid_ref_present_flag[ i ] | u(1) |
|       if( max_tid_ref_present_flag[ i ] ) | |
|         max_tid_il_ref_pics_plus1[ i ] | u(3) |
|     } | |
|   } | |
| } | |
| if( vps_max_layers_minus1 > 0 ) { | |
|   if( vps_all_independent_layers_flag) | |
|     each_layer_is_an_ols_flag | u(1) |
|   if( !each_layer_is_an_ols_flag ) { | |
|     if( !vps_all_independent_layers_flag ) | |
|       ols_mode_idc | u(2) |
|     if( ols_mode_idc = = 2 ) { | |
|       num_output_layer_sets_minus1 | u(8) |
|       for( i = 1; i <= num_output_layer_sets_minus1; i ++ ) | |
|         for( j = 0; j <= vps_max_layers_minus1; j++ ) | |
|           ols_output_layer_flag[ i ][ j ] | u(1) |
|     } | |
|   } | |
| } | |
| vps_num_ptls_minus1 | u(8) |
| for( i = 0; i <= vps_num_ptls_minus1; i++ ) { | |
|   if( i > 0 ) | |
|     pt_present_flag[ i ] | u(1) |
|   if( vps_max_sublayers_minus1 > 0 && !vps_all_layers_same_num_sublayers_flag ) | |
|     ptl_max_temporal_id[ i ] | u(3) |
| } | |
| while( !byte_aligned( ) ) | |
|   vps_ptl_alignment_zero_bit /* equal to 0 */ | f(1) |
| for( i = 0; i <= vps_num_ptls_minus1; i++ ) | |
|   profile_tier_level( pt_present_flag[ i ], ptl_max_temporal_id[ i ] ) | |
| for( i = 0; i < TotalNumOlss; i++ ) | |
|   if( vps_num_ptls_minus1 > 0 ) | |
|     ols_ptl_idx[ i ] | u(8) |
| if( !vps_all_independent_layers flag ) | |
|   vps_num_dpb_params | ue(v) |
| if( vps_num_dpb_params > 0 && vps_max_sublayers_minus1 > 0 ) | |
|   vps_sublayer_dpb_params_present_flag | u(1) |
| for( i = 0; i < vps_num_dpb_params; i++ ) { | |
|   if( vps_max_sublayers_minus1 > 0 && !vps_all_layers_same_num_sublayers_flag ) | |
|     dpb_max_temporal_id[ i ] | u(3) |
|   dpb_parameters( dpb_max_temporal_id[ i ], vps_sublayer_dpb_params_present flag ) | |
| } | |
| for( i = 0; i < TotalNumOlss; i++ ) { | |
|   if( NumLayersInOls[ i ] > 1 ) { | |
|     ols_dpb_pic_width[ i ] | ue(v) |
|     ols_dpb_pic_height[ i ] | ue(v) |
|     if( vps_num_dpb_params > 1 ) | |
|       ols_dpb_params_idx[ i ] | ue(v) |
|   } | |
| } | |
| if( !each_layer_is_an_ols flag) | |
|   vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sub_layer_cpb_params_present_flag | u(1) |
|   num_ols_hrd_params_minus1 | ue(v) |
|   for( i = 0; i <= num_ols_hrd_params_minus1; i++ ) { | |
|     if( vps_max_sublayers_minus1 > 0 && | |

TABLE 4-continued

Video parameter set RBSP syntax

| | Descriptor |
|---|---|
| !vps_all_layers_same_num_sublayers_flag ) | |
|     hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && | |
|     num_ols_hrd_params_minus1 > 0 ) | |
|     for( i = 1; i < TotalNumOlss; i++ ) | |
|       if( NumLayersInOls[ i ] > 1 ) | |
|         ols_hrd_idx[ i ] | ue(v) |
| } | |
| vps_extension_flag | u(1) |
| if( vps_extension_flag) | |
|   while( more_rbsp_data( ) ) | |
|     vps_extension_data_flag | u(1) |
| rbsp_trailing_bits( ) | |
| } | |

TABLE 5

Video parameter set RBSP semantics

A VPS RBSP shall be available to the decoding process prior to it being referenced, included in at least one AU with TemporalId equal to 0 or provided through external means.
All VPS NAL units with a particular value of vps_video_parameter_set_id in a CVS shall have the same content.
vps_video_parameter_set_id provides an identifier for the VPS for reference by other syntax elements. The value of vps_video_parameter_set_id shall be greater than 0.
vps_max_layers_minus1 plus 1 specifies the maximum allowed number of layers in each CVS referring to the VPS.
vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.
vps_all_layers_same_num_sublayers_flag equal to 1 specifies that the number of temporal sublayers is the same for all the layers in each CVS referring to the VPS. vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.
vps_all_independent_layers_flag equal to 1 specifies that all layers in the CVS are independently coded without using inter-layer prediction, vps_all_independent_layers_flag equal to 0 specifies that one or more of the layers in the CVS may use inter-layer prediction. When not present, the value of vps_all_independent_layers_flag is inferred to be equal to 1.
vps_layer_id[ i ] specifies the nuh_layer_id value of the i-th layer. For any two non-negative integer values of m and n, when m is less than n, the value of vps_layer_id[ m ] shall be less than vps_layer_id[ n ].
vps_independent_layer_flag[ i ] equal to 1 specifies that the layer with index i does not use inter-layer prediction, vps_independent_layer_flag[ i ] equal to 0 specifies that the layer with index i may use inter-layer prediction and the syntax elements vps_direct_ref_layer_flag[ i ][ j ] for j in the range of 0 to i − 1, inclusive, are present in VPS. When not present, the value of vps_independent_layer_flag i ] is inferred to be equal to 1.
vps_direct_ref_layer flag[ i ][ j ] equal to 0 specifies that the layer with index j is not a direct reference layer for the layer with index i. vps_direct_ref_layer flag [ i ][ j ] equal to 1 specifies that the layer with index j is a direct reference layer for the layer with index i. When vps_direct_ref_layer_flag[ i ][ j ] is not present for i and j in the range of 0 to vps_max_layers_minus1, inclusive, it is inferred to be equal to 0. When vps_independent_layer_flag[ i ] is equal to 0, there shall be at least one value of j in the range of 0 to i − 1, inclusive, such that the value of vps_direct_ref_layer_flag[ i ][ j ] is equal to 1.
The variables NumDirectRefLayers[ i ], DirectRefLayerIdx[ i ][ d ], NumRefLayers[ i ], RefLayerIdx[ i ][ r ], and LayerUsedAsRefLayerFlag[ j ] are derived as follows:
    for( i = 0; i <= vps_max_layers_minus1; i++ ) {
      for( j = 0; j <= vps_max_layers_minus1; j++ ) {
        dependencyFlag[ i ][ j ] = vps_direct_ref_layer_flag[ i ][ j ]
        for( k = 0; k < i; k++ )
          if( vps_direct_ref_layer_flag[ i ][ k ] && dependencyFlag[ k ] [ j ])
            dependencyFlag[ i ][ j ] = 1
      }
      LayerUsedAsRefLayerFlag[ i ] = 0

TABLE 5-continued

Video parameter set RBSP semantics

```
    }
    for( i = 0; i <= vps_max_layers_minus1; i++ ) {
        for( j = 0, d = 0, r = 0; j <= vps_max_layers_minus1; j++ ) {                    (37)
            if( vps_direct_ref_layer_flag[ i ][ j ] ) {
                DirectRefLayerIdx[ i ][ d++ ] = j
                LayerUsedAsRefLayerFlag[ j ] = 1
            }
            if( dependencyFlag[ i ][ j ] )
                RefLayerIdx[ i ][ r++ ] = j
        }
        NumDirectRefLayers[ i ] = d
        NumRefLayers[ i ] = r
    }
```
The variable GeneralLayerIdx[ i ], specifying the layer index of the layer with
nuh_layer_id equal to vps_layer_id[ i ], is derived as follows:
```
    for( i = 0; i <= vps_max_layers_minus1; i++ )                                        (38)
        GeneralLayerIdx[ vps_layer_id[ i ] ] = i
```
For any two different values of i and j, both in the range of 0 to vps_max_layers_minus1,
inclusive, when dependencyFlag[ i ][ j ] equal to 1, it is a requirement of bitstream
conformance that the values of chroma_format_idc and bit_depth_minus8 that apply to the
i-th layer shall be equal to the values of chroma_format_idc and bit_depth_minus8,
respectively, that apply to the j-th layer.
max_tid_ref_present_flag[ i ] equal to 1 specifies that the syntax element
max_tid_il_ref_pics_plus1[ i ] is present. max_tid_ref_present_flag[ i ] equal to 0 specifies
that the syntax element max_tid_il_ref_pics_plus1[ i ] is not present.
max_tid_il_ref_pics_plus1[ i ] equal to 0 specifies that inter-layer prediction is not used
by non-IRAP pictures of the i-th layer. max_tid_il_ref_pics_plus1[ i ] greater than 0
specifies that, for decoding pictures of the i-th layer, no picture with TemporalId greater
than max_tid_il_ref_pics_plus1[ i ] − 1 is used as ILRP. When not present, the value of
max_tid_il_ref_pics_plus1[ i ] is inferred to be equal to 7.
each_layer_is_an_ols_flag equal to 1 specifies that each OLS contains only one layer and
each layer itself in a CVS referring to the VPS is an OLS with the single included layer
being the only output layer, each_layer_is_an_ols_flag equal to 0 that an OLS may contain
more than one layer. If vps_max_layers_minus1 is equal to 0, the value of
each_layer_is_an_ols_flag is inferred to be equal to 1. Otherwise, when
vps_all_independent_layers_flag is equal to 0, the value of each_layer_is_an_ols_flag is
inferred to be equal to 0.
olsmodeidc equal to 0 specifies that the total number of OLSs specified by the VPS is
equal to vps_max_layers_minus1 + 1, the i-th OLS includes the layers with layer indices
from 0 to i, inclusive, and for each OLS only the highest layer in the OLS is output.
olsmodeidc equal to 1 specifies that the total number of OLSs specified by the VPS is
equal to vps_max_layers_minus1 + 1, the i-th OLS includes the layers with layer indices
from 0 to i, inclusive, and for each OLS all layers in the OLS are output.
ols_mode_idc equal to 2 specifies that the total number of OLSs specified by the VPS is
explicitly signalled and for each OLS the output layers are explicitly signalled and other
layers are the layers that are direct or indirect reference layers of the output layers of the
OLS.
The value of ols_mode_idc shall be in the range of 0 to 2, inclusive. The value 3 of
ols_mode_idc is reserved for future use by ITU-T | ISO/IEC.
When vps_all_independent_layers_flag is equal to 1 and each_layer_is_an_ols_flag is
equal to 0, the value of ols_mode_idc is inferred to be equal to 2.
num_output_layer_sets_minus1 plus 1 specifies the total number of OLSs specified by
the VPS when ols_mode_idc is equal to 2.
The variable TotalNumOlss, specifying the total number of OLSs specified by the VPS, is
derived as follows:
```
    if( vps_max_layers_minus1 = = 0 )
        TotalNumOlss = 1
    else if( each_layer_is_an_ols_flag || ols_mode_idc = = 0 || ols_mode_idc = =
1 )
        TotalNumOlss = vps_max_layers_minus1 + 1                                         (39)
    else if( ols_mode_idc = = 2 )
        TotalNumOlss = num_output_layer_sets_minus1 + 1
```
ols_output_layer_flag[ i ][ j ] equal to 1 specifies that the layer with nuh_layer_id equal to
vps_layer_id[ j ] is an output layer of the i-th OLS when ols_mode_idc is equal to 2.
ols_output_layer_flag[ i ][ j ] equal to 0 specifies that the layer with nuh_layer_id equal to
vps_layer_id[ j ] is not an output layer of the i-th OLS when ols_mode_idc is equal to 2.
The variable NumOutputLayersInOls[ i ], specifying the number of output layers in the i-th
OLS, the variable NumSubLayersInLayerInOLS[ i ][ j ], specifying the number of
sublayers in the j-th layer in the i-th OLS, the variable OutputLayerIdInOls[ i ][ j ],
specifying the nuh_layer_id value of the j-th output layer in the i-th OLS, and the variable
LayerUsedAsOutputLayerFlag[ k ], specifying whether the k-th layer is used as an output
layer in at least one OLS, are derived as follows:
```
    NumOutputLayersInOls[ 0 ] = 1
    OutputLayerIdInOls[ 0 ][ 0 ] = vps_layer_id[ 0 ]
    NumSubLayersInLayerInOLS[ 0 ][ 0 ] = vps_max_sub_layers_minus1 + 1
    LayerUsedAsOutputLayerFlag[ 0 ] = 1
    for( i = 1, i <= vps_max_layers_minus1; i++ ) {
```

TABLE 5-continued

Video parameter set RBSP semantics

```
        if( each_layer_is_an_ols_flag || ols_mode_idc < 2 )
            LayerUsedAsOutputLayerFlag[ i ] = 1
        else/*( !each_layer_is_an_ols_flag && ols_mode_idc = = 2 )*/
            LayerUsedAsOutputLayerFlag[ i ] = 0
    }
    for( i = 1; i < TotalNumOlss; i++ )
        if( each_layer_is_an_ols_flag || ols_mode_idc = = 0 ) {
            NumOutputLayersInOls[ i ] = 1
            OutputLayerIdInOls[ i ][ 0 ] = vps_layer_id[ i ]
            for( j = 0; j < i && ( ols_mode_idc = = 0 ); j++ )
                NumSubLayersInLayerInOLS[ i ][ j ] = max_tid_il_ref_pics_plus1[ i ]
            NumSubLayersInLayerInOLS[ i ][ i ] = vps_max_sub_layers_minus1 + 1
        } else if( ols_mode_idc = = 1 ) {
            NumOutputLayersInOls[ i ] = i + 1
            for( j = 0; j < NumOutputLayersInOls[ i ]; j++ ) {
                OutputLayerIdInOls[ i ][ j ] = vps_layer_id[ j ]
                NumSubLayersInLayerInOLS[ i ][ j ] =
    vps_max_sub_layers_minus1 + 1
            }
        } else if( ols_mode_idc = = 2 ) {
            for( j = 0; j <= vps_max_layers_minus1; j++ ) {
                layerIncludedInOlsFlag[ i ][ j ] = 0
                NumSubLayersInLayerInOLS[ i ][ j ] = 0
            }
            for( k = 0, j = 0; k <= vps_max_layers_minus1; k++ )           (40)
                if( ols_output_layer_flag[ i ][ k ] ) {
                    layerIncludedInOlsFlag[ i ][ k ] = 1
                    LayerUsedAsOutputLayerFlag[ k ] = 1
                    OutputLayerIdx[ i ][ j ] = k
                    OutputLayerIdInOls[ i ][ j++ ] = vps_layer_id[ k ]
                    NumSubLayersInLayerInOLS[ i ][ j ] =
    vps_max_sub_layers_minus1 + 1
                }
            NumOutputLayersInOls[ i ] = j
            for( j = 0; j < NumOutputLayersInOls[ i ]; j++ ) {
                idx = OutputLayerIdx[ i ][ j ]
                for( k = 0; k < NumRefLayers[ idx ]; k++ ) {
                    layerIncludedInOlsFlag[ i ][ RefLayerIdx[ idx ][ k ] ] = 1
                    if( NumSubLayersInLayerInOLS[ i ][ RefLayerIdx[ idx ][ k ] ] <
                        max_tid_il_ref_pics_plus1[ OutputLayerIdInOls[ i ][ j ] ] )
                      NumSubLayersInLayerInOLS[ i ][ RefLayerIdx[ idx ][ k ] ] =
                        max_tid_il_ref_pics_plus1[ OutputLayerIdInOls[ i ][ j ] ]
                }
            }
        }
```

For each value of i in the range of 0 to vps_max_layers_minus1, inclusive, the values of LayerUsedAsRefLayerFlag[ i ] and LayerUsedAsOutputLayerFlag[ i ] shall not be both equal to 0. In other words, there shall be no layer that is neither an output layer of at least one OLS nor a direct reference layer of any other layer.

For each OLS, there shall be at least one layer that is an output layer. In other words, for any value of i in the range of 0 to TotalNumOlss − 1, inclusive, the value of NumOutputLayersInOls[ i ] shall be greater than or equal to 1.

The variable NumLayersInOls[ i ], specifying the number of layers in the i-th OLS, and the variable LayerIdInOls[ i ][ j ], specifying the nuh_layer_id value of the j-th layer in the i-th OLS, are derived as follows:

```
    NumLayersInOls[ 0 ] = 1
    LayerIdInOls[ 0 ][ 0 ] = vps_layer_id[ 0 ]
    for( i = 1; i < TotalNumOlss; i++ ) {
        if( each_layer_is_an_ols_flag) {
            NumLayersInOls[ i ] = 1
            LayerIdInOls[ i ][ 0 ] = vps layer id[ i ]
            (41)
        } else if( ols_mode_idc = = 0 ols_mode_idc = = 1 ) {
            NumLayersInOls[ i ] = i + 1
            for( j = 0; j < NumLayersInOls[ i ]; j++ )
                LayerIdInOls[ i ][ j ] = vps_layer_id[ j ]
        } else if( ols_mode_idc = = 2 ) {
            for( k = 0, j = 0; k <= vps_max_layers_minus1; k++ )
                if( layerIncludedInOlsFlag[ i ][ k ] )
                    LayerIdInOls[ i ][ j++ ] = vps_layer_id[ k ]
            NumLayersInOls[ i ] = j
        }
    }
```

NOTE 1 - The O-th OLS contains only the lowest layer (i.e., the layer with nuh_layer_id equal to vps layer id 0 ]) and for the O-th OLS the only included layer is output.

The variable OlsLayerIdx[ i ][ j ], specifying the OLS layer index of the layer with nuh_layer_id equal to LayerIdInOls[ i ][ j ], is derived as follows:

TABLE 5-continued

Video parameter set RBSP semantics

```
    for( i = 0; i < TotalNumOlss; i++ )
        for j = 0; j < NumLayersInOls[ i ]; j++ )
            (42)
            OlsLayerIdx[ i ][ LayerIdInOls[ i ][ j ] ] = j
```
The lowest layer in each OLS shall be an independent layer. In other words, for each i in
the range of 0 to TotalNumOlss − 1, inclusive, the value of
vps_independent_layer_flag[ GeneralLayerIdx[ LayerIdInOls[ i ][ 0 ] ] ] shall be equal to
1.
Each layer shall be included in at least one OLS specified by the VPS. In other words, for
each layer with a particular value of nuh_layer_id nuhLayerId equal to one of
vps_layer_id[ k ] for k in the range of 0 to vps_max_layers_minus1, inclusive, there shall
be at least one pair of values of i and j, where i is in the range of 0 to TotalNumOlss − 1,
inclusive, and j is in the range of NumLayersInOls[ i ] − 1, inclusive, such that the value of
LayerIdInOls[ i ][ j ] is equal to nuhLayerId.
vpsnumptlsminus1 plus 1 specifies the number of profile_tier_level( ) syntax
structures in the VPS. The value of vps_num_ptls_minus1 shall be less than TotalNumOlss.
pt_present_flag[ i ] equal to 1 specifies that profile, tier, and general constraints
information are present in the i-th profile_tier_level( ) syntax structure in the VPS.
pt_present_flag[ i ] equal to 0 specifies that profile, tier, and general constraints
information are not present in the i-th profile_tier_level( ) syntax structure in the VPS. The
value of pt_present_flag[ 0 ] is inferred to be equal to 1. When pt_present_flag[ i ] is equal
to 0, the profile, tier, and general constraints information for the i-th profile_tier_level( )
syntax structure in the VPS are inferred to be the same as that for the (i − 1 )-th
profile_tier_level( ) syntax structure in the VPS.
ptl_max_temporal_id[ i ] specifies the TemporalId of the highest sublayer representation
for which the level information is present in the i-th profile_tier_level( ) syntax structure in
the VPS. The value of ptl_max_temporal_id[ i ] shall be in the range of 0 to
vps_max_sublayers_minus1, inclusive. When vps_max_sublayers_minus1 is equal to 0,
the value of ptl_max_temporal_id[ i ] is inferred to be equal to 0. When
vps_max_sublayers_minus1 is greater than 0 and
vps_all_layers_same_num_sublayers_flag is equal to 1, the value of
ptl_max_temporal_id[ i ] is inferred to be equal to vps_max_sublayers_minus1.
vps_ptl_alignment_zero_bit shall be equal to 0.
ols_ptl_idx[ i ] specifies the index, to the list of profile_tier_level( ) syntax structures in
the VPS, of the profile_tier_level( ) syntax structure that applies to the i-th OLS. When
present, the value of ols_ptl_idx[ i ] shall be in the range of 0 to vps_num_ptls_minus1,
inclusive. When vps_num_ptls_minus1 is equal to 0, the value of ols_ptl_idx[ i ] is inferred
to be equal to 0.
When NumLayersInOls[ i ] is equal to 1, the profile_tier_level( ) syntax structure that
applies to the i-th OLS is also present in the SPS referred to by the layer in the i-th OLS. It
is a requirement of bitstream conformance that, when NumLayersInOls[ i ] is equal to 1,
the profile_tier_level( ) syntax structures signalled in the VPS and in the SPS for the i-th
OLS shall be identical.
vpsnumdpbparams specifies the number of dpb_parameters( ) syntax strutcures in the
VPS. The value of vps_num_dpb_params shall be in the range of 0 to 16, inclusive. When
not present, the value of vps_num_dpb_params is inferred to be equal to 0.
vps_sublayer_dpb_params_present_flag is used to control the presence of
max_dec_pic_buffering_minus1[ ], max_num_reorder_pics[ ], and
max_latency_increase_plus1[ ] syntax elements in the dpb_parameters( ) syntax strucures
in the VPS. When not present, vps_sub_dpb_params_info_present_flag is inferred to be
equal to 0.
dpb_ max_temporal_id[ i ] specifies the TemporalId of the highest sublayer representation
for which the DPB parameters may be present in the i-th dpb_parameters( ) syntax
strutcure in the VPS. The value of dpb_max_temporal_id[ i ] shall be in the range of 0 to
vps_max_sublayers_minus1, inclusive. When vps_max_sublayers_minus1 is equal to 0,
the value of dpb_max_temporal_id[ i ] is inferred to be equal to 0. When
vps_max_sublayers_minus1 is greater than 0 and
vps all layers same num sublayers flag is equal to 1, the value of
dpb_max_temporal_id[ i ] is inferred to be equal to vps_max_sublayers_minus1.
ols_dpb_pic_width[ i ] specifies the width, in units of luma samples, of each picture
storage buffer for the i-th OLS.
ols_dpb_pic_height[ i ] specifies the height, in units of luma samples, of each picture
storage buffer for the i-th OLS.
ols_dpb_params_idx[ i ] specifies the index, to the list of dpb_parameters( ) syntax
structures in the VPS, of the dpb_parameters( ) syntax structure that applies to the i-th OLS
when NumLayersInOls[ i ] is greater than 1. When present, the value of
olsdpb_params_idx[ i ] shall be in the range of 0 to vps_num_dpb_params − 1, inclusive.
When ols dpb_params_idx[ i ] is not present, the value of ols dpb_params_idx[ i ] is
inferred to be equal to 0.
When NumLayersInOls[ i ] is equal to 1, the dpb_parameters( ) syntax structure that
applies to the i-th OLS is present in the SPS referred to by the layer in the i-th OLS.
vps_general_hrd_params_present_flag equal to 1 specifies that the syntax structure
general_hrd_parameters( ) and other HRD parameters are present in the VPS RBSP syntax
structure, vps general hrd cpb_params_present_flag equal to 0 specifies that the syntax
structure general_hrd_parameters( ) and other HRD parameters are not present in the VPS
RBSP syntax structure. When not present, the value of
vps_general_hrd_params_present_flag is inferred to be equal to 0.
When NumLayersInOls[ i ] is equal to 1, the general_hrd_parameters( ) syntax structure TABLE 5-continued Video parameter set RBSP semantics that applies to the i-th OLS is present in the SPS referred to by the layer in the i-th OLS.
vps_sublayer_cpb_params_present_flag equal to 1 specifies that the i-th
ols_hrd_parameters( ) syntax structure in the VPS contains HRD parameters for the
sublayer representations with TemporalId in the range of 0 to hrd_max_tid[ i ], inclusive,
vps_sublayer_cpb_params_present_flag equal to 0 specifies that the i-th
ols_hrd_parameters( ) syntax structure in the VPS contains HRD parameters for the
sublayer representation with TemporalId equal to hrd_max_tid[ i ] only. When
vps_max_sublayers_minus1 is equal to 0, the value of
vps_sublayer_cpb_params_present_flag is inferred to be equal to 0.
When vps_sublayer_cpb_cpb_params_present_flag is equal to 0, the HRD parameters for the
sublayer representations with TemporalId in the range of 0 to hrd_max_tid[ i ] − 1,
inclusive, are inferred to be the same as that for the sublayer representation with
TemporalId equal to hrd_max_tid[ i ]. These include the HRD parameters starting from the
fixed_pic_rate_general_flag[ i ] syntax element till the sublayer_hrd_parameters( i ) syntax
structure immediately under the condition "if( general_vcl_hrd_cpb_params_present_flag )" in
the ols_hrd_parameters syntax structure.
num_ols_hrd_params_minus1 plus 1 specifies the number of ols_hrd_parameters( )
syntax structures present in the general_hrd_parameters( ) syntax structure when
vps_general_hrd_params_present_flag is equal to 1. The value of
num_ols_hrd_params_minus1 shall be in the range of 0 to TotalNumOlss − 1, inclusive.
hrd_max_tid[ i ] specifies the TemporalId of the highest sublayer representation for which
the HRD parameters are contained in the i-th ols_hrd_parameters( ) syntax structure. The
value of hrd_max_tid[ i ] shall be in the range of 0 to vps_max_sublayers_minus1,
inclusive. When vps_max_sublayers_minus1 is equal to 0, the value of hrd_max_tid[ i ] is
inferred to be equal to 0. When vps_max_sublayers_minus1 is greater than 0 and
vps_all_layers_same_num_sublayers_flag is equal to 1, the value of hrd_max_tid[ i ] is
inferred to be equal to vps_max_sublayers_minus1.
ols_hrd_idx[ i ] specifies the index, to the list of ols_hrd_parameters( ) syntax structures in
the VPS, of the ols_hrd_parameters( ) syntax structure that applies to the i-th OLS when
NumLayersInOls[ i ] is greater than 1. The value of ols_hrd_idx[[ i ] shall be in the range
of 0 to num_ols_hrd_params_minus1, inclusive.
When NumLayersInOls[ i ] is equal to 1, the ols_hrd_parameters( ) syntax structure that
applies to the i-th OLS is present in the SPS referred to by the layer in the i-th OLS.
If the value of num_ols_hrd_param_minus1 + 1 is equal to TotalNumOlss, the value of
ols_hrd_idx[ i ] is inferred to be equal to i. Otherwise, when NumLayersInOls[ i ] is greater
than 1 and num_ols_hrd_params_minus1 is equal to 0, the value of ols_hrd_idx[[ i ] is
inferred to be equal to 0.
vps_extension_flag equal to 0 specifies that no vps_extension_data_flag syntax elements
are present in the VPS RBSP syntax structure, vps_extension_flag equal to 1 specifies that
there are vps_extension_data_flag syntax elements present in the VPS RBSP syntax
structure.
vps_extension_data_flag may have any value. Its presence and value do not affect
decoder conformance to profiles specified in this version of this Specification. Decoders
conforming to this version of this Specification shall ignore all vps_extension_data_flag
syntax elements.

In VVC, SPSs contain information that applies to all slices of a coded video sequence. A coded video sequence starts from an instantaneous decoding refresh (IDR) picture, or a BLA picture, or a CRA picture that is the first picture in the bitstream and includes all subsequent pictures that are not an IDR or BLA picture. A bitstream consists of one or more coded video sequences. The content of the SPS can be roughly subdivided into six categories: 1) a self-reference (its own ID); 2) decoder operation point related information (profile, level, picture size, number sub-layers, and so on); 3) enabling flags for certain tools within a profile, and associated coding tool parameters in case the tool is enabled; 4) information restricting the flexibility of structures and transform coefficient coding; 5) temporal scalability control; and 6) visual usability information (VUI), which includes HRD information. The syntax and the associated semantic of the sequence parameter set in the current VVC draft specification are illustrated in Table 6 and Table 7, respectively. How to read Table 6 is illustrated in the appendix section of this invention, which could also be found in the VVC specification.

TABLE 6

Sequence parameter set RBSP syntax

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |

TABLE 6-continued

Sequence parameter set RBSP syntax

|  | Descriptor |
|---|---|
| chroma_format_idc | u(2) |
| if( chroma_format_idc = = 3 ) | |
|    separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|    sps_conf_win_left_offset | ue(v) |
|    sps_conf_win_right_offset | ue(v) |
|    sps_conf_win_top_offset | ue(v) |
|    sps_conf_win_bottom_offset | ue(v) |
| } | |
| sps_log2_ctu_size_minus5 | u(2) |
| subpic_info_present_flag | u(1) |
| if( subpic_info_present_flag ) { | |
|    sps_num_subpics_minus1 | ue(v) |
|    sps_independent_subpics_flag | u(1) |
|    for( i = 0; sps_num_subpics_minus1 > 0 && i <= sps_num_subpics_minus1; i++ ) { | |
|      if( i > 0 && pic_width_max_in_luma_samples > CtbSizeY ) | |
|         subpic_ctu_top_left_x[ i ] | u(v) |
|      if( i > 0 && pic_height_max_in_luma_samples > CtbSizeY ) { | |
|         subpic_ctu_top_left_y[ i ] | u(v) |
|      if( i < sps_num_subpics_minus1 && | |
|         pic_width_max_in_luma_samples > CtbSizeY ) | |
|         subpic_width_minus1[ i ] | u(v) |
|      if( i < sps_num_subpics_minus1 && | |
|         pic_height_max_in_luma_samples > CtbSizeY ) | |
|         subpic_height_minus1[ i ] | u(v) |
|      if( !sps_independent_subpics_flag) { | |
|         subpic_treated_as_pic_flag[ i ] | u(1) |
|         loop_filter_across_subpic_enabled_flag[ i ] | u(1) |
|      } | |
|    } | |
|    sps_subpic_id_len_minus1 | ue(v) |
|    subpic_id_mapping_explicitly_signalled_flag | u(1) |
|    if( subpic_id_mapping_explicitly_signalled_flag ) { | |
|      subpic_id_mapping_in_sps_flag | u(1) |
|      if( subpic_id_mapping_in_sps_flag ) | |
|         for( i = 0; i <= sps_num_subpics_minus1; i++ ) | |
|            sps_subpic_id[ i ] | u(v) |
|    } | |
| } | |
| bit_depth_minus8 | ue(v) |
| sps_entropy_coding_sync_enabled_flag | u(1) |
| if( sps_entropy_coding_sync_enabled_flag) | |
|    sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|    poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|    sps_sublayer_dpb_params_flag | u(1) |
| if( sps_ptl_dpb_hrd_params_present_flag ) | |
|    dpb_parameters( sps_max_sublayers_minus1, sps_sublayer_dpb_params_flag) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|    num_ref_pic_lists_in_sps[ i ] | ue(v) |
|    for( j = 0; j < num_ref_pic_lists_in_sps[ i ]; j++) | |
|      ref_pic_list_struct( i, j ) | |
| } | |
| if( ChromaArrayType != 0 ) | |
|    qtbtt_dual_tree_intra_flag | u(1) |
| log2_min_luma_coding_block_size_minus2 | ue(v) |
| partition_constraints_override_enabled_flag | u(1) |

TABLE 6-continued

Sequence parameter set RBSP syntax

| | Descriptor |
|---|---|
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |

TABLE 6-continued

Sequence parameter set RBSP syntax

| | Descriptor |
|---|---|
|     sps_affine_type_flag | u(1) |
|     if( sps_amvr_enabled_flag) | |
|         sps_affine_amvr_enabled_flag | u(1) |
|     sps_affine_prof_enabled_flag | u(1) |
|     if( sps_affine_prof_enabled_flag ) | |
|         sps_prof_pic_present_flag | u(1) |
|   } | |
|   sps_palette_enabled_flag | u(1) |
|   if( ChromaArrayType = = 3 && !sps_max_luma_transform_size_64_flag ) | |
|     sps_act_enabled_flag | u(1) |
|   if( sps_transform_skip_enabled_flag \|\| sps_palette_enabled_flag ) | |
|     min_qp_prime_ts_minus4 | ue(v) |
|   sps_bcw_enabled_flag | u(1) |
|   sps_ibc_enabled_flag | u(1) |
|   if( sps_ibc_enabled_flag ) | |
|     six_minus_max_num_ibc_merge_cand | ue(v) |
|   sps_ciip_enabled_flag | u(1) |
|   if( sps_mmvd_enabled_flag ) | |
|     sps_fpel_mmvd_enabled_flag | u(1) |
|   if( MaxNumMergeCand >= 2 ) { | |
|     sps_gpm_enabled_flag | u(1) |
|     if( sps_gpm_enabled_flag && MaxNumMergeCand >= 3 ) | |
|         max_num_merge_cand_minus_max_num_gpm_cand | ue(v) |
|   } | |
|   sps_lmcs_enabled_flag | u(1) |
|   sps_lfnst_enabled_flag | u(1) |
|   sps_ladf_enabled_flag | u(1) |
|   if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
|   } | |
|   log2_parallel_merge_level_minus2 | ue(v) |
|   sps_scaling_list_enabled_flag | u(1) |
|   sps_dep_quant_enabled_flag | u(1) |
|   if( !sps_dep_quant_enabled_flag ) | |
|     sps_sign_data_hiding_enabled_flag | u(1) |
|   sps_virtual_boundaries_enabled_flag | u(1) |
|   if( sps_virtual_boundaries_enabled_flag ) { | |
|     sps_virtual_boundaries_present_flag | u(1) |
|     if( sps_virtual_boundaries_present_flag ) { | |
|         sps_num_ver_virtual_boundaries | u(2) |
|         for( i = 0; i < sps_num_ver_virtual_boundaries; i++ ) | |
|             sps_virtual_boundaries_pos_x[ i ] | u(13) |
|         sps_num_hor_virtual_boundaries | u(2) |
|         for( i = 0; i < sps_num_hor_virtual_boundaries; i++ ) | |
|             sps_virtual_boundaries_pos_y[ i ] | u(13) |
|     } | |
|   } | |
|   if( sps_ptl_dpb_hrd_params_present_flag ) { | |
|     sps_general_hrd_params_present_flag | u(1) |
|     if( sps_general_hrd_params_present_flag ) { | |
|         general_hrd_parameters( ) | |
|         if( sps_max_sublayers_minus1 > 0 ) | |
|             sps_sublayer_cpb_params_present_flag | u(1) |
|         firstSubLayer = sps_sublayer_cpb_params_present_flag ? 0 : sps_max_sublayers_minus1 | |
|         ols_hrd_parameters( firstSubLayer, sps_max_sublayers_minus1 ) | |
|     } | |
|   } | |
|   field_seq_flag | u(1) |
|   vui_parameters_present_flag | u(1) |
|   if( vui_parameters_present_flag ) | |
|     vui_parameters( ) /* Specified in ITU-T H.SEI \| ISO/IEC 23002-7 */ | |
|   sps_extension_flag | u(1) |
|   if( sps_extension_flag) | |
|     while( more_rbsp_data( ) ) | |
|         sps_extension_data_flag | u(1) |
|   rbsp_trailing_bits( ) | |
| } | |

TABLE 7

Sequence parameter set RBSP semantics

An SPS RBSP shall be available to the decoding process prior to it being referenced, included in at least one AU with TemporalId equal to 0 or provided through external means.
All SPS NAL units with a particular value of sps_seq_parameter_set_id in a CVS shall have the same content.
sps_seq_parameter_set_id provides an identifier for the SPS for reference by other syntax elements.
SPS NAL units, regardless of the nuh_layer_id values, share the same value space of sps_seq_parameter_set_id.
Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.
sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS.
- No VPS is referred to when decoding each CLVS referring to the SPS.
- The value of vps_max_layers_minus1 is inferred to be equal to 0.
- The CVS shall contain only one layer (i.e., all VCL NAL units in the CVS shall have the same value of nuh_layer_id).
- The value of GeneralLayerIdx[ nuh_layer_id ] is inferred to be equal to 0.
- The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.
sps_max_sublayers_minus1 plus 1 specifies the maximum number of temporal sublayers that may be present in each CLVS referring to the SPS. The value of sps max sublayers minus1 shall be in the range of 0 to vps_max_sublayers_minus1, inclusive.
sps_reserved_zero_4bits shall be equal to 0 in bitstreams conforming to this version of this Specification. Other values for sps_reserved_zero_4bits are reserved for future use by ITU-T | ISO/IEC.
sps ptl dpb hrd cpb_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_cpb_params_present_flag shall be equal to vps_independent_layer_flag[ GeneralLayerIdx[ nuh_layer_id ] ].
gdr_enabled_flag equal to 1 specifies that GDR pictures may be present in CLVSs referring to the SPS. gdr_enabled_flag equal to 0 specifies that GDR pictures are not present in CLVSs referring to the SPS.
chroma_format_idc specifies the chroma sampling relative to the luma sampling as specified in clause 6.2.
separate_colour_plane_flag equal to 1 specifies that the three colour components of the 4:4:4 chroma format are coded separately, separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.
  NOTE 1 - There is no dependency in decoding processes between the colour planes having different colour_plane_id values. For example, the decoding process of a monochrome picture with one value of colour_plane_id does not use any data from monochrome pictures having different values of colour_plane_id for inter prediction.
Depending on the value of separate_colour_plane_flag, the value of the variable ChromaArrayType is assigned as follows:
- If separate_colour_plane_flag is equal to 0, ChromaArrayType is set equal to chroma_format_idc.
- Otherwise (separate_colour_plane_flag is equal to 1), ChromaArrayType is set equal to 0.
res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS.
pic_width_max_in_luma_samples specifies the maximum width, in units of luma samples, of each decoded picture referring to the SPS. pic_width_max_in_luma_samples shall not be equal to 0 and shall be an integer multiple of Max( 8, MinCbSizeY).
It is a requirement of bitstream conformance that, for any OLS with OLS index i that contains one or more layers that refers to the SPS, the value of pic_width_max_in_luma_samples shall be less than or equal to the value of ols_dpb_pic_width[ i ].
pic_height_max_in_luma_samples specifies the maximum height, in units of luma

TABLE 7-continued

Sequence parameter set RBSP semantics samples, of each decoded picture referring to the SPS. pic_height_max_in_luma_samples shall not be equal to 0 and shall be an integer multiple of Max( 8, MinCbSizeY).
It is a requirement of bitstream conformance that, for any OLS with OLS index i that contains one or more layers that refers to the SPS, the value of pic_height_max_in_luma_samples shall be less than or equal to the value of ols_dpb_pic_height[ i ].
sps_conformance_window_flag equal to 1 indicates that the conformance cropping window offset parameters follow next in the SPS. sps_conformance_window_flag equal to 0 indicates that the conformance cropping window offset parameters are not present in the SPS.
sps_conf_win_left_offset, sps_conf_win_right_offset, sps_conf_win_top_offset, and sps_conf_win_bottom_offset specify the cropping window that is applied to pictures with pic_width_in_luma_samples equal to pic_width_max_in_luma_samples and pic_height_in_luma_samples equal to pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.
The conformance cropping window contains the luma samples with horizontal picture coordinates from SubWidthC * sps_conf_win_left_offset to
pic_width_max_in_luma_samples − ( SubWidthC * sps_conf_win_right_offset + 1 ) and vertical picture coordinates from SubHeightC * sps_conf_win_top_offset to
pic_height_max_in_luma_samples − ( SubHeightC * sps_conf_win_bottom_offset + 1 ), inclusive.
The value of SubWidthC * ( sps_conf_win left offset + sps_conf_win_right_offset) shall be less than pic_width_max_in_luma_samples, and the value of
SubHeightC * ( sps_conf_win_top_offset + sps_conf_win_bottom_offset) shall be less than pic_height_max_in_luma_samples.
When ChromaArrayType is not equal to 0, the corresponding specified samples of the two chroma arrays are the samples having picture coordinates ( x / SubWidthC,
y / SubHeightC ), where (x, y ) are the picture coordinates of the specified luma samples.
   NOTE 2 - The conformance cropping window offset parameters are only applied at the output. All internal decoding processes are applied to the uncropped picture size.
sps_log2_ctu_size_minus5 plus 5 specifies the luma coding tree block size of each CTU. The value of sps_log2_ctu_size_minus5 shall be in the range of 0 to 2, inclusive. The value 3 for sps_log2_ctu_size_minus5 is reserved for future use by ITU-T | ISO/IEC.
The variables CtbLog2SizeY and CtbSizeY are derived as follows:
    CtbLog2SizeY = sps_log2_ctu_size_minus5 + 5
     (43)
    CtbSizeY =1 << CtbLog2SizeY (44)
subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.
When res_change_in_clvs_allowed_flag is equal to 1, the value of
subpic_info_present_flag shall be equal to 0.
   NOTE 3 - When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.
sps_num_subpics_minus1 plus 1 specifies the number of subpictures in each picture in the CLVS. The value of sps_num_subpics_minus1 shall be in the range of 0 to
Ceil( pic_width_max_in_luma_samples ÷ CtbSizeY ) *
Ceil( pic_height_max_in_luma_samples ÷ CtbSizeY ) − 1, inclusive. When not present, the value of sps_num_subpics_minus1 is inferred to be equal to 0.
sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 0.
subpic_ctu_top_left_x[ i ] specifies horizontal position of top left CTU of i-th subpicture in unit of CtbSizeY. The length of the syntax element is
Ceil( Log2( ( pic_width_max_in_luma_samples + CtbSizeY − 1) >> CtbLog2SizeY ) )
bits. When not present, the value of subpic_ctu_top_left_x[ i ] is inferred to be equal to 0.
subpic_ctu_top_left_y[ i ] specifies vertical position of top left CTU of i-th subpicture in unit of CtbSizeY. The length of the syntax element is
Ceil( Log2( ( pic_height_max_in_luma_samples + CtbSizeY − 1 ) >> CtbLog2SizeY ) )
bits. When not present, the value of subpic_ctu_top_left_y[ i ] is inferred to be equal to 0.
subpic width minus1[ i ] plus 1 specifies the width of the i-th subpicture in units of CtbSizeY. The length of the syntax element is
Ceil( Log2( ( pic_width_max_in_luma_samples + CtbSizeY − 1 ) >> CtbLog2SizeY ) )
bits. When not present, the value of subpic_width_minus1[ i ] is inferred to be equal to
( ( pic_width_max_in_luma_samples + CtbSizeY− 1 ) >> CtbLog2SizeY ) − subpic_ctu_top_left_x[ i ] − 1.
subpic_height_minus1[ i ] plus 1 specifies the height of the i-th subpicture in units of CtbSizeY. The length of the syntax element is
Ceil( Log2( ( pic_height_max_in_luma_samples + CtbSizeY − 1 ) >> CtbLog2SizeY ) )
bits. When not present, the value of subpic_height_minus1[ i ] is inferred to be equal to TABLE 7-continued Sequence parameter set RBSP semantics ( ( pic_height_max_in_luma_samples + CtbSizeY− 1 ) >> CtbLog2SizeY ) − subpic_ctu_
top_left_y[ i ] − 1.
subpic_treated_as_pic_flag[ i ] equal to 1 specifies that the i-th subpicture of each coded
picture in the CLVS is treated as a picture in the decoding process excluding in-loop
filtering operations. subpic_treated_as_pic_flag[ i ] equal to 0 specifies that the i-th
subpicture of each coded picture in the CLVS is not treated as a picture in the decoding
process excluding in-loop filtering operations. When not present, the value of
subpic_treated_as_pic_flag[ i ] is inferred to be equal to sps_independent_subpics_flag.
When subpic_treated_as_pic_flag[ i ] is equal to 1, it is a requirement of bitstream
conformance that all of the following conditions are true for each output layer and its
reference layers in an OLS that includes the layer containing the i-th subpicture as an
output layer:
- All pictures in the output layer and its reference layers shall have the same value of
  pic_width_in_luma_samples and the same value of pic_height_in_luma_samples.
- All the SPSs referred to by the output layer and its reference layers shall have the same
  value of sps_num_subpics_minus1 and shall have the same values of
  subpic_ctu_top_left_x[ j ], subpic_ctu_top_left_y[ j ], subpic_width_minus1[ j ],
  subpic_height_minus1[ j ], and loop_filter_across_subpic_enabled_flag[ j ],
  respectively, for each value of j in the range of 0 to sps_num_subpics_minus1,
  inclusive.
- All pictures in each access unit in the output layer and its reference layers shall have
  the same value of SubpicIdVal[ j ] for each value of j in the range of 0 to
  sps_num_subpics_minus1, inclusive.
loop_filter_across_subpic_enabled_flag[ i ] equal to 1 specifies that in-loop filtering
operations may be performed across the boundaries of the i-th subpicture in each coded
picture in the CLVS. loop_filter_across_subpic_enabled_flag[ i ] equal to 0 specifies that
in-loop filtering operations are not performed across the boundaries of the i-th subpicture
in each coded picture in the CLVS. When not present, the value of
loop_filter_across_subpic_enabled_pic_flag[ i ] is inferred to be equal to
1 − sps_independent_subpics_flag.
It is a requirement of bitstream conformance that the shapes of the subpictures shall be
such that each subpicture, when decoded, shall have its entire left boundary and entire top
boundary consisting of picture boundaries or consisting of boundaries of previously
decoded subpictures.
sps_subpic_id_len_minus1 plus 1 specifies the number of bits used to represent the
syntax_element_sps_subpic_id[ i ], the syntax elements pps_subpic_id[ i ], when present,
and the syntax element slice_subpic_id, when present. The value of
sps_subpic_id_len_minus1 shall be in the range of 0 to 15, inclusive. The value of
1 << ( sps_subpic_id_len_minus1 + 1) shall be greater than or equal to
sps_num_subpics_minus1 + 1.
subpic_id_mapping_explicitly_signalled_flag equal to 1 specifies that the subpicture ID
mapping is explicitly signalled, either in the SPS or in the PPSs referred to by coded
pictures of the CLVS. subpic_id_mapping_explicitly_signalled_flag equal to 0 specifies
that the subpicture ID mapping is not explicitly signalled for the CLVS. When not present,
the value of subpic_id_mapping_explicitly_signalled_flag is inferred to be equal to 0.
subpic_id_mapping_in_sps_flag equal to 1 specifies that the subpicture ID mapping is
signalled in the SPS when subpic_id_mapping_explicitly_signalled_flag is equal to 1.
subpic_id_mapping_in_sps_flag equal to 0 specifies that subpicture ID mapping is
signalled in the PPSs referred to by coded pictures of the CLVS when
subpic_id_mapping_explicitly_signalled_flag is equal to 1.
sps_subpic_id[ i ] specifies the subpicture ID of the i-th subpicture. The length of the
sps_subpic_id[ i ] syntax element is sps_subpic_id_len_minus1 + 1 bits.
bit_depth_minus8 specifies the bit depth of the samples of the luma and chroma arrays,
BitDepth, and the value of the luma and chroma quantization parameter range offset,
QpBdOffset, as follows:
    BitDepth = 8 + bit_depth_minus8                                           (45)
    QpBdOffset = 6 * bit_depth_minus8                                          (46)
bit_depth_minus8 shall be in the range of 0 to 8, inclusive.
sps_entropy_coding_sync_enabled_flag equal to 1 specifies that a specific
synchronization process for context variables is invoked before decoding the CTU that
includes the first CTB of a row of CTBs in each tile in each picture referring to the SPS,
and a specific storage process for context variables is invoked after decoding the CTU that
includes the first CTB of a row of CTBs in each tile in each picture referring to the SPS.
sps_entropy_coding_sync_enabled_flag equal to 0 specifies that no specific
synchronization process for context variables is required to be invoked before decoding the
CTU that includes the first CTB of a row of CTBs in each tile in each picture referring to
the SPS, and no specific storage process for context variables is required to be invoked
after decoding the CTU that includes the first CTB of a row of CTBs in each tile in each
picture referring to the SPS.
sps_wpp_entry_point_offsets_present_flag equal to 1 specifies that signalling for entry
point offsets for CTU rows may be present in the slice headers of pictures referring to the
SPS when sps_entropy_coding_sync_enabled_flag is equal to 1.
sps_wpp_entry_point_offsets_present_flag equal to 0 specifies that signalling for entry
point offsets for CTU rows are not present in the slice headers of pictures referring to the
SPS. When not present, the value of sps_wpp_entry_point_offsets_present_flag is inferred
to be equal to 0.
sps_weighted_pred_flag equal to 1 specifies that weighted prediction may be applied to P
slices referring to the SPS. sps_weighted_pred_flag equal to 0 specifies that weighted

TABLE 7-continued

Sequence parameter set RBSP semantics prediction is not applied to P slices referring to the SPS.
sps_weighted_bipred_flag equal to 1 specifies that explicit weighted prediction may be
applied to B slices referring to the SPS. sps_weighted_bipred_flag equal to 0 specifies that
explicit weighted prediction is not applied to B slices referring to the SPS.
log2_max_pic_order_cnt_lsb_minus4 specifies the value of the variable
MaxPicOrderCntLsb that is used in the decoding process for picture order count as
follows:

$$\text{MaxPicOrderCntLsb} = 2^{(\log2\_max\_pic\_order\_cnt\_lsb\_minus + 4)} \qquad (47)$$

The value of log2_max_pic_order_cnt_lsb_minus4 shall be in the range of 0 to 12,
inclusive.
sps_poc_msb_flag equal to 1 specifies that the ph_poc_msb present flag syntax element
is present in PHs referring to the SPS. sps_poc_msb_flag equal to 0 specifies that the
ph_poc_msb_present_flag syntax element is not present in PHs referring to the SPS.
poc_msb_len_minus1 plus 1 specifies the length, in bits, of the poc_msb_val_syntax
elements, when present in the PHs referring to the SPS. The value of poc_msb_len_minus1
shall be in the range of 0 to 32 − log2_max_pic_order_cnt_lsb_minus4 − 5, inclusive.
num_extra_ph_bits_bytes specifies the number of bytes of extra bits in the PH syntax
structure for coded pictures referring to the SPS. The value of num_extra_ph_bits_bytes
shall be equal to 0 in bitstreams conforming to this version of this Specification. Although
the value of num_extra_ph_bits_bytes is required to be equal to 0 in this version of this
Specification, decoder conforming to this version of this Specification shall allow the value
of num_extra_ph_bits_bytes equal to 1 or 2 to appear in the syntax.
num_extra_sh_bits_bytes specifies the number of bytes of extra bits in the slice headers
for coded pictures referring to the SPS. The value of num_extra_sh_bits_bytes shall be
equal to 0 in bitstreams conforming to this version of this Specification. Although the value
of num_extra_sh_bits_bytes is required to be equal to 0 in this version of this
Specification, decoder conforming to this version of this Specification shall allow the value
of num_extra_sh_bits_bytes equal to 1 or 2 to appear in the syntax.
sps_sublayer_dpb_params_flag is used to control the presence of
max_dec_pic_buffering_minus1[ i ], max_num_reorder_pics[ i ], and
max_latency_increase_plus1[ i ] syntax elements in the dpb_parameters( ) syntax strucure
in the SPS. When not present, the value of sps_sub_dpb_params_info_present_flag is
inferred to be equal to 0.
long_term_ref_pics_flag equal to 0 specifies that no LTRP is used for inter prediction of
any coded picture in the CLVS. long_term_ref_pics_flag equal to 1 specifies that LTRPs
may be used for inter prediction of one or more coded pictures in the CLVS.
inter_layer_ref_pics_present_flag equal to 0 specifies that no ILRP is used for inter
prediction of any coded picture in the CLVS. inter_layer_ref_pics_present_flag equal to 1
specifies that ILRPs may be used for inter prediction of one or more coded pictures in the
CLVS. When sps_video_parameter_set_id is equal to 0, the value of
inter_layer_ref_pics_present_flag is inferred to be equal to 0. When
vps_independent_layer_flag[ GeneralLayerIdx[ nuh_layer_id ] ] is equal to 1, the value of
inter_layer_ref_pics_present_flag shall be equal to 0.
sps_idr_rpl_present_flag equal to 1 specifies that reference picture list syntax elements
are present in slice headers of IDR pictures, sps_idr_rpl_present_flag equal to 0 specifies
that reference picture list syntax elements are not present in slice headers of IDR pictures.
rpl1_same_as_rpl0_flag equal to 1 specifies that the syntax element
num_ref_pic_lists_in_sps[ 1 ] and the syntax structure ref_pic_list_struct( 1, rplsIdx ) are
not present and the following applies:
- The value of num_ref_pic_lists_in_sps[ 1 ] is inferred to be equal to the value of
  num_ref_pic_lists_in_sps[ 0 ].
- The value of each of syntax elements in ref_pic_list_struct( 1, rplsIdx) is inferred to be
  equal to the value of corresponding syntax element in ref_pic_list_struct( 0, rplsIdx )
  for rplsIdx ranging from 0 to num_ref_pic_lists_in_sps[ 0 ] − 1.
num_ref_pic_lists_in_sps[ i ] specifies the number of the ref_pic_list_struct( listIdx,
rplsidx ) syntax structures with listIdx equal to i included in the SPS. The value of
num_ref_pic_lists_in_sps[ i ] shall be in the range of 0 to 64, inclusive.
  NOTE 4 - For each value of listidx (equal to 0 or 1), a decoder should allocate memory
  for a total number of num_ref_pic_lists_in_sps[ i ] + 1
  ref_pic_list_struct( listIdx, rplsIdx ) syntax structures since there may be one
  ref_pic_list_struct( listIdx, rplsIdx ) syntax structure directly signalled in the slice
  headers of a current picture.
qtbtt_dual_tree_intra_flag equal to 1 specifies that, for I slices, each CTU is split into
coding units with 64×64 luma samples using an implicit quadtree split, and these coding
units are the root of two separate coding_tree syntax structure for luma and chroma,
qtbtt_dual_tree_intra_flag equal to 0 specifies separate coding_tree syntax structure is not
used for I slices. When qtbtt_dual_tree_intra_flag is not present, it is inferred to be equal to
0.
log2_min_luma_coding_block_size_minus2 plus 2 specifies the minimum luma coding
block size. The value range of log2_min_luma_coding_block_size_minus2 shall be in the
range of 0 to Min( 4, sps_log2_ctu_size_minus5 + 3 ), inclusive.
The variables MinCbLog2SizeY, MinCbSizeY, IbcBufWidthY, IbcBufWidthC and Vsize
are derived as follows:

$$\text{MinCbLog2SizeY} = \log2\_min\_luma\_coding\_block\_size\_minus2 + 2 \qquad (48)$$
$$\text{MinCbSizeY} = 1 << \text{MinCbLog2SizeY} \qquad (49)$$
$$\text{IbcBufWidthY} = 256 * 128 / \text{CtbSizeY} \qquad (50)$$
$$\text{IbcBufWidthC} = \text{IbcBufWidthY} / \text{SubWidthC} \qquad (51)$$
$$\text{VSize} = \text{Min}( 64, \text{CtbSizeY} ) \qquad (52)$$

TABLE 7-continued

Sequence parameter set RBSP semantics

The value of MinCbSizeY shall less than or equal to VSize.
The variables CtbWidthC and CtbHeightC, which specify the width and height,
respectively, of the array for each chroma CTB, are derived as follows:
- If chroma_format_idc is equal to 0 (monochrome) or separate_colour_plane_flag is
  equal to 1, CtbWidthC and CtbHeightC are both equal to 0.
- Otherwise, CtbWidthC and CtbHeightC are derived as follows:
  CtbWidthC = CtbSizeY / SubWidthC        (53)
  CtbHeightC = CtbSizeY / SubHeightC      (54)
For log2BlockWidth ranging from 0 to 4 and for log2BlockHeight ranging from 0 to 4,
inclusive, the up-right diagonal scan order array initialization process as specified in
clause 6.5.2 is invoked with 1 << log2BlockWidth and 1 << log2BlockHeight as inputs,
and the output is assigned to DiagScanOrder[ log2BlockWidth ][ log2BlockHeight ].
For log2BlockWidth ranging from 0 to 6 and for log2BlockHeight ranging from 0 to 6,
inclusive, the horizontal and vertical traverse scan order array initialization process as
specified in clause 6.5.3 is invoked with 1 << log2BlockWidth and
1 << log2BlockHeight as inputs, and the output is assigned to
HorTravScanOrder[ log2BlockWidth ][ log2BlockHeight ] and
VerTravScanOrder[ log2BlockWidth ][ log2BlockHeight ].
partition_constraints_override_enabled_flag equal to 1 specifies the presence of
partition_constraints_override_flag in PHs referring to the SPS.
partition_constraints_override_enabled_flag equal to 0 specifies the absence of
partition_constraints_override_flag in PHs referring to the SPS.
sps_log2_diff_min_qt_min_cb_intra_slice_luma specifies the default difference between
the base 2 logarithm of the minimum size in luma samples of a luma leaf block resulting
from quadtree splitting of a CTU and the base 2 logarithm of the minimum coding block
size in luma samples for luma CUs in slices with slice type equal to 2 (I) referring to the
SPS. When partition_constraints_override_enabled_flag is equal to 1, the default difference
can be overridden by ph_log2_diff_min_qt_min_cb_luma present in PHs referring to the
SPS. The value of sps_log2_diff_min_qt_min_cb_intra_slice_luma shall be in the range of
0 to CtbLog2SizeY − MinCbLog2SizeY, inclusive. The base 2 logarithm of the minimum
size in luma samples of a luma leaf block resulting from quadtree splitting of a CTU is
derived as follows:
    MinQtLog2SizeIntraY = sps_log2_diff_min_qt_min_cb_intra_slice_luma +
    MinCbLog2SizeY          (55)
sps_max_mtt_hierarchy_depth_intra_slice_luma specifies the default maximum
hierarchy depth for coding units resulting from multi-type tree splitting of a quadtree leaf
in slices with slice type equal to 2 (I) referring to the SPS. When
partition_constraints_override_enabled_flag is equal to 1, the default maximum hierarchy
depth can be overridden by ph_max_mtt_hierarchy_depth_intra_slice_luma present in PHs
referring to the SPS. The value of sps_max_mtt_hierarchy_depth_intra_slice_luma shall be
in the range of 0 to 2*( CtbLog2SizeY − MinCbLog2SizeY ), inclusive.
sps_log2_diff_max_bt_min_qt_intra_slice_luma specifies the default difference between
the base 2 logarithm of the maximum size (width or height) in luma samples of a luma
coding block that can be split using a binary split and the minimum size (width or height)
in luma samples of a luma leaf block resulting from quadtree splitting of a CTU in slices
with slice_type equal to 2 (1) referring to the SPS. When
partition_constraints_override_enabled_flag is equal to 1, the default difference can be
overridden by ph_log2_diff_max_bt_min_qt_luma present in PHs referring to the SPS.
The value of sps_log2_diff_max_bt_min_qt_intra_slice_luma shall be in the range of 0 to
CtbLog2SizeY − MinQtLog2SizeIntraY, inclusive. When
sps_log2_diff_max_bt_min_qt_intra_slice_luma is not present, the value of
sps_log2_diff_max_bt_min_qt_intra_slice_luma is inferred to be equal to 0.
sps_log2_diff_max_tt_min_qt_intra_slice_luma specifies the default difference between
the base 2 logarithm of the maximum size (width or height) in luma samples of a luma
coding block that can be split using a ternary split and the minimum size (width or height)
in luma samples of a luma leaf block resulting from quadtree splitting of a CTU in slices
with slice_type equal to 2 (1) referring to the SPS. When
partition_constraints_override_enabled_flag is equal to 1, the default difference can be
overridden by ph_log2_diff_max_tt_min_qt_luma present in PHs referring to the SPS. The
value of sps_log2_diff_max_tt_min_qt_intra_slice_luma shall be in the range of 0 to
CtbLog2SizeY − MinQtLog2SizeIntraY, inclusive. When
sps_log2_diff_max_tt_min_qt_intra_slice_luma is not present, the value of
sps_log2_diff_max_tt_min_qt_intra_slice_luma is inferred to be equal to 0.
sps_log2_diff_min_qt_min_cb_inter_slice specifies the default difference between the
base 2 logarithm of the minimum size in luma samples of a luma leaf block resulting from
quadtree splitting of a CTU and the base 2 logarithm of the minimum luma coding block
size in luma samples for luma CUs in slices with slice type equal to 0 (B) or 1 (P) referring
to the SPS. When partition_constraints_override_enabled_flag is equal to 1, the default
difference can be overridden by ph_log2_diff_min_qt_min_cb_luma present in PHs
referring to the SPS. The value of sps_log2_diff_min_qt_min_cb_inter_slice shall be in the
range of 0 to CtbLog2SizeY − MinCbLog2SizeY, inclusive. The base 2 logarithm of the
minimum size in luma samples of a luma leaf block resulting from quadtree splitting of a
CTU is derived as follows:
    MinQtLog2SizeInterY = sps_log2_diff_min_qt_min_cb_inter_slice +
    MinCbLog2SizeY          (56)
sps_max_mtt_hierarchy_depth_inter_slice specifies the default maximum hierarchy
depth for coding units resulting from multi-type tree splitting of a quadtree leaf in slices
with slice_type equal to 0 (B) or 1 (P) referring to the SPS. When

TABLE 7-continued

Sequence parameter set RBSP semantics partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice shall be in the range of 0 to 2*( CtbLog2SizeY − MinCbLog2SizeY ), inclusive.

sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 0 (B) or 1 (P) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_inter_slice shall be in the range of 0 to CtbLog2SizeY − MinQtLog2SizeInterY, inclusive. When sps_log2_diff_max_bt_min_qt_inter_slice is not present, the value of sps_log2_diff_max_bt_min_qt_inter_slice is inferred to be equal to 0.

sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_inter_slice shall be in the range of 0 to CtbLog2SizeY − MinQtLog2SizeInterY, inclusive. When sps_log2_diff_max_tt_min_qt_inter_slice is not present, the value of sps_log2_diff_max_tt_min_qt_inter_slice is inferred to be equal to 0.

sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by ph_log2_diff_min_qt_min_cb_chroma present in PHs referring to the SPS. The value of sps_log2_diff_min_qt_min_cb_intra_slice_chroma shall be in the range of 0 to CtbLog2SizeY − MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

MinQtLog2SizeIntraC = sps_log2_diff_min_qt_min_cb_intra_slice_chroma + MinCbLog2SizeY     (57)

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma shall be in the range of 0 to 2*( CtbLog2SizeY − MinCbLog2SizeY ), inclusive. When not present, the value of sps_max_mtt_hierarchy_depth_intra_slice_chroma is inferred to be equal to 0.

sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log2_diff_max_bt_min_qt_chroma present in PHs referring to the SPS. The value of sps_log2_diff_max_bt_min_qt_intra_slice_chroma shall be in the range of 0 to CtbLog2SizeY − MinQtLog2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.

sps_log2_diff_max_tt_min_qt intra slice chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice type equal to 2 (I) referring to the SPS. When partition_constraints_override_enabled_flag is equal to 1, the default difference can be overridden by ph_log2_diff_max_tt_min_qt_chroma present in PHs referring to the SPS. The value of sps_log2_diff_max_tt_min_qt_intra_slice chroma shall be in the range of 0 to CtbLog2SizeY − MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

TABLE 7-continued

Sequence parameter set RBSP semantics

When CtbSizeY is less than 64, the value of sps_max_luma_transform_size_64_flag shall be equal to 0.
The variables MinTbLog2SizeY, MaxTbLog2SizeY, MinTbSizeY, and MaxTbSizeY are derived as follows:

MinTbLog2SizeY = 2     (58)
    MaxTbLog2SizeY = sps_max_luma_transform_size_64_flag ? 6 : 5     (59)
    MinTbSizeY =1 << MinTbLog2SizeY     (60)
    MaxTbSizeY =1 << MaxTbLog2SizeY     (61)

sps_joint_cbcr_enabled_flag equal to 0 specifies that the joint coding of chroma residuals is disabled, sps_joint_cbcr_enabled_flag equal to 1 specifies that the joint coding of chroma residuals is enabled. When not present, the value of sps_joint_cbcr_enabled_flag is inferred to be equal to 0.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[ i ] plus 26 specifies the starting luma and chroma QP used to describe the i-th chroma QP mapping table. The value of qp_table_start_minus26[ i ] shall be in the range of −26 − QpBdOffset to 36 inclusive. When qp_table_start_minus26[ i ] is not present in the bitstream, the value of qp_table_start_minus26[ i ] is inferred to be equal to 0.

num_points_in_qp_table_minus1 i 1 plus 1 specifies the number of points used to describe the i-th chroma QP mapping table. The value of num_points_in_qp_table_minus1[ i ] shall be in the range of 0 to 63 + QpBdOffset, inclusive. When num_points_in_qp_table_minus1[ 0 ] is not present in the bitstream, the value of num_points_in_qp_table_minus1[ 0 ] is inferred to be equal to 0.

delta_qp_in_val_minus1[ i ][ j ] specifies a delta value used to derive the input coordinate of the j-th pivot point of the i-th chroma QP mapping table. When delta_qp_in_val_minus1[ 0 ][ j ] is not present in the bitstream, the value of delta_qp_in_val_minus1[ 0 ][ j ] is inferred to be equal to 0.

delta_qp_diff_val[ i ][ j ] specifies a delta value used to derive the output coordinate of the j-th pivot point of the i-th chroma QP mapping table.

The i-th chroma QP mapping table ChromaQpTable[ i ] for i = 0.mumQpTables − 1 is derived as follows:

qpInVal[ i ][ 0 ] = qp_table_start_minus26[ i ] + 26
    qpOutVal[ i ][ 0 ] = qpInVal[ i ][ 0 ]
    for( j = 0; j <= num_points_in_qp_table_minus1[ i ]; j++ ) {
      qpInVal[ i ][ j + 1 ] = qpInVal[ i ][ j ] + delta_qp_in_val_minus1[ i ][ j ] + 1
      qpOutVal[ i ][ j + 1 ] = qpOutVal[ i ][ j ] +
    ( delta_qp_in_val_minus1[ i ][ j ] ^ delta_qp_diff_val[ i ][ j ] )
    }
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63,
ChromaQpTable[ i ][ k + 1 ] − 1 )     (62)
for( j = 0; j <= num_points_in_qp_table_minus1[ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
      ChromaQpTable[ i ][ k ] = ChromaQpTable[ i ][ qpInVal[ i ][ j ] ] +
      ( ( qpOutVal[ i ][j + 1] − qpOutVal[ i ][j] ) * m + sh ) /
( delta_qp_in_val_minus1[ i ][ j ] + 1 )
}
for( k = qpInVal[ i ][ num_points_in_qp_table_minus1[ i ] + 1 ] + 1; k <= 63; k++ )
    ChromaQpTable[ i ][ k ] = Clip3( −QpBdOffset, 63, ChromaQpTable[ i ][ k − 1 ] + 1)

When same_qp_table_for_chroma is equal to 1, ChromaQpTable[ 1 ][ k ] and ChromaQpTable[ 2 ][ k ] are set equal to ChromaQpTable[ 0 ][ k ] for k in the range of −QpBdOffset to 63, inclusive.

It is a requirement of bitstream conformance that the values of qpInVal[ i ][ j ] and qpOutVal[ i ][ j ] shall be in the range of −QpBdOffset to 63, inclusive for i in the range of 0 to numQpTables − 1, inclusive, and j in the range of 0 to num_points_in_qp_table_minus1[ i ] + 1, inclusive.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_cc_alf_enabled_flag equal to 0 specifies that the cross-component adaptive loop filter is disabled, sps_cc_alf_enabled_flag equal to 1 specifies that the cross-component adaptive loop filter may be enabled.

sps_transform_skip_enabled_flag equa to 1 specifies that transform skip flag may be present in the transform unit syntax, sps_transform_skip_enabled_flag equal to 0 specifies that transform_skip_flag is not present in the transform unit syntax.

log2_transform_skip_max_size_minus2 specifies the maximum block size used for

TABLE 7-continued

Sequence parameter set RBSP semantics transform skip, and shall be in the range of 0 to 3, inclusive.
The variable MaxTsSize is set equal to
1 << ( log2_transform_skip_max_size_minus2 + 2 ).
sps_bdpcm_enabled_flag equal to 1 specifies that intra_bdpcm_luma_flag and
intra_bdpcm_chroma_flag may be present in the coding unit syntax for intra coding units,
sps_bdpcm_enabled_flag equal to 0 specifies that intra_bdpcm_luma_flag and
intra_bdpcm_chroma_flag are not present in the coding unit syntax for intra coding units.
When not present, the value of sps_bdpcm_enabled_flag is inferred to be equal to 0.
sps_ref_wraparound_enabled_flag equal to 1 specifies that horizontal wrap-around
motion compensation is applied in inter prediction, sps_ref_wraparound_enabled_flag
equal to 0 specifies that horizontal wrap-around motion compensation is not applied. When
the value of (CtbSizeY / MinCbSizeY + 1) is greater than (pic_width_in_luma_samples /
MinCbSizeY − 1 ), where pic_width_in_luma_samples is the value of
pic_width_in_luma_samples in any PPS that refers to the SPS, the value of
sps_ref_wraparound_enabled_flag shall be equal to 0.
sps_temporal_mvp_enabled_flag equal to 1 specifies that temporal motion vector
predictors may be used in the CLVS. sps_temporal_mvp_enabled_flag equal to 0 specifies
that temporal motion vector predictors are not used in the CLVS.
sps_sbtmvp_enabled_flag equal to 1 specifies that subblock-based temporal motion
vector predictors may be used in decoding of pictures with all slices having slice_type not
equal to I in the CLVS. sps_sbtmvp_enabled_flag equal to 0 specifies that subblock-based
temporal motion vector predictors are not used in the CLVS. When
sps_sbtmvp_enabled_flag is not present, it is inferred to be equal to 0.
sps_amvr_enabled_flag equal to 1 specifies that adaptive motion vector difference
resolution is used in motion vector coding, amvr_enabled_flag equal to 0 specifies that
adaptive motion vector difference resolution is not used in motion vector coding.
sps_bdof_enabled_flag equal to 0 specifies that the bi-directional optical flow inter
prediction is disabled, sps_bdof_enabled_flag equal to 1 specifies that the bi-directional
optical flow inter prediction is enabled.
sps_bdof_pic_present_flag equal to 1 specifies that ph_disable_bdof_flag is present in
PHs referring to the SPS. sps_bdof_pic_present_flag equal to 0 specifies that
ph_disable_bdof_flag is not present in PHs referring to the SPS. When
sps_bdof_pic_present_flag is not present, the value of sps_bdof_pic_present_flag is
inferred to be equal to 0.
sps_smvd_enabled_flag equal to 1 specifies that symmetric motion vector difference may
be used in motion vector decoding, sps_smvd_enabled_flag equal to 0 specifies that
symmetric motion vector difference is not used in motion vector coding.
sps_dmvr_enabled_flag equal to 1 specifies that decoder motion vector refinement based
inter bi-prediction is enabled, sps_dmvr_enabled_flag equal to 0 specifies that decoder
motion vector refinement based inter bi-prediction is disabled.
sps_dmvr_pic_present_flag equal to 1 specifies that ph_disable_dmvr_flag is present in
PHs referring to the SPS. sps_dmvr_pic_present_flag equal to 0 specifies that
ph_disable_dmvr_flag is not present in PHs referring to the SPS. When
sps_dmvr_pic_present_flag is not present, the value of sps_dmvr_pic present flag is
inferred to be equal to 0.
sps_mmvd_enabled_flag equal to 1 specifies that merge mode with motion vector
difference is enabled, sps_mmvd_enabled_flag equal to 0 specifies that merge mode with
motion vector difference is disabled.
sps_isp_enabledf_lag equal to 1 specifies that intra prediction with subpartitions is
enabled, sps_isp_enabled_flag equal to 0 specifies that intra prediction with subpartitions is
disabled.
sps_mrl_enabled_flag equal to 1 specifies that intra prediction with multiple reference
lines is enabled, sps_mrl_enabled_flag equal to 0 specifies that intra prediction with
multiple reference lines is disabled.
sps_mip_enabled_flag equal to 1 specifies that matrix-based intra prediction is enabled,
sps_mip_enabled_flag equal to 0 specifies that matrix-based intra prediction is disabled.
sps_cclm_enabled_flag equal to 0 specifies that the cross-component linear model intra
prediction from luma component to chroma component is disabled, sps_cclm_enabled_flag
equal to 1 specifies that the cross-component linear model intra prediction from luma
component to chroma componenent is enabled. When sps_cclm_enabled_flag is not
present, it is inferred to be equal to 0.
sps_chroma_horizontal_collocated_flag equal to 1 specifies that prediction processes
operate in a manner designed for chroma sample positions that are not horizontally shifted
relative to corresponding luma sample positions, sps_chroma_horizontal_collocated_flag
equal to 0 specifies that prediction processes operate in a manner designed for chroma
sample positions that are shifted to the right by 0.5 in units of luma samples relative to
corresponding luma sample positions. When sps_chroma_horizontal_collocated_lag is not
present, it is inferred to be equal to 1.
sps_chroma_vertical_collocated_flag equal to 1 specifies that prediction processes
operate in a manner designed for chroma sample positions that are not vertically shifted
relative to corresponding luma sample positions, sps_chroma_vertical_collocated_flag
equal to 0 specifies that prediction processes operate in a manner designed for chroma
sample positions that are shifted downward by 0.5 in units of luma samples relative to
corresponding luma sample positions. When sps_chroma_vertical_collocated_flag is not
present, it is inferred to be equal to 1.
sps_mts_enabled_flag equal to 1 specifies that sps_explicit_mts_intra_enabled_flag is
present in the sequence parameter set RBSP syntax and
sps_explicit_mts_inter_enabled_flag is present in the sequence parameter set RBSP syntax, TABLE 7-continued Sequence parameter set RBSP semantics sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.
sps_explicit_mts_intra_enabled_flag equal to 1 specifies that mtsidx may be present in intra coding unit syntax, sps_explicit_mts_intra_enabled_flag equal to 0 specifies that mts idx is not present in intra coding unit syntax. When not present, the value of sps_explicit_mts_intra_enabled_flag is inferred to be equal to 0.
sps_explicit_mts_inter_enabled_flag equal to 1 specifies that mts_idx may be present in inter coding unit syntax, sps_explicit_mts_inter_enabled_flag equal to 0 specifies that mts idx is not present in inter coding unit syntax. When not present, the value of sps_explicit_mts_inter_enabled_flag is inferred to be equal to 0.
six_minus_max_num_merge_cand specifies the maximum number of merging motion vector prediction (MVP) candidates supported in the SPS subtracted from 6. The value of six_minus_max_num_merge_cand shall be in the range of 0 to 5, inclusive.
The maximum number of merging MVP candidates, MaxNumMergeCand, is derived as follows:

$$\text{MaxNumMergeCand} = 6 - \text{six\_minus\_max\_num\_merge\_cand} \quad (63)$$

sps_sbt_enabled_flag equal to 0 specifies that subblock transform for inter-predicted CUs is disabled, sps_sbt_enabled_flag equal to 1 specifies that subblock transform for inter-predicteds CU is enabled.
sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.
five_minus_max_num_subblock_merge_cand specifies the maximum number of subblock-based merging motion vector prediction candidates supported in the SPS subtracted from 5. The value of five_minus_max_num_subblock_merge_cand shall be in the range of 0 to 5, inclusive.
sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.
sps_affine_amvr_enabled_flag equal to 1 specifies that adaptive motion vector difference resolution is used in motion vector coding of affine inter mode.
sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.
sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.
sps_prof_pic_present_flag equal to 1 specifies that ph_disable_prof_flag is present in PHs referring to the SPS. sps_prof_pic_present_flag equal to 0 specifies that ph_disable_prof_flag is not present in PHs referring to the SPS. When sps_prof_pic_present_flag is not present, the value of sps_prof_pic_present_flag is inferred to be equal to 0.
sps_palette_enabled_flag equal to 1 specifies that pred_mode_plt_flag may be present in the coding unit syntax, sps_palette_enabled_flag equal to 0 specifies that pred_mode_plt_flag is not present in the coding unit syntax. When sps_palette_enabled_flag is not present, it is inferred to be equal to 0.
sps_act_enabled_flag equal to 1 specifies that adaptive colour transform may be used and the cu_act_enabled_flag may be present in the coding unit syntax, sps_act_enabled_flag equal to 0 speifies that adaptive colour transform is not used and cu_act_enabled_flag is not present in the coding unit syntax. When sps_act_enabled_flag is not present, it is inferred to be equal to 0.
min_qp_prime_ts_minus4 specifies the minimum allowed quantization parameter for transform skip mode as follows:

$$\text{QpPrimeTsMin} = 4 + \text{min\_qp\_prime\_ts\_minus4} \quad (64)$$

The value of min_qp_prime_ts_minus4 shall be in the range of 0 to 48, inclusive.
sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw idx is not present in coding unit syntax of the CLVS. Otherwise (sps_bcw_enabled_flag is equal to 1), bi-prediction with CU weights can be used in the CLVS.
sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.
six_minus_max_num_ibc_merge_cand, when sps_ibc_enabled_flag is equal to 1, specifies the maximum number of IBC merging block vector prediction (BVP) candidates TABLE 7-continued Sequence parameter set RBSP semantics supported in the SPS subtracted from 6. The value of
six_minus_max_num_ibc_merge_cand shall be in the range of 0 to 5, inclusive.
The maximum number of IBC merging BVP candidates, MaxNumIbcMergeCand, is
derived as follows:
    if( sps_ibc_enabled_flag )
      MaxNumIbcMergeCand = 6 − six_minus_max_num_ibc_merge_cand     (65)
    else
      MaxNumIbcMergeCand = 0
sps_ciip_enabled_flag specifies that ciip_flag may be present in the coding unit syntax for
inter coding units. sps_ciip_enabled_flag equal to 0 specifies that ciip_flag is not present in
the coding unit syntax for inter coding units.
sps_fpel_mmvd_enabled_flag equal to 1 specifies that merge mode with motion vector
difference is using integer sample precision, sps_fpel_mmvd_enabled_flag equal to 0
specifies that merge mode with motion vector difference can use fractional sample
precision.
sps_gpm_enabled_flag specifies whether geometric partition based motion compensation
can be used for inter prediction. sps_gpm_enabled_flag equal to 0 specifies that the syntax
shall be constrained such that no geometric partition based motion compensation is used in
the CLVS, and merge_gpm_partition_idx, merge_gpm_idx0, and merge_gpm_idx1 are not
present in coding unit syntax of the CLVS. sps_gpm_enabled_flag equal to 1 specifies that
geometric partition based motion compensation can be used in the CLVS. When not
present, the value of sps_gpm_enabled_flag is inferred to be equal to 0.
max_num_merge_cand_minus_max_num_gpm_cand specifies the maximum number
of geometric partitioning merge mode candidates supported in the SPS subtracted from
MaxNumMergeCand.
The maximum number of geometric partitioning merge mode candidates,
MaxNumGpmMergeCand, is derived as follows:
    if( spsgpmenabledflag && MaxNumMergeCand >= 3 )
      MaxNumGpmMergeCand = MaxNumMergeCand −
        max_num_merge_cand_minus_max_num_gpm_cand     (66)
    else if( sps_gpm_enabled_flag && MaxNumMergeCand = = 2 )
      MaxNumGpmMergeCand = 2
    else
      MaxNumGpmMergeCand = 0
The value of MaxNumGpmMergeCand shall be in the range of 2 to MaxNumMergeCand,
inclusive.
sps_lmcs_enabled_flag equal to 1 specifies that luma mapping with chroma scaling is
used in the CLVS. sps_lmcs_enabled_flag equal to 0 specifies that luma mapping with
chroma scaling is not used in the CLVS.
sps_lfnst_enabled_flag equal to 1 specifies that lfnst_idx may be present in intra coding
unit syntax, sps_lfnst_enabled_flag equal to 0 specifies that lfnst_idx is not present in intra
coding unit syntax.
sps_ladf_enabled_flag equal to 1, specifies that sps_num_ladf_intervals_minus2,
sps_ladf_lowest_interval_qp_offset, sps_ladf_qp_offset[ i ], and
sps_ladf_delta_threshold_minus1[ i ] are present in the SPS.
sps_num_ladf_intervals_minus2 plus 1 specifies the number of
sps_ladf_delta_threshold_minus1[ i ] and sps_ladf_qp_offset[ i ] syntax elements that are
present in the SPS. The value of sps_num_ladf_intervals_minus2 shall be in the range of 0
to 3, inclusive.
sps_ladf_lowest_interval_qp_offset specifies the offset used to derive the variable qP as
specified in clause 8.8.3.6.1. The value of sps_ladf_lowest_interval_qp_offset shall be in
the range of −63 to 63, inclusive.
sps_ladf_qp_offset[ i ] specifies the offset array used to derive the variable qP as specified
in clause 8.8.3.6.I. The value of sps_ladf_qp_offset[ i ] shall be in the range of −63 to 63,
inclusive.
sps_ladf_delta_threshold_minus1[ i ] is used to compute the values of
SpsLadfIntervalLowerBound[ i ], which specifies the lower bound of the i-th luma
intensity level interval. The value of sps_ladf_delta_threshold_minus1[ i ] shall be in the
range of 0 to 2BDepth − 3, inclusive.
The value of SpsLadfIntervalLowerBound[ 0 ] is set equal to 0.
For each value of i in the range of 0 to sps_num_ladf_intervals_minus2, inclusive, the
variable SpsLadfIntervalLowerBound[ i + 1 ] is derived as follows:
    SpsLadfIntervalLowerBound[ i + 1 ] = SpsLadfIntervalLowerBound[ i ]     (67)
          + sps_ladf_delta_threshold_minus1[ i ] + 1
log2_parallel_merge_level_minus1 plus 2 specifies the value of the variable
Log2ParMrgLevel, which is used in the derivation process for spatial merging candidates
as specified in clause 8.5.2.3, the derivation process for motion vectors and reference
indices in subblock merge mode as specified in clause 8.5.5.2, and to control the invocation
of the updating process for the history-based motion vector predictor list in clause 8.5.2.1.
The value of log2_parallel_merge_level_minus2 shall be in the range of 0 to
CtbLog2SizeY − 2, inclusive. The variable Log2ParMrgLevel is derived as follows:
    Log2ParMrgLevel = log2_parallel_merge_level_minus2 + 2     (68)
sps_scaling_list_enabled_flag equal to 1 specifies that a scaling list is used for the scaling
process for transform coefficients, sps_scaling_list_enabled_flag equal to 0 specifies that
scaling list is not used for the scaling process for transform coefficients.
sps_dep_quant_enabled_flag equal to 0 specifies that dependent quantization is disabled
for pictures referring to the SPS. sps_dep_quant_enabled_flag equal to 1 specifies that
dependent quantization may be enabled for pictures referring to the SPS.

TABLE 7-continued

Sequence parameter set RBSP semantics sps_sign_data_hiding_enabled_flag equal to 0 specifies that sign bit hiding is disabled
for pictures referring to the SPS. sps_sign_data_hiding_enabled_flag equal to 1 specifies
that sign bit hiding may be enabled for pictures referring to the SPS. When
sps_sign_data_hiding_enabled_flag is not present, it is inferred to be equal to 0.
sps_virtual_boundaries_enabled_flag equal to 1 specifies that disabling in-loop filtering
across virtual boundaries may be applied in the coded pictures in the CLVS.
sps_virtual_boundaries_enabled_flag equal to 0 specifies that disabling in-loop filtering
across virtual boundaries is not applied in the coded pictures in the CLVS. In-loop filtering
operations include the deblocking filter, sample adaptive offset filter, and adaptive loop
filter operations.
sps_virtual_boundaries_present_flag equal to 1 specifies that information of virtual
boundaries is signalled in the SPS. sps_virtual_boundaries_present_flag equal to 0
specifies that information of virtual boundaries is not signalled in the SPS. When there is
one or more than one virtual boundaries signalled in the SPS, the in-loop filtering
operations are disabled across the virtual boundaries in pictures referring to the SPS. In-
loop filtering operations include the deblocking filter, sample adaptive offset filter, and
adaptive loop filter operations.
It is a requirement of bitstream conformance that when the value of
res_change_in_clvs_allowed_flag is equal to 1, the value of
sps_virtual_boundaries_present_flag shall be equal to 0.
sps_num_ver_virtual_boundaries specifies the number of
sps_virtual_boundaries_pos_x[ i ] syntax elements that are present in the SPS. When
sps_num_ver_virtual_boundaries is not present, it is inferred to be equal to 0.
sps_virtual_boundaries_pos_x[ i ] specifies the location of the i-th vertical virtual
boundary in units of luma samples divided by 8. The value of
sps_virtual_boundaries_pos_x[ i ] shall be in the range of 1 to
Ceil( pic_width_in_luma_samples ÷ 8 ) − 1, inclusive.
sps_num_hor_virtual_boundaries specifies the number of
sps_virtual_boundaries_pos_y[ i ] syntax elements that are present in the SPS. When
sps_num_hor_virtual_boundaries is not present, it is inferred to be equal to 0.
When sps_virtual_boundaries_enabled_flag is equal to 1 and
sps_virtual_boundaries_present_flag is equal to 1, the sum of
sps_num_ver_virtual_boundaries and sps_num_hor_virtual_boundaries shall be greater
than 0.
sps_virtual_boundaries_pos_y[ i ] specifies the location of the i-th horizontal virtual
boundary in units of luma samples divided by 8. The value of
sps_virtual_boundaries_pos_y[ i ] shall be in the range of 1 to
Ceil( pic_height_in_luma_samples ÷ 8 ) − 1, inclusive.
sps_general_hrd_params_present_flag equal to 1 specifies that the syntax structure
general_hrd_parameters( ) is present in the SPS RBSP syntax structure.
sps_general_hrd_cpb_params_present_flag equal to 0 specifies that the syntax structure
general_hrd_parameters( ) is not present in the SPS RBSP syntax structure.
sps_sublayer_cpb_params_present_flag equal to 1 specifies that the syntax structure
old_hrd_parameters( ) in the SPS RBSP includes HRD parameters for sublayer
representations with TemporalId in the range of 0 to sps_max_sublayersminus1, inclusive,
spssublayercpb_params_present_flag equal to 0 specifies that the syntax structure
ols_hrd_parameters( ) in the SPS RBSP includes HRD parameters for the sublayer
representation with TemporalId equal to sps_max_sublayers_minus1 only. When
sps_max_sublayers_minus1 is equal to 0, the value of
sps_sublayer_cpb_params_present_flag is inferred to be equal to 0.
When sps_sublayer_cpb_params_present_flag is equal to 0, the HRD parameters for the
sublayer representations with TemporalId in the range of 0 to
sps_max_sublayers_minus1 − 1, inclusive, are inferred to be the same as that for the
sublayer representation with TemporalId equal to sps_max_sublayers_minus1. These
include the HRD parameters starting from the fixed_pic_rate_general_flag[ i ] syntax
element till the sublayer hrd_parameters( i ) syntax structure immediately under the
condition "if( general_vcl_hrd cpb_params_present_flag )" in the ols_hrd_parameters syntax
structure.
field_seq_flag equal to 1 indicates that the CLVS conveys pictures that represent fields,
field_seq_flag equal to 0 indicates that the CLVS conveys pictures that represent frames.
When general_frame_only_constraint_flag is equal to 1, the value of field_seq_flag shall
be equal to 0.
When field_seq_flag is equal to 1, a frame-field information SEI message shall be present
for every coded picture in the CLVS.
   NOTE 5 - The specified decoding process does not treat pictures that represent fields or
   frames differently. A sequence of pictures that represent fields would therefore be coded
   with the picture dimensions of an individual field. For example, pictures that represent
   1080i fields would commonly have cropped output dimensions of 1920×540, while the
   sequence picture rate would commonly express the rate of the source fields (typically
   between 50 and 60 Hz), instead of the source frame rate (typically between 25 and
   30 Hz).
vui_parameters_present_flag equal to 1 specifies that the syntax structure
vui_parameters( ) is present in the SPS RBSP syntax structure.
vui_parameters_present_flag equal to 0 specifies that the syntax structure
vui_parameters( ) is not present in the SPS RBSP syntax structure.
sps_extension_flag equal to 0 specifies that no sps_extension_data_flag syntax elements
are present in the SPS RBSP syntax structure, sps_extension_flag equal to 1 specifies that
there are sps_extension_data_flag syntax elements present in the SPS RBSP syntax TABLE 7-continued Sequence parameter set RBSP semantics structure.
sps_extension_data_flag may have any value. Its presence and value do not affect decoder
conformance to profiles specified in this version of this Specification. Decoders
conforming to this version of this Specification shall ignore all sps_extension_data_flag
syntax elements.

VVC's picture parameter set (PPS) contains such information which could change from picture to picture. The PPS includes information roughly comparable to what was part of the PPS in HEVC, including: 1) a self-reference; 2) initial picture control information such as initial quantization parameter (QP), a number of flags indicating the use of, or presence of, certain tools or control information in the slice header; and 3) tiling information. The syntax and the associated semantic of the sequence parameter set in the current VVC draft specification are illustrated in Table 8 and Table 9, respectively. How to read Table 8 is illustrated in the appendix section of this invention, which could also be found in the VVC specification.

TABLE 8

Picture parameter set RBSP syntax

|  | Descriptor |
| --- | --- |
| pic_parameter_set_rbsp( ) { |  |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { |  |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } |  |
|   scaling_window_explicit_signalling_flag | u(1) |
|   if( scaling_window_explicit_signalling_flag ) { |  |
|     scaling_win_left_offset | ue(v) |
|     scaling_win_right_offset | ue(v) |
|     scaling_win_top_offset | ue(v) |
|     scaling_win_bottom_offset | ue(v) |
|   } |  |
|   output_flag_present_flag | u(1) |
|   subpic_id_mapping_in_pps_flag | u(1) |
|   if( subpic_id_mapping_in_pps_flag ) { |  |
|     pps_num_subpics_minus1 | ue(v) |
|     pps_subpic_id_len_minus1 | ue(v) |
|     for( i = 0; i <= pps_num_subpic_minus1; i++ ) |  |
|       pps_subpic_id[ i ] | u(v) |
|   } |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     if( NumTilesInPic > 1 ) |  |
|       rect_slice_flag | u(1) |
|     if( rect_slice_flag ) |  |
|       single_slice_per_subpic_flag | u(1) |
|     if( rect_slice_flag && !single_slice_per_subpic_flag ) { |  |
|       num_slices_in_pic_minus1 | ue(v) |
|       if( num_slices_in_pic_minus1 > 0 ) |  |
|         tile_idx_delta_present_flag | u(1) |
|       for( i = 0; i < num_slices_in_pic_minus1; i++ ) { |  |
|         if( NumTileColumns > 1 ) |  |
|           slice_width_in_tiles_minus1[ i ] | ue(v) |
|         if( NumTileRows > 1 && ( tile_idx_delta_present_flag \|\| |  |
|           SliceTopLeftTileIdx[ i ] % NumTileColumns = = 0 ) ) |  |
|           slice_height_in_tiles_minus1[ i ] | ue(v) |
|         if( slice_width_in_tiles_minus1[ i ] = = 0 && |  |
|           slice_height_in_tiles_minus1[ i ] = = 0 && |  |
|           RowHeight[ SliceTopLeftTileIdx[ i ] / NumTileColumns ] > 1 ) |  |

TABLE 8-continued

| Picture parameter set RBSP syntax | |
|---|---|
| | Descriptor |
| {                num_exp_slices_in_tile[ i ]                for( j = 0; j < num_exp_slices_in_tile[ i ]; j++ )                    exp_slice_height_in_ctus_minus1[ i ][ j ]                i += NumSlicesInTile[ i ] − 1            }            if( tile_idx_delta_present_flag && i < num_slices_in_pic_minus1 )                tile_idx_delta[ i ]        }    }    loop_filter_across_tiles_enabled_flag    loop_filter_across_slices_enabled_flag}cabac_init_present_flagfor( i = 0; i < 2; i++ )    num_ref_idx_default_active_minus1[ i ]rpl1_idx_present_flaginit_qp_minus26cu_qp_delta_enabled_flagpps_chroma_tool_offsets_present_flagif( pps_chroma_tool_offsets_present_flag ) {    pps_cb_qp_offset    pps_cr_qp_offset    pps_joint_cbcr_qp_offset_present_flag    if( pps_joint_cbcr_qp_offset_present_flag )        pps_joint_cbcr_qp_offset_value    pps_slice_chroma_qp_offsets_present_flag    pps_cu_chroma_qp_offset_list_enabled_flag}if( pps_cu_chroma_qp_offset_list_enabled_flag ) {    chroma_qp_offset_list_len_minus1    for( i = 0; i <= chroma_qp_offset_list_len_minus1; i++ ) {        cb_qp_offset_list[ i ]        cr_qp_offset_list[ i ]        if( pps_joint_cbcr_qp_offset_present_flag )            joint_cbcr_qp_offset_list[ i ]    }}pps_weighted_pred_flagpps_weighted_bipred_flagdeblocking_filter_control_present_flagif( deblocking_filter_control_present_flag ) {    deblocking_filter_override_enabled_flag    pps_deblocking_filter_disabled_flag    if( !pps_deblocking_filter_disabled_flag ) {        pps_beta_offset_div2        pps_tc_offset_div2        pps_cb_beta_offset_div2        pps_cb_tc_offset_div2        pps_cr_beta_offset_div2        pps_cr_tc_offset_div2    }}rpl_info_in_ph_flagif( deblocking_filter_override_enabled_flag )    dbf_info_in_ph_flagsao_info_in_ph_flagalf_info_in_ph_flagif( ( pps_weighted_pred_flag \|\| pps_weighted_bipred_flag ) && rpl_info_in_ph_flag )    wp_info_in_ph_flagqp_delta_info_in_ph_flagpps_ref_wraparound_enabled_flagif( pps_ref_wraparound_enabled_flag )    pps_ref_wraparound_offsetpicture_header_extension_present_flagslice_header_extension_present_flagpps_extension_flagif( pps_extension_flag)    while( more_rbsp_data( ) )        pps_extension_data_flagrbsp_trailing_bits( )} | ue(v)ue(v)se(v)u(1)u(1)u(1)ue(v)u(1)se(v)u(1)u(1)se(v)se(v)u(1)se(v)u(1)u(1)ue(v)se(v)se(v)se(v)u(1)u(1)u(1)u(1)u(1)se(v)se(v)se(v)se(v)se(v)se(v)u(1)u(1)u(1)u(1)u(1)u(1)u(1)ue(v)u(1)u(1)u(1)u(1) |

TABLE 9

Picture parameter set RBSP semantics

APPS RBSP shall be available to the decoding process prior to it being referenced, included in at least one AU with TemporalId less than or equal to the TemporalId of the PPS NAL unit or provided through external means.
All PPS NAL units with a particular value of pps_pic_parameter_set_id within a PU shall have the same content.
pps_pic_parameter_set_id identifies the PPS for reference by other syntax elements. The value of pps_pic_parameter_set_id shall be in the range of 0 to 63, inclusive.
PPS NAL units, regardless of the nuh_layer_id values, share the same value space of pps_pic_parameter_set_id.
Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.
pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.
mixed_nalu_types_in_pic_flag equal to 1 specifies that each picture referring to the PPS has more than one VCL NAL unit, the VCL NAL units do not have the same value of nal_unit_type, and the picture is not an IRAP picture, mixed_nalu_types_in_pic_flag equal to 0 specifies that each picture referring to the PPS has one or more VCL NAL units and the VCL NAL units of each picture refering to the PPS have the same value of nal_unit_type.
When no_mixed_nalu_types_in_pic_constraint_flag is equal to 1, the value of mixed_nalu_types_in_pic_flag shall be equal to 0.
For each slice with a nal_unit_type value nalUnitTypeA in the range of IDR_W_RADL to CRA_NUT, inclusive, in a picture picAthat also contains one or more slices with another value of nal_unit_type (i.e., the value of mixed_nalu_types_in_pic_flag for the picture picA is equal to 1), the following applies:
– The slice shall belong to a subpicture subpicA for which the value of the corresponding subpic_treated_as_pic_flag[ i ] is equal to 1.
– The slice shall not belong to a subpicture of picA containing VCL NAL units with nal_unit_type not equal to nalUnitTypeA.
– If nalUnitTypeA is equal to CRA, for all the following PUs following the current picture in the CLVS in decoding order and in output order, neither RefPicList[ 0 ] nor RefPicList[ 1 ] of a slice in subpicAin those PUs shall include any picture preceding picA in decoding order in an active entry.
– Otherwise (i.e., nalUnitTypeA is equal to IDR_W_RADL or IDR_N_LP), for all the PUs in the CLVS following the current picture in decoding order, neither RefPicList[ 0 ] nor RefPicList[ 1 ] of a slice in subpicA in those PUs shall include any picture preceding picA in decoding order in an active entry.
    NOTE 1– mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_present_flag is equal to 0 and mixed_nalu_types_in_pic_flag is equal to 1, a picture referring to the PPS cannot have slices with nal_unit_type equal to IDR_W_RADL or IDR_N_LP.
pic_width_in_luma_samples specifies the width of each decoded picture referring to the PPS in units of luma samples. pic_width_in_luma_samples shall not be equal to 0, shall be an integer multiple of Max( 8, MinCbSizeY ), and shall be less than or equal to pic_width_max_in_luma_samples.
When res_change_in_clvs_allowed_flag equal to 0, the value of pic_width_in_luma samples shall be equal to pic_width_max_in_luma_samples.
pic_height_in_luma_samples specifies the height of each decoded picture referring to the PPS in units of luma samples, pic_height_in_luma_samples shall not be equal to 0 and shall be an integer multiple of Max( 8, MinCbSizeY ), and shall be less than or equal to pic_height_max_in_luma_samples.
When res_change_in_clvs_allowed_flag equal to 0, the value of pic_height_in_luma_samples shall be equal to pic_height_max_in_luma_samples.
The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$\text{PicWidthInCtbsY} = \text{Ceil}(\text{pic\_width\_in\_luma\_samples} \div \text{CtbSizeY}) \quad (69)$$
$$\text{PicHeightInCtbsY} = \text{Ceil}(\text{pic\_height\_in\_luma\_samples} \div \text{CtbSizeY}) \quad (70)$$
$$\text{PicSizeInCtbsY} = \text{PicWidthInCtbsY} * \text{PicHeightInCtbsY} \quad (71)$$
$$\text{PicWidthInMinCbsY} = \text{pic\_width\_in\_luma\_samples} / \text{MinCbSizeY} \quad (72)$$
$$\text{PicHeightInMinCbsY} = \text{pic\_height\_in\_luma\_samples} / \text{MinCbSizeY} \quad (73)$$
$$\text{PicSizeInMinCbsY} = \text{PicWidthInMinCbsY} * \text{PicHeightInMinCbsY} \quad (74)$$
$$\text{PicSizeInSamplesY} = \text{pic\_width\_in\_luma samples} * \text{pic\_height\_in\_luma\_samples} \quad (75)$$
$$\text{PicWidthInSamplesC} = \text{pic\_width\_in\_luma\_samples} / \text{SubWidthC} \quad (76)$$
$$\text{PicHeightInSamplesC} = \text{pic\_height\_in\_luma\_samples} / \text{SubHeightC} \quad (77)$$

pps_conformance_window_flag equal to 1 indicates that the conformance cropping window offset parameters follow next in the PPS. pps_conformance_window_flag equal to 0 indicates that the conformance cropping window offset parameters are not present in the TABLE 9-continued Picture parameter set RBSP semantics PPS.
pps_conf_win_left_offset, pps_conf_win_right_offset, pps_conf_win_top_offset, and
pps_conf_win_bottom_offset specify the samples of the pictures in the CLVS that are
output from the decoding process, in terms of a rectangular region specified in picture
coordinates for output. When pps_conformance_window_flag is equal to 0, the values of
pps_conf_win_left_offset, pps_conf_win_right_offset, pps_conf_win_top_offset, and
pps_conf_win_bottom_offset are inferred to be equal to 0.
The conformance cropping window contains the luma samples with horizontal picture
coordinates from SubWidthC * pps_conf_win_left_offset to
pic_width_in_luma_samples − ( SubWidthC * pps_conf_win_right_offset + 1 ) and
vertical picture coordinates from SubHeightC * pps_conf_win_top_offset to
pic_height_in_luma_samples − ( SubHeightC * pps_conf_win_bottom_offset + 1 ),
inclusive.
The value of SubWidthC * ( pps_conf_win_left_offset + pps_conf_win_right_offset ) shall
be less than pic_width_in_luma_samples, and the value of
SubHeightC * ( pps_conf_win_top_offset + pps_conf_win_bottom_offset ) shall be less
than pic_height_in_luma_samples.
When ChromaArrayType is not equal to 0, the corresponding specified samples of the two
chroma arrays are the samples having picture coordinates ( x / SubWidthC,
y / SubHeightC ), where (x, y ) are the picture coordinates of the specified luma samples.
  NOTE 2 − The conformance cropping window offset parameters are only applied at the
  output. All internal decoding processes are applied to the uncropped picture size.
Let ppsA and ppsB be any two PPSs referring to the same SPS. It is a requirement of
bitstream conformance that, when ppsA and ppsB have the same the values of
pic_width_in_luma_samples and pic_height_in_luma_samples, respectively, ppsA and
ppsB shall have the same values of pps_conf_win_left_offset, pps_conf_win_right_offset,
pps_conf_win_top_offset, and pps_conf_win_bottom_offset, respectively.
When pic_width_in_luma_samples is equal to pic_width_max_in_luma_samples and
pic_height_in_luma_samples is equal to pic_height_max_in_luma_samples, it is a
requirement of bitstream conformance that pps_conf_win_left_offset,
pps_conf_win_right_offset, pps_conf_win_top_offset, and pps_conf_win_bottom_offset,
are equal to sps_conf_win_left_offset, sps_conf_win_right_offset,
sps_conf_win_top_offset, and sps_conf_win_bottom_offset, respectively.
scaling_window_explicit_signalling_flag equal to 1 specifies that the scaling window
offset parameters are present in the PPS. scaling_window_explicit_signalling_flag equal to
0 specifies that the scaling window offset parameters are not present in the PPS. When
res_change_in_clvs_allowed_flag is equal to 0, the value of
scaling_window_explicit_signalling_flag shall be equal to 0.
scaling_win_left_offset, scaling_win_right_offset, scaling_win_top_offset, and
scaling_win_bottom_offset specify the offsets that are applied to the picture size for
scaling ratio calculation. When not present, the values of scaling_win_left_offset,
scaling_win_right_offset, scaling_win_top_offset, and scaling_win_bottom_offset are
inferred to be equal to pps_conf_win_left_offset, pps_conf_win_right_offset,
pps_conf_win_top_offset, and pps_conf_win_bottom_offset, respectively.
The value of SubWidthC * ( scaling_win_left_offset + scaling_win_right_offset ) shall be
less than pic_width_in_luma_samples, and the value of
SubHeightC * ( scaling_win_top_offset + scaling_win_bottom_offset ) shall be less than
pic_height_in_luma_samples.
The variables PicOutputWidthL and PicOutputHeightL are derived as follows:
    PicOutputWidthL = pic_width_in_luma_samples −                                    (78)
        SubWidthC * ( scaling_win_right_offset + scaling_win_left_offset )
    PicOutputHeightL = pic_height_in_luma_samples −                                  (79)
        SubWidthC * ( scaling_win_bottom_offset + scaling_win_top_offset )
Let refPicOutputWidthL and refPicOutputHeightL be the PicOutputWidthL and
PicOutputHeightL, respectively, of a reference picture of a current picture referring to this
PPS. Is a requirement of bitstream conformance that all of the following conditions are
satisfied:
− PicOutputWidthL * 2 shall be greater than or equal to refPicWidthInLumaSamples.
− PicOutputHeightL * 2 shall be greater than or equal to refPicHeightInLumaSamples.
− PicOutputWidthL shall be less than or equal to refPicWidthInLumaSamples * 8.
− PicOutputHeightL shall be less than or equal to refPicHeightInLumaSamples * 8.
− PicOutputWidthL * pic_width_max_in_luma_samples shall be greater than or equal to
  refPicOutputWidthL * (pic_width_in_luma_samples − Max( 8, MinCbSizeY )).
− PicOutputHeightL * pic_height_max_in_luma_samples shall be greater than or equal
  to refPicOutputHeightL * (pic_height_in_luma_samples − Max( 8, MinCbSizeY )).
output_flag_present_flag equal to 1 indicates that the pic_output_flag syntax element is
present in PHs referring to the PPS. output_flag_present_flag equal to 0 indicates that the
pic_output_flag syntax element is not present in PHs referring to the PPS.
subpic_id_mapping_in_pps_flag equal to 1 specifies that the subpicture ID mapping is
signalled in the PPS. subpic_id_mapping_in_pps_flag equal to 0 specifies that the
subpicture ID mapping is not signalled in the PPS. If
subpic_id_mapping_explicitly_signalled_flag is 0 or subpic_id_mapping_in_sps_flag is
equal to 1, the value of subpic_id_mapping_in_pps_flag shall be equal to 0. Otherwise
(subpic_id_mapping_explicitly_signalled_flag is equal to 1 and
subpic_id_mapping_in_sps_flag is equal to 0), the value of
subpic_id_mapping_in_pps_flag shall be equal to 1.
pps_num_subpics_minus1 shall be equal to sps_num_subpics_minus1.
pps_subpic_id_len_minus1 shall be equal to sps_subpic_id_len_minus1.

TABLE 9-continued

Picture parameter set RBSP semantics pps_subpic_id[ i ] specifies the subpicture ID of the i-th subpicture. The length of the
pps_subpic_id[ i ] syntax element is pps_subpic_id_len_minus1 + 1 bits.
The variable SubpicIdVal[ i ], for each value of i in the range of 0 to
sps_num_subpics_minus1, inclusive, is derived as follows:
    for( i = 0; i <= sps_num_subpics_minus1; i++ )
        if( subpic_id_mapping_explicitly_signalled_flag )
            SubpicIdVal[ i ] = subpic_id_mapping_in_pps_flag ? pps_subpic_id[ i ] :
sps_subpic_id[ i ]                             (80)
        else
            SubpicIdVal[ i ] = i
It is a requirement of bitstream conformance that both of the following constraints apply:
– For any two different values of i and j in the range of 0 to sps_num_subpics_minus1,
  inclusive, SubpicIdVal[ i ] shall not be equal to SubpicIdVal[ j ].
– When the current picture is not the first picture of the CLVS, for each value of i in the
  range of 0 to sps_num_subpics_minus1, inclusive, if the value of SubpicIdVal[ i ] is
  not equal to the value of SubpicIdVal[ i ] of the previous picture in decoding order in
  the same layer, the nal_unit_type for all coded slice NAL units of the subpicture in the
  current picture with subpicture index i shall be equal to a particular value in the range
  of IDR_W_RADL to CRA_NUT, inclusive.
no_pic_partition_flag equal to 1 specifies that no picture partitioning is applied to each
picture referring to the PPS. no_pic_partition_flag equal to 0 specifies each picture
referring to the PPS may be partitioned into more than one tile or slice.
It is a requirement of bitstream conformance that the value of no_pic_partition_flag shall
be the same for all PPSs that are referred to by coded pictures within a CLVS.
It is a requirement of bitstream conformance that the value of no_pic_partition_flag shall
not be equal to 1 when the value of sps_num_subpics_minus1 + 1 is greater than 1.
pps_log2_ctu_size_minus5 plus 5 specifies the luma coding tree block size of each CTU.
pps_log2_ctu_size_minus5 shall be equal to sps_log2_ctu_size_minus5.
num_exp_tile_columns_minus1 plus 1 specifies the number of explicitly provided tile
column widths. The value of num_exp_tile_columns_minus1 shall be in the range of 0 to
PicWidthInCtbsY – 1, inclusive. When no_pic_partition_flag is equal to 1, the value of
num_exp_tile_columns_minus1 is inferred to be equal to 0.
num_exp_tile_rows_minus1 plus 1 specifies the number of explicitly provided tile row
heights. The value of num_exp_tile_rows_minus1 shall be in the range of 0 to
PicHeightInCtbsY – 1, inclusive. When no_pic_partition_flag is equal to 1, the value of
num_tile_rows_minus1 is inferred to be equal to 0.
tile_column_width_minus1[ i ] plus 1 specifies the width of the i-th tile column in units
of CTBs for i in the range of 0 to num_exp_tile_columns_minus1 – 1, inclusive.
tile_column_width_minus1[ num_exp_tile_columns_minus1 ] is used to derive the width
of the tile columns with index greater than or equal to num_exp_tile_columns_minus1 as
specified in clause 6.5.1. The value of tile_column_width_minus1[ i ] shall be in the range
of 0 to PicWidthInCtbsY – 1, inclusive. When not present, the value of
tile_column_width_minus1[ 0 ] is inferred to be equal to PicWidthInCtbsY – 1.
tile_row_height_minus1[ i ] plus 1 specifies the height of the i-th tile row in units of
CTBs for i in the range of 0 to num_exp_tile_rows_minus1 – 1, inclusive.
tile_row_height_minus1 [ num_exp_tile_rows_minus1 ] is used to derive the height of the
tile rows with index greater than or equal to num_exp_tile_rows_minus1 as specified in
clause 6.5.1. The value of tile_row_height_minus1[ i ] shall be in the range of 0 to
PicHeightInCtbsY – 1, inclusive. When not present, the value of
tile_row_height_minus1[ 0 ] is inferred to be equal to PicHeightInCtbsY – 1.
rect_slice_flag equal to 0 specifies that tiles within each slice are in raster scan order and
the slice information is not signalled in PPS. rect_slice_flag equal to 1 specifies that tiles
within each slice cover a rectangular region of the picture and the slice information is
signalled in the PPS. When not present, rect_slice_flag is inferred to be equal to 1. When
subpic_info_present_flag is equal to 1, the value of rect_slice_flag shall be equal to 1.
single_slice_per_subpic_flag equal to 1 specifies that each subpicture consists of one and
only one rectangular slice. single_slice_per_subpic_flag equal to 0 specifies that each
subpicture may consist of one or more rectangular slices. When not present, the value of
single_slice_per_subpic_flag is inferred to be equal to 0.
lices in each picture referring to the PPS. The value of num_slices_in_pic_minus1 shall be
in the range of 0 to MaxSlicesPerPicture – 1, inclusive, where MaxSlicesPerPicture is
specified in Annex A. When no_pic_partition_flag is equal to 1, the value of
num_slices_in_pic_minus1 is inferred to be equal to 0. When single_slice_per_subpic_flag
is equal to 1, the value of num_slices_in_pic_minus1 is inferred to be equal to
sps_num_subpics_minus1.
tile_idx_delta_present_flag equal to 0 specifies that tile_idx_delta[ i ] syntax elements are
not present in the PPS and all pictures referring to the PPS are partitioned into rectangular
slice rows and rectangular slice columns in slice raster order. tile_idx_delta_present_flag
equal to 1 specifies that tile_idx_delta[ i ] syntax elements may be present in the PPS and
all rectangular slices in pictures referring to the PPS are specified in the order indicated by
the values of the tile_idx_delta[ i ] in increasing values of i. When not present, the value of
tile_idx_delta_present_flag is inferred to be equal to 0.
slice_width_in_tiles_minus1[ i ] plus 1 specifies the width of the i-th rectangular slice in
units of tile columns. The value of slice_width_in_tiles_minus1[ i ] shall be in the range of
0 to NumTileColumns – 1, inclusive.
When i is less than num_slices_in_pic_minus1 and NumTileColumns is equal to 1, the
value of slice_width_in_tiles_minus1[ i ] is inferred to be equal to 0.
slice_height_in_tiles_minus1[ i ] plus 1 specifies the height of the i-th rectangular slice in TABLE 9-continued Picture parameter set RBSP semantics units of tile rows when num_exp_slices_in_tile[ i ] is equal to 0. The value of
slice_height_in_tiles_minus1[ i ] shall be in the range of 0 to NumTileRows − 1, inclusive.
When i is less than num_slices_in_pic_minus1 and slice_height_in_tiles_minus1[ i ] is not
present, it is inferred to be equal to NumTileRows = = 1 ? 0 :
slice_height_in_tiles_minus1[ i − 1 ].
num_exp_slices_in_tile[ i ] specifies the number of explicitly provided slice heights for
the slices in the tile containing the i-th slice (i.e., the tile with tile index equal to
SliceTopLeftTileIdx[ i ]). The value of num_exp_slices_in_tile[ i ] shall be in the range of
0 to RowHeight[ SliceTopLeftTileIdx[ i ] / NumTileColumns ] − 1, inclusive. When not
present, the value of num_exp_slices_in_tile[ i ] is inferred to be equal to 0.
   NOTE 3 − If num_exp_slices_in_tile[ i ] is equal to 0, the tile containing the i-th slice is
   not split into multiple slices. Otherwise (num_exp_slices_in_tile[ i ] is greater than 0),
   the tile containing the i-th slice may or may not be split into multiple slices.
exp_slice_height_in_ctus_minus1[ i ][ j ] plus 1 specifies the height of the j-th rectangular
slice in the tile containing the i-th slice in units of CTU rows. The value of
exp_slice_height_in_ctus_minus1[ i ][ j ] shall be in the range of 0 to
RowHeight[ SliceTopLeftTileIdx i ] / NumTileColumns ] − 1, inclusive.
tile_idx_delta[ i ] specifies the difference between the tile index of the tile containing the
first CTU in the ( i + 1 )-th rectangular slice and the tile index of the tile containing the first
CTU in the i-th rectangular slice. The value of tile_idx_delta[ i ] shall be in the range of
−NumTilesInPic + 1 to NumTilesInPic − 1, inclusive. When not present, the value of
tile_idx_delta[ i ] is inferred to be equal to 0. When present, the value of tile_idx_delta[ i ]
shall not be equal to 0.
loop_filter_across_tiles_enabled_flag equal to 1 specifies that in-loop filtering operations
may be performed across tile boundaries in pictures referring to the PPS.
loop_filter_across_tiles_enabled_flag equal to 0 specifies that in-loop filtering operations
are not performed across tile boundaries in pictures referring to the PPS. The in-loop
filtering operations include the deblocking filter, sample adaptive offset filter, and adaptive
loop filter operations. When not present, the value of loop_filter_across_tiles_enabled_flag
is inferred to be equal to 1.
loop_filter_across_slices_enabled_flag equal to 1 specifies that in-loop filtering
operations may be performed across slice boundaries in pictures referring to the PPS.
loop_filter_across_slice_enabled_flag equal to 0 specifies that in-loop filtering operations
are not performed across slice boundaries in pictures referring to the PPS. The in-loop
filtering operations include the deblocking filter, sample adaptive offset filter, and adaptive
loop filter operations. When not present, the value of
loop_filter_across_slices_enabled_flag is inferred to be equal to 0.
cabac_init_present_flag equal to 1 specifies that cabac_init_flag is present in slice
headers referring to the PPS. cabac_init_present_flag equal to 0 specifies that
cabac_init_flag is not present in slice headers referring to the PPS.
num_ref_idx_default_active_minus1[ i ] plus 1, when i is equal to 0, specifies the
inferred value of the variable NumRefIdxActive[ 0 ] for P or B slices with
num_ref_idx_active_override_flag equal to 0, and, when i is equal to 1, specifies the
inferred value of NumRefIdx Active[ 1 ] for B slices with
num_ref_idx_active_override_flag equal to 0. The value of
num_ref_idx_default_active_minus1[ i ] shall be in the range of 0 to 14, inclusive.
rpl1_idx_present_flag equal to 0 specifies that rpl_sps_flag[ 1 ] and rpl_idx[ 1 ] are not
present in the PH syntax structures or the slice headers for pictures referring to the PPS.
rpl1_idx_present_flag equal to 1 specifies that rpl_sps_flag[ 1 ] and rpl_idx[ 1 ] may be
present in the PH syntax structures or the slice headers for pictures referring to the PPS.
init_qp_minus26 plus 26 specifies the initial value of SliceQpy for each slice referring to
the PPS. The initial value of SliceQpy is modified at the picture level when a non-zero
value of ph_qp_delta is decoded or at the slice level when a non-zero value of
slice_qp_delta is decoded. The value of init_qp_minus26 shall be in the range of
−( 26 + QpBdOffset ) to +37, inclusive.
cu_qp_delta_enabled_flag equal to 1 specifies that the
ph_cu_qp_delta_subdiv_intra_slice and ph_cu_qp_delta_subdiv_inter_slice syntax
elements are present in PHs referring to the PPS and cu_qp_delta_abs may be present in
the transform unit syntax, cu_qp_delta_enabled_flag equal to 0 specifies that the
ph_cu_qp_delta_subdiv_intra_slice and ph_cu_qp_delta_subdiv_inter_slice syntax
elements are not present in PHs referring to the PPS and cu_qp_delta_abs is not present in
the transform unit syntax.
pps_chroma_tool_offsets_present_flag equal to 1 specifies that chroma tool offsets
related syntax elements are present in the PPS RBSP syntax structure.
pps_chroma_tool_offsets_present_flag equal to 0 specifies that chroma tool offsets related
syntax elements are not present in in the PPS RBSP syntax structure. When
ChromaArrayType is equal to 0, the value of pps_chroma_tool_offsets_present_flag shall
be equal to 0.
pps_cb_qp_offset and pps_cr_qp_offset specify the offsets to the luma quantization
parameter $Qp'_Y$ used for deriving $Qp'_{Cb}$ and $Qp'_{Cr}$, respectively. The values of
pps_cb_qp_offset and pps_cr_qp_offset shall be in the range of −12 to +12, inclusive.
When ChromaArrayType is equal to 0, pps_cb_qp_offset and pps_cr_qp_offset are not
used in the decoding process and decoders shall ignore their value. When not present, the
values of pps_cb_qp_offset and pps_cr_qp_offset are inferred to be equalt to 0.
pps_joint_cbcr_qp_offset_present_flag equal to 1 specifies that
pps_joint_cbcr_qp_offset_value and joint_cbcr_qp_offset_list[ i ] are present in the PPS
RBSP syntax structure. pps_joint_cbcr_qp_offset_present_flag equal to 0 specifies that
pps_joint_cbcr_qp_offset_value and joint_cbcr_qp_offset_list[ i ] are not present in the TABLE 9-continued Picture parameter set RBSP semantics PPS RBSP syntax structure. When ChromaArrayType is equal to 0 or
sps_joint_cbcr_enabled_flag is equal to 0, the value of
pps_joint_cbcr_qp_offset_present_flag shall be equal to 0. When not present, the value of
pps_joint_cbcr_qp_offset_present_flag is inferred to be equal to 0.
pps_joint_cbcr_qp_offset_value specifies the offset to the luma quantization parameter
$Qp'_Y$ used for deriving $Qp'_{CbCr}$. The value of pps_joint_cbcr_qp_offset_value shall be in the
range of −12 to +12, inclusive. When ChromaArrayType is equal to 0 or
sps_joint_cbcr_enabled_flag is equal to 0, pps_joint_cbcr_qp_offset_value is not used in
the decoding process and decoders shall ignore its value. When
pps_joint_cbcr_qp_offset_present_flag is equal to 0, pps_joint_cbcr_qp_offset_value is not
present and is inferred to be equal to 0.
pps_slice_chroma_qp_offsets_present_flag equal to 1 specifies that the
slice_cb_qp_offset and slice_cr_qp_offset syntax elements are present in the associated
slice headers, pps_slice_chroma_qp_offsets_present_flag equal to 0 specifies that the
slice_cb_qp_offset and slice_cr_qp_offset syntax elements are not present in the associated
slice headers. When not present, the value of pps_slice_chroma_qp_offsets_present_flag is
inferred to be equal to 0.
pps_cu_chroma_qp_offset_list_enabled_flag equal to 1 specifies that the
ph_cu_chroma_qp_offset_subdiv_intra_slice and
ph_cu_chroma_qp_offset_subdiv_inter_slice syntax elements are present in PHs referring
to the PPS and cu_chroma_qp_offset_flag may be present in the transform unit syntax and
the palette coding syntax, pps_cu_chroma_qp_offset_list_enabled_flag equal to 0 specifies
that the ph_cu_chroma_qp_offset_subdiv_intra_slice and
ph_cu_chroma_qp_offset_subdiv_inter_slice syntax elements are not present in PHs
referring to the PPS and the cu_chroma_qp_offset_flag is not present in the transform unit
syntax and the palette coding syntax. When not present, the value of
pps_cu_chroma_qp_offset_list_enabled_flag is inferred to be equal to 0.
chroma_qp_offset_list_len_minus1 plus 1 specifies the number of cb_qp_offset_list[ i ],
cr_qp_offset_list[ i ], and joint_cbcr_qp_offset_list[ i ], syntax elements that are present in
the PPS RBSP syntax structure. The value of chroma_qp_offset_list_len_minus1 shall be
in the range of 0 to 5, inclusive.
cb_qp_offset_list[ i ], cr_qp_offset_list[ i ], and joint_cbcr_qp_offset_list[ i ], specify
offsets used in the derivation of $Qp'_{Cb}$, $Qp'_{Cr}$, and $Qp'_{CbCr}$, respectively. The values of
cb_qp_offset_list[ i ], cr_qp_offset_list[ i ], and joint_cbcr_qp_offset_list[ i ] shall be in the
range of −12 to +12, inclusive. When pps_joint_cbcr_qp_offset_present_flag is equal to 0,
joint_cbcr_qp_offset_list[ i ] is not present and it is inferred to be equal to 0.
pps_weighted_pred_flag equal to 0 specifies that weighted prediction is not applied to P
slices referring to the PPS. pps_weighted_pred_flag equal to 1 specifies that weighted
prediction is applied to P slices referring to the PPS. When sps_weighted_pred_flag is
equal to 0, the value of pps_weighted_pred_flag shall be equal to 0.
pps_weighted_bipred_flag equal to 0 specifies that explicit weighted prediction is not
applied to B slices referring to the PPS. pps_weighted_bipred_flag equal to 1 specifies that
explicit weighted prediction is applied to B slices referring to the PPS. When
sps_weighted_bipred_flag is equal to 0, the value of pps_weighted_bipred_flag shall be
equal to 0.
deblocking_filter_control_present_flag equal to 1 specifies the presence of deblocking
filter control syntax elements in the PPS. deblocking_filter_control_present_flag equal to 0
specifies the absence of deblocking filter control syntax elements in the PPS.
deblocking_filter_override_enabled_flag equal to 1 specifies the presence of
ph_deblocking_filter_override_flag in the PHs referring to the PPS or
slice_deblocking_filter_override_flag in the slice headers referring to the PPS.
deblocking_filter_override_enabled_flag equal to 0 specifies the absence of
ph_deblocking_filter_override_flag in PHs referring to the PPS or
slice_deblocking_filter_override_flag in slice headers referring to the PPS. When not
present, the value of deblocking_filter_override_enabled_flag is inferred to be equal to 0.
pps_deblocking_filter_disabled_flag equal to 1 specifies that the operation of deblocking
filter is not applied for slices referring to the PPS in which
slice_deblocking_filter_disabled_flag is not present, pps_deblocking_filter_disabled_flag
equal to 0 specifies that the operation of the deblocking filter is applied for slices referring
to the PPS in which slice_deblocking_filter_disabled_flag is not present. When not present,
the value of pps_deblocking_filter_disabled_flag is inferred to be equal to 0.
pps_beta_offset_div2 and pps_tc_offset_div2 specify the default deblocking parameter
offsets for β and tC (divided by 2) that are applied to the luma component for slices
referring to the PPS, unless the default deblocking parameter offsets are overridden by the
deblocking parameter offsets present in the picture headers or the slice headers of the slices
referring to the PPS. The values of pps_beta_offset_div2 and pps_tc_offset_div2 shall both
be in the range of −12 to 12, inclusive. When not present, the values of
pps_beta_offset_div2 and pps_tc_offset_div2 are both inferred to be equal to 0.
pps_cb_beta_offset_div2 and pps_cb_tc_offset_div2 specify the default deblocking
parameter offsets for β and tC (divided by 2) that are applied to the Cb component for
slices referring to the PPS, unless the default deblocking parameter offsets are overridden
by the deblocking parameter offsets present in the picture headers or the slice headers of
the slices referring to the PPS. The values of pps_cb_beta_offset_div2 and
pps_cb_tc_offset_div2 shall both be in the range of −12 to 12, inclusive. When not present,
the values of pps_cb_beta_offset_div2 and pps_cb_tc_offset_div2 are both inferred to be
equal to 0.
pps_cr_beta_offset_div2 and pps_cr_tc_offset_div2 specify the default deblocking
parameter offsets for β and tC (divided by 2) that are applied to the Cr component for slices TABLE 9-continued Picture parameter set RBSP semantics referring to the PPS, unless the default deblocking parameter offsets are overridden by the
deblocking parameter offsets present in the picture headers or the slice headers of the slices
referring to the PPS. The values of pps_cr_beta_offset_div2 and pps_cr_tc_offset_div2
shall both be in the range of −12 to 12, inclusive. When not present, the values of
pps_cr_beta_offset_div2 and pps_cr_tc_offset_div2 are both inferred to be equal to 0.
rpl_info_in_ph_flag equal to 1 specifies that reference picture list information is present
in the PH syntax structure and not present in slice headers referring to the PPS that do not
contain a PH syntax structure. rpl_info_in_ph_flag equal to 0 specifies that reference
picture list information is not present in the PH syntax structure and may be present in slice
headers referring to the PPS that do not contain a PH syntax structure.
dbf_info_in_ph_flag equal to 1 specifies that deblocking filter information is present in
the PH syntax structure and not present in slice headers referring to the PPS that do not
contain a PH syntax structure. dbf_info_in_ph_flag equal to 0 specifies that deblocking
filter information is not present in the PH syntax structure and may be present in slice
headers referring to the PPS that do not contain a PH syntax structure. When not present,
the value of dbf_info_in_ph_flag is inferred to be equal to 0.
sao_info_in_ph_flag equal to 1 specifies that SAO filter information is present in the PH
syntax structure and not present in slice headers referring to the PPS that do not contain a
PH syntax structure, sao_info_in_ph_flag equal to 0 specifies that SAO filter information
is not present in the PH syntax structure and may be present in slice headers referring to the
PPS that do not contain a PH syntax structure.
alf_info_in_ph_flag equal to 1 specifies that ALF information is present in the PH syntax
structure and not present in slice headers referring to the PPS that do not contain a PH
syntax structure, alf_info_in_ph_flag equal to 0 specifies that ALF information is not
present in the PH syntax structure and may be present in slice headers referring to the PPS
that do not contain a PH syntax structure.
wp_info_in_ph_flag equal to 1 specifies that weighted prediction information may be
present in the PH syntax structure and not present in slice headers referring to the PPS that
do not contain a PH syntax structure, wp_info_in_ph_flag equal to 0 specifies that
weighted prediction information is not present in the PH syntax structure and may be
present in slice headers referring to the PPS that do not contain a PH syntax structure.
When not present, the value of wp_info_in_ph_flag is inferred to be equal to 0.
qp_delta_info_in_ph_flag equal to 1 specifies that QP delta information is present in the
PH syntax structure and not present in slice headers referring to the PPS that do not contain
a PH syntax structure, qp_delta_info_in_ph_flag equal to 0 specifies that QP delta
information is not present in the PH syntax structure and may be present in slice headers
referring to the PPS that do not contain a PH syntax structure.
pps_ref_wraparound_enabled_flag equal to 1 specifies that horizontal wrap-around
motion compensation is applied in inter prediction, pps_ref_wraparound_enabled_flag
equal to 0 specifies that horizontal wrap-around motion compensation is not applied. When
the value of CtbSizeY / MinCbSizeY + 1 is greater than
pic_width_in_luma_samples / MinCbSizeY − 1, the value of
pps_ref_wraparound_enabled_flag shall be equal to 0. When
sps_ref_wraparound_enabled_flag is equal to 0, the value of
pps_ref_wraparound_enabled_flag shall be equal to 0.
pps_ref_wraparound_offset_plus ( CtbSizeY / MinCbSizeY ) + 2 specifies the offset used
for computing the horizontal wrap-around position in units of MinCbSizeY luma samples.
The value of pps_ref_wraparound_offset shall be in the range of 0 to
( pic_width_in_luma_samples / MinCbSizeY ) − ( CtbSizeY / MinCbSizeY ) − 2,
inclusive.
The variable PpsRefWraparoundOffset is set equal to
pps_ref_wraparound_offset+( CtbSizeY / MinCbSizeY ) + 2.
picture_header_extension_present_flag equal to 0 specifies that no PH extension syntax
elements are present in PHs referring to the PPS. picture_header_extension_present_flag
equal to 1 specifies that PH extension syntax elements are present in PHs referring to the
PPS. picture_header_extension_present_flag shall be equal to 0 in bitstreams conforming
to this version of this Specification.
slice_header_extension_present_flag equal to 0 specifies that no slice header extension
syntax elements are present in the slice headers for coded pictures referring to the PPS.
slice_header_extension_present_flag equal to 1 specifies that slice header extension syntax
elements are present in the slice headers for coded pictures referring to the PPS.
slice_header_extension_present_flag shall be equal to 0 in bitstreams conforming to this
version of this Specification.
pps_extension_flag equal to 0 specifies that no pps_extension_data_flag syntax elements
are present in the PPS RBSP syntax structure, pps_extension_flag equal to 1 specifies that
there are pps_extension_data_flag syntax elements present in the PPS RBSP syntax
structure.
pps_extension_data_flag may have any value. Its presence and value do not affect
decoder conformance to profiles specified in this version of this Specification. Decoders
conforming to this version of this Specification shall ignore all pps_extension_data_flag
syntax elements.

The slice header contains information that can change from slice to slice, as well as such picture-related information that is relatively small or relevant only for a certain slice or picture types. The size of the slice header may be noticeably bigger than the PPS, particular when there are tile or wavefront entry point offsets in the slice header and RPS, prediction weights, or reference picture list modifications are explicitly signaled. The syntax and the associated semantic of the sequence parameter set in the current VVC draft specification are illustrated in Table 10 and Table 11, respectively. How to read Table 10 is illustrated in the appendix section of this invention, which could also be found in the VVC specification.

TABLE 10

| Picture header structure syntax | |
|---|---|
| picture_header_structure( ) { | Descriptor |
|   gdr_or_irap_pic_flag | u (1) |
|   if( gdr_or_irap_pic_flag ) | |
|     gdr_pic_flag | u (1) |
|   ph_inter_slice_allowed_flag | u (1) |
|   if( ph_inter_slice_allowed_flag ) | |
|     ph_intra_slice_allowed_flag | u (1) |
|   non_reference_picture_flag | u (1) |
|   ph_pic_parameter_set_id | ue (v) |
|   ph_pic_order_cnt_lsb | u (v) |
|   if( gdr_or_irap_pic_flag ) | |
|     no_output_of_prior_pics_flag | u (1) |
|   if( gdr_pic_flag ) | |
|     recovery_poc_cnt | ue (v) |
|   for( i = 0; i < NumExtraPhBits; i++ ) | |
|     ph_extra_bit[ i ] | u (1) |
|   if( sps_poc_msb_flag ) { | |
|     ph_poc_msb_present_flag | u (1) |
|     if( ph_poc_msb_present_flag ) | |
|       poc_msb_val | u (v) |
|   } | |
|   if( sps_alf_enabled_flag && alf_info_in_ph_flag ) { | |
|     ph_alf_enabled_flag | u (1) |
|     if( ph_alf_enabled_flag ) { | |
|       ph_num_alf_aps_ids_luma | u (3) |
|       for( i = 0; i < ph_num_alf_aps_ids_luma; i++ ) | |
|         ph_alf_aps_id_luma[ i ] | u (3) |
|       if( ChromaArrayType != 0 ) | |
|         ph_alf_chroma_idc | u (2) |
|       if( ph_alf_chroma_idc > 0 ) | |
|         ph_alf_aps_id_chroma | u (3) |
|       if( sps_cc_alf_enabled_flag ) { | |
|         ph_cc_alf_cb_enabled_flag | u (1) |
|         if( ph_cc_alf_cb_enabled_flag ) | |
|           ph_cc_alf_cb_aps_id | u (3) |
|         ph_cc_alf_enabled_flag | u (1) |
|         if( ph_cc_alf_cr_enabled_flag ) | |
|           ph_cc_alf_cr_aps_id | u (3) |
|       } | |
|     } | |
|   } | |
|   if( sps_lmcs_enabled_flag ) { | |
|     ph_lmcs_enabled_flag | u (1) |
|     if( ph_lmcs_enabled_flag ) { | |
|       ph_lmcs_aps_id | u (2) |
|       if( ChromaArrayType != 0 ) | |
|         ph_chroma_residual_scale_flag | u (1) |
|     } | |
|   } | |
|   if( sps_scaling_list_enabled_flag ) { | |
|     ph_scaling_list_present_flag | u (1) |
|     if( ph_scaling_list_present_flag ) | |
|       ph_scaling_list_aps_id | u (3) |
|   } | |
|   if( sps_virtual_boundaries_enabled_flag && !sps_virtual_boundaries_present_flag ) { | |
|     ph_virtual_boundaries_present_flag | u (1) |
|     if( ph_virtual_boundaries_present_flag ) { | |
|       ph_num_ver_virtual_boundaries | u (2) |
|       for( i = 0; i < ph_num_ver_virtual_boundaries; i++ ) | |
|         ph_virtual_boundaries_pos_x[ i ] | u (13) |
|       ph_num_hor_virtual_boundaries | u (2) |
|       for( i = 0; i < ph_num_hor_virtual_boundaries; i++ ) | |
|         ph_virtual_boundaries_pos_y[ i ] | u (13) |
|     } | |
|   } | |
|   if( output_flag_present_flag ) | |
|     pic_output_flag | u (1) |

TABLE 10-continued

Picture header structure syntax

| picture_header_structure( ) { | Descriptor |
|---|---|
|   if( rpl_info_in_ph_flag ) | |
|     ref_pic_lists( ) | |
|   if( partition_constraints_override_enabled_flag ) | |
|     partition_constraints_override_flag | u (1) |
|   if( ph_intra_slice_allowed_flag ) { | |
|     if( partition_constraints_override_flag ) { | |
|       ph_log2_diff_min_qt_min_cb_intra_slice_luma | ue (v) |
|       ph_max_mtt_hierarchy_depth_intra_slice_luma | ue (v) |
|       if( ph_max_mtt_hierarchy_depth_intra_slice_luma != 0 ) { | |
|         ph_log2_diff_max_bt_min_qt_intra_slice_luma | ue (v) |
|         ph_log2_diff_max_tt_min_qt_intra_slice_luma | ue (v) |
|       } | |
|       if( qtbtt_dual_tree_intra_flag ) { | |
|         ph_log2_diff_min_qt_min_cb_intra_slice_chroma | ue (v) |
|         ph_max_mtt_hierarchy_depth_intra_slice_chroma | ue (v) |
|         if( ph_max_mtt_hierarchy_depth_intra_slice_chroma != 0 ) { | |
|           ph_log2_diff_max_bt_min_qt_intra_slice_chroma | ue (v) |
|           ph_log2_diff_max_tt_min_qt_intra_slice_chroma | ue (v) |
|         } | |
|       } | |
|     } | |
|     if( cu_qp_delta_enabled_flag ) | |
|       ph_cu_qp_delta_subdiv_intra_slice | ue (v) |
|     if( pps_cu_chroma_qp_offset_list_enabled_flag ) | |
|       ph_cu_chroma_qp_offset_subdiv_intra_slice | ue (v) |
|   } | |
|   if( ph_inter_slice_allowed_flag ) { | |
|     if( partition_constraints_override_flag ) { | |
|       ph_log2_diff_min_qt_min_cb_inter_slice | ue (v) |
|       ph_max_mtt_hierarchy_depth_inter_slice | ue (v) |
|       if( ph_max_mtt_hierarchy_depth_inter_slice != 0 ) { | |
|         ph_log2_diff_max_bt_min_qt_inter_slice | ue (v) |
|         ph_log2_diff_max_tt_min_qt_inter_slice | ue (v) |
|       } | |
|     } | |
|     if( cu_qp_delta_enabled_flag ) | |
|       ph_cu_qp_delta_subdiv_inter_slice | ue (v) |
|     if( pps_cu_chroma_qp_offset_list_enabled_flag ) | |
|       ph_cu_chroma_qp_offset_subdiv_inter_slice | ue (v) |
|     if( sps_temporal_mvp_enabled_flag ) { | |
|       ph_temporal_mvp_enabled_flag | u (1) |
|       if( ph_temporal_mvp_enabled_flag && rpl_info_in_ph_flag ) { | |
|         ph_collocated_from_l0_flag | u (1) |
|         if( (ph_collocated_from_l0_flag && | |
|           num_ref_entries[ 0 ][ RplsIdx[ 0 ] ] > 1 ) \|\| | |
|           (!ph_collocated_from_l0_flag && | |
|           num_ref_entries[ 1 ][ RplsIdx[ 1 ] ] > 1 ) ) | |
|           ph_collocated_ref_idx | ue (v) |
|       } | |
|     } | |
|     mvd_l1_zero_flag | u (1) |
|     if( sps_fpel_mmvd_enabled_flag ) | |
|       ph_fpel_mmvd_enabled_flag | u (1) |
|     if( sps_bdof_pic_present_flag ) | |
|       ph_disable_bdof_flag | u (1) |
|     if( sps_dmvr_pic_present_flag ) | |
|       ph_disable_dmvr_flag | u (1) |
|     if( sps_prof_pic_present_flag ) | |
|       ph_disable_prof_flag | u (1) |
|     if( ( pps_weighted_pred_flag \|\| pps_weighted_bipred_flag ) && wp_info_in_ph_flag ) | |
|       pred_weight_table( ) | |
|   } | |
|   if( qp_delta_info_in_ph_flag ) | |
|     ph_qp_delta | se (v) |
|   if( sps_joint_cbcr_enabled_flag ) | |
|     ph_joint_cbcr_sign_flag | u (1) |
|   if( sps_sao_enabled_flag && sao_info_in_ph_flag ) { | |
|     ph_sao_luma_enabled_flag | u (1) |
|     if( ChromaArrayType != 0 ) | |
|       ph_sao_chroma_enabled_flag | u (1) |
|   } | |
|   if( sps_dep_quant_enabled_flag ) | |
|     ph_dep_quant_enabled_flag | u (1) |
|   if( sps_sign_data_hiding_enabled_flag && !ph_dep_quant_enabled_flag | |
| ) | |

TABLE 10-continued

Picture header structure syntax

| picture_header_structure( ) { | Descriptor |
|---|---|
|   pic_sign_data_hiding_enabled_flag | u (1) |
|   if( deblocking_filter_override_enabled_flag && dbf_info_in_ph_flag ) { | |
|     ph_deblocking_filter_override_flag | u (1) |
|     if( ph_deblocking_filter_override_flag ) { | |
|       ph_deblocking_filter_disabled_flag | u (1) |
|       if( !ph_deblocking_filter_disabled_flag ) { | |
|         ph_beta_offset_div2 | se (v) |
|         ph_tc_offset_div2 | se (v) |
|         ph_cb_beta_offset_div2 | se (v) |
|         ph_cb_tc_offset_div2 | se (v) |
|         ph_cr_beta_offset_div2 | se (v) |
|         ph_cr_tc_offset_div2 | se (v) |
|       } | |
|     } | |
|   } | |
|   if( picture_header_extension_present_flag ) { | |
|     ph_extension_length | ue (v) |
|     for( i = 0; i < ph_extension_length; i++) | |
|       ph_extension_data_byte[ i ] | u (8) |
|   } | |
| } | |

TABLE 11

Picture header structure semantics

The PH syntax structure contains information that is common for all slices of the coded picture associated with the PH syntax structure.
gdr_or_irap_pic_flag equal to 1 specifies that the current picture is a GDR or IRAP picture. gdr_or_irap_pic_flag equal to 0 specifies that the current picture may or may not be a GDR or IRAP picture.
gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.
ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.
ph_intra_slice_allowed_flag equal to 0 specifies that all coded slices of the picture have slice type equal to 0 or 1. ph_intra_slice_allowed_flag equal to 1 specifies that there may or may not be one or more coded slices in the picture that have slice_type equal to 2.When not present, the value of ph_intra_slice_allowed_flag is inferred to be equal to 1.
    NOTE 1 – For bitstreams that are supposed to work subpicture-based bitstream merging without the need of changing PH NAL units, the encoder is expected to set the values of both ph_inter_slice_allowed_flag and ph_intra_slice_allowed_flag equal to 1.
non_reference_picture_flag equal to 1 specifies the picture associated with the PH is never used as a reference picture, non_reference_picture_flag equal to 0 specifies the picture associated with the PH may or may not be used as a reference picture.
ph_pic_parameter_set_id specifies the value of pps_pic_parameter_set_id for the PPS in use. The value of ph_pic_parameter_set_id shall be in the range of 0 to 63, inclusive.
It is a requirement of bitstream conformance that the value of TemporalId of the PH shall be greater than or equal to the value of TemporalId of the PPS that has pps_pic_parameter_set_id equal to ph_pic_parameter_set_id.
ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4 + 4 bits. The value of the ph_pic_order_cnt_lsb shall be in the range of 0 to MaxPicOrderCntLsb − 1, inclusive.
no_output_of_prior_pics_flag affects the output of previously-decoded pictures in the DPB after the decoding of a CLVSS picture that is not the first picture in the bitstream as specified in Annex C.
recovery_poc_cnt specifies the recovery point of decoded pictures in output order. If the current picture is a GDR picture that is associated with the PH, and there is a picture pic A that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb − 1, inclusive.
When the current picture is a GDR picture, the variable RpPicOrderCntVal is derived as follows:
$$\text{RpPicOrderCntVal} = \text{PicOrderCntVal} + \text{recovery\_poc\_cnt} \qquad (81)$$

TABLE 11-continued

Picture header structure semantics

NOTE 2 – When gdr_enabled_flag is equal to 1 and PicOrderCntVal of the current picture is greater than or equal to RpPicOrderCntVal of the associated GDR picture, the current and subsequent decoded pictures in output order are an exact match to the corresponding pictures produced by starting the decoding process from the previous IRAP picture, when present, preceding the associated GDR picture in decoding order.

ph_extra_bit[ i ] may be equal to 1 or 0. Decoders conforming to this version of this Specification shall ignore the value of ph_extra_bit[ i ]. Its value does not affect decoder conformance to profiles specified in this version of the specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[ GeneralLayerIdx[ nuh_layer_id ] ] is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1 + 1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one or more or all slices associated with the PH. When not present, ph_alf_enabled_flag is inferred to be equal to 0.

ph_num_alf_aps_ids_luma specifies the number of ALF APSs that the slices associated with the PH refer to.

ph_alf_aps_id_luma[ i ] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[ i ] shall be equal to 1.

The TemporalId of the APS NAL unit having aps_params_type equal to ALF_APS and adaptation_parameter_set_id equal to ph_alf_aps_id_luma[ i ] shall be less than or equal to the TemporalId of the picture associated with the PH.

ph_alf_chroma_idc equal to 0 specifies that the adaptive loop filter is not applied to Cb and Cr colour components, ph_alf_chroma_idc equal to 1 indicates that the adaptive loop filter is applied to the Cb colour component, ph_alf_chroma_idc equal to 2 indicates that the adaptive loop filter is applied to the Cr colour component, ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to phalfapsidchroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices, ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-compoent filter for Cr colour component is enabled for all slices associated with the PH and may be applied to Cr colour component in the slices, ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type_equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

TABLE 11-continued

Picture header structure semantics ph_lmcs_aps_id specifies the adaptation_parameter_set_id of the LMCS APS that the
slices associated with the PH refers to. The TemporalId of the APS NAL unit having
aps_params_type equal to LMCS_APS and adaptation_parameter_set_id equal to
ph_lmcs_aps_id shall be less than or equal to the TemporalId of the picture associated with
PH.
ph_chroma_residual_scale_flag equal to 1 specifies that chroma residual scaling is
enabled for the all slices associated with the PH. ph_chroma_residual_scale_flag equal to 0
specifies that chroma residual scaling may be disabled for one, or more, or all slices
associated with the PH. When ph_chroma_residual_scale_flag is not present, it is inferred
to be equal to 0.
ph_scaling_list_present_flag equal to 1 specifies that the scaling list data used for the
slices associated wih the PH is derived based on the scaling list data contained in the
referenced scaling list APS. ph_scaling_list_present_flag equal to 0 specifies that the
scaling list data used for the slices associated with the PH is set to be equal to 16. When not
present, the value of ph_scaling_list_present_flag is inferred to be equal to 0.
ph_scaling_list_aps_id specifies the adaptation_parameter_set_id of the scaling list APS.
The TemporalId of the APS NAL unit having aps_params_type equal to SCALING_APS
and adaptation_parameter_set_id equal to ph_scaling_list_aps_id shall be less than or equal
to the TemporalId of the picture associated with PH.
ph_virtual_boundaries_present_flag equal to 1 specifies that information of virtual
boundaries is signalled in the PH. ph_virtual_boundaries_present_flag equal to 0 specifies
that information of virtual boundaries is not signalled in the PH. When there is one or more
than one virtual boundaries signalled in the PH, the in-loop filtering operations are disabled
across the virtual boundaries in the picture. The in-loop filtering operations include the
deblocking filter, sample adaptive offset filter, and adaptive loop filter operations. When
not present, the value of ph_virtual_boundaries_present_flag is inferred to be equal to 0.
It is a requirement of bitstream conformance that, when subpic_info_present_flag is equal
to 1, the value of ph_virtual_boundaries_present_flag shall be equal to 0.
The variable VirtualBoundariesPresentFlag is derived as follows:
  VirtualBoundariesPresentFlag = 0
  if( sps_virtual_boundaries_enabled_flag )
   VirtualBoundariesPresentFlag = sps_virtual_boundaries_present_flag
    ph_virtual_boundaries_present_flag
   (82)
ph_num_ver_virtual_boundaries specifies the number of
ph_virtual_boundaries_pos_x[ i ] syntax elements that are present in the PH. When
ph_num_ver_virtual_boundaries is not present, it is inferred to be equal to 0.
The variable NumVerVirtualBoundaries is derived as follows:
  NumVerVirtualBoundaries = 0
  if( sps_virtual_boundaries_enabled_flag )
   NumVerVirtualBoundaries = sps_virtual_boundaries_present_flag ?
    sps_num_ver_virtual_boundaries : ph_num_ver_virtual_boundaries (83)
ph_virtual_boundaries_pos_x[ i ] specifies the location of the i-th vertical virtual
boundary in units of luma samples divided by 8. The value of
ph_virtual_boundaries_pos_x[ i ] shall be in the range of 1 to
Ceil( pic_width_in_luma_samples ÷ 8 ) − 1, inclusive.
The list VirtualBoundariesPosX[ i ] for i ranging from 0 to NumVerVirtualBoundaries − 1,
inclusive, in units of luma samples, specifying the locations of the vertical virtual
boundaries, is derived as follows:
  for( i = 0; i < NumVerVirtualBoundaries; i++)
   VirtualBoundariesPosX[ i ] = ( sps_virtual_boundaries_present_flag ?
    sps_virtual_boundaries_pos_x[ i ] : ph_virtual_boundaries_pos_x[ i ] ) * 8
   (84)
The distance between any two vertical virtual boundaries shall be greater than or equal to
CtbSizeY luma samples.
ph_num_hor_virtual_boundaries specifies the number of
ph_virtual_boundaries_pos_y[ i ] syntax elements that are present in the PH. When
ph_num_hor_virtual_boundaries is not present, it is inferred to be equal to 0.
The parameter NumHorVirtualBoundaries is derived as follows:
  NumHorVirtualBoundaries = 0
  if( sps_virtual_boundaries_enabled_flag )
   NumHorVirtualBoundaries = sps_virtual_boundaries_present_flag ?
    sps_num_hor_virtual_boundaries : ph_num_hor_virtual_boundaries (85)
When sps_virtual_boundaries_enabled_flag is equal to 1 and
ph_virtual_boundaries_present_flag is equal to 1, the sum of
ph_num_ver_virtual_boundaries and ph_num_hor_virtual_boundaries shall be greater than
0.
ph_virtual_boundaries_pos_y[ i ] specifies the location of the i-th horizontal virtual
boundary in units of luma samples divided by 8. The value of
ph_virtual_boundaries_pos_y[ i ] shall be in the range of 1 to
Ceil( pic_height_in_luma_samples ÷ 8 ) − 1, inclusive.
The list VirtualBoundariesPosY[ i ] for i ranging from 0 to NumHorVirtualBoundaries − 1,
inclusive, in units of luma samples, specifying the locations of the horizontal virtual
boundaries, is derived as follows:
  for( i = 0; i < NumHorVirtualBoundaries; i++)
   VirtualBoundariesPosY[ i ] = ( sps_virtual_boundaries_present_flag ?
    sps_virtual_boundaries_pos_y[ i ] : ph_virtual_boundaries_pos_y[ i ] ) * 8
   (86)

TABLE 11-continued

Picture header structure semantics

The distance between any two horizontal virtual boundaries shall be greater than or equal to CtbSizeY luma samples.
pic_output_flag affects the decoded picture output and removal processes as specified in Annex C. When pic_output_flag is not present, it is inferred to be equal to 1.
partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.
ph_log2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log2_diff_min_qt_min_cb_intra_slice_luma shall be in the range of 0 to CtbLog2SizeY − MinCbLog2SizeY, inclusive. When not present, the value of ph_log2_diff_min_qt_min_cb_luma is inferred to be equal to sps_log2_diff_min_qt_min_cb_intra_slice_luma.
ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma shall be in the range of 0 to 2*( CtbLog2SizeY − MinCbLog2SizeY ), inclusive. When not present, the value of ph_max_mtt_hierarchy_depth_intra_slice_luma is inferred to be equal to sps_max_mtt_hierarchy_depth_intra_slice_luma.
ph_log2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log2_diff_max_bt_min_qt_intra_slice_luma shall be in the range of 0 to CtbLog2SizeY − MinQtLog2SizeIntraY, inclusive. When not present, the value of ph_log2_diff_max_bt_min_qt_intra_slice_luma is inferred to be equal to sps_log2_diff_max_bt_min_qt_intra_slice_luma.
ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log2_diff_max_tt_min_qt_intra_slice_luma shall be in the range of 0 to CtbLog2SizeY − MinQtLog2SizeIntraY, inclusive. When not present, the value of ph_log2_diff_max_tt_min_qt_intra_slice_luma is inferred to be equal to sps_log2_diff_max_tt_min_qt_intra_slice_luma.
ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice type equal to 2 (I) associated with the PH. The value of ph_log2_diff_min_qt_min_cb_intra_slice_chroma shall be in the range of 0 to CtbLog2SizeY − MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.
ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*( CtbLog2SizeY − MinCbLog2SizeY ), inclusive. When not present, the value of ph_max_mtt_hierarchy_depth_intra_slice_chroma is inferred to be equal to sps_max_mtt_hierarchy_depth_intra_slice_chroma.
ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice type equal to 2 (I) associated with the PH. The value of ph_log2_diff_max_bt_min_qt_intra_slice_chroma shall be in the range of 0 to CtbLog2SizeY − MinQtLog2SizeIntraC, inclusive. When not present, the value of ph_log2_diff_max_bt_min_qt_intra_slice_chroma is inferred to be equal to sps_log2_diff_max_bt_min_qt_intra_slice_chroma.
ph_log2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice type equal to 2 (I) associated with the PH. The value of ph_log2_diff_max_tt_min_qt_intra_slice_chroma shall be in the range of 0 to CtbLog2SizeY − MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma
ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to TABLE 11-continued Picture header structure semantics 2 * ( CtbLog2SizeY − MinQtLog2IntraY + ph_max_mtt_hierarchy_depth_intra_slice_luma ), inclusive.
When not present, the value of ph_cu_qp_delta_subdiv_intra_slice is inferred to be equal to 0.
ph_cu_chroma_qp_offset_subdiv_intra_slice specifies the maximum cb Subdiv value of coding units in intra slice that convey cu_chroma_qp_offset_flag. The value of ph_cu_chroma_qp_offset_subdiv_intra_slice shall be in the range of 0 to
2 * ( CtbLog2SizeY − MinQtLog2IntraY + ph_max_mtt_hierarchy_depth_intra_slice_luma ), inclusive.
When not present, the value of ph_cu_chroma_qp_offset_subdiv_intra_slice is inferred to be equal to 0.
ph_log2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log2_diff_min_qt_min_cb_inter_slice shall be in the range of 0 to CtbLog2SizeY − MinCbLog2SizeY, inclusive. When not present, the value of ph_log2_diff_min_qt_min_cb_luma is inferred to be equal to sps_log2_diff_min_qt_min_cb_inter_slice.
ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*( CtbLog2SizeY − MinCbLog2SizeY ), inclusive. When not present, the value of ph_max_mtt_hierarchy_depth_inter_slice is inferred to be equal to sps_max_mtt_hierarchy_depth_inter_slice.
ph_log2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice type equal to 0 (B) or 1 (P) associated with the PH. The value of ph_log2_diff_max_bt_min_qt_inter_slice shall be in the range of 0 to CtbLog2SizeY − MinQtLog2SizeInterY, inclusive. When not present, the value of ph_log2_diff_max_bt_min_qt_inter_slice is inferred to be equal to sps_log2_diff_max_bt_min_qt_inter_slice.
ph_log2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log2_diff_max_tt_min_qt_inter_slice shall be in the range of 0 to CtbLog2SizeY − MinQtLog2SizeInterY, inclusive. When not present, the value of ph_log2_diff_max_tt_min_qt_inter_slice is inferred to be equal to sps_log2_diff_max_tt_min_qt_inter_slice.
ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to
2 * ( CtbLog2SizeY − MinQtLog2SizeInterY + ph_max_mtt_hierarchy_depth_inter_slice ) , inclusive.
When not present, the value of ph_cu_qp_delta_subdiv_inter_slice is inferred to be equal to 0.
ph_cu_chroma_qp_offset_subdiv_inter_slice specifies the maximum cb Subdiv value of coding units in inter slice that convey cu_chroma_qp_offset_flag. The value of ph_cu_chroma_qp_offset_subdiv_inter_slice shall be in the range of 0 to
2 * ( CtbLog2SizeY − MinQtLog2SizeInterY + ph_max_mtt_hierarchy_depth_inter_slice ) , inclusive.
When not present, the value of ph_cu_chroma_qp_offset_subdiv_inter_slice is inferred to be equal to 0.
ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.
The maximum number of subblock-based merging MVP candidates, MaxNumSubblockMergeCand, is derived as follows:
    if( sps_affine_enabled_flag )
      MaxNumSubblockMergeCand = 5 −
      five_minus_max_num_subblock_merge_cand         (87)
    else
      MaxNumSubblockMergeCand =
      sps_sbtmvp_enabled_flag && ph_temporal_mvp_enable_flag
The value of MaxNumSubblockMergeCand shall be in the range of 0 to 5, inclusive.
ph_collocated_from_l0_flag equal to 1 specifies that the collocated picture used for temporal motion vector prediction is derived from reference picture list 0.

TABLE 11-continued

Picture header structure semantics ph_collocated_from_l0_flag equal to 0 specifies that the collocated picture used for temporal motion vector prediction is derived from reference picture list 1.
ph_collocated_ref_idx specifies the reference index of the collocated picture used for temporal motion vector prediction.
When ph_collocated_from_l0_flag is equal to 1, ph_collocated_ref_idx refers to an entry in reference picture list 0, and the value of ph_collocated_ref_idx shall be in the range of 0 to num_ref_entries[ 0 ][ RplsIdx[ 0 ] ] − 1, inclusive.
When ph_collocated_from_l0_flag is equal to 0, ph_collocated_ref_idx refers to an entry in reference picture list 1, and the value of ph_collocated_ref_idx shall be in the range of 0 to num_ref_entries[ 1 ][ RplsIdx 1 ] ] − 1, inclusive.
When not present, the value of ph_collocated_ref_idx is inferred to be equal to 0.
mvd_l1_zero_flag equal to 1 indicates that the mvd_coding( x0, y0, 1 ) syntax structure is not parsed and MvdL1[ x0 ][ y0 ][ compIdx ] and
MvdCpL1[ x0 ][ y0 ][ cpIdx ][ compIdx ] are set equal to 0 for compIdx = 0..1 and cpIdx = 0..2. mvd_l1_zero_flag equal to 0 indicates that the mvd_coding( x0, y0, 1 ) syntax structure is parsed.
ph_fpel_mmvd_enabled_flag equal to 1 specifies that merge mode with motion vector difference uses integer sample precision in the slices associated with the PH.
ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.
ph_disable_bdof_flag equal to 1 specifies that bi-directional optical flow inter prediction based inter bi-prediction is disabled in the slices associated with the PH.
ph_disable_bdof_flag equal to 0 specifies that bi-directional optical flow inter prediction based inter bi-prediction may or may not be enabled in the slices associated with the PH.
When ph_disable_bdof_flag is not present, the following applies:
– If sps_bdof_enabled_flag is equal to 1, the value of ph_disable_bdof_flag is inferred to be equal to 0.
– Otherwise (sps_bdof_enabled_flag is equal to 0), the value of ph_disable_bdof_flag is inferred to be equal to 1.
ph_disabled_mvr_flag equal to 1 specifies that decoder motion vector refinement based inter bi-prediction is disabled in the slices associated with the PH. ph_disabled_mvr_flag equal to 0 specifies that decoder motion vector refinement based inter bi-prediction may or may not be enabled in the slices associated with the PH.
When ph_disable_dmvr_flag is not present, the following applies:
– If sps_dmvr_enabled_flag is equal to 1, the value of ph_disable_dmvr_flag is inferred to be equal to 0.
– Otherwise (sps_dmvr_enabled_flag is equal to 0), the value of ph_disable_dmvr_flag is inferred to be equal to 1.
ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.
When ph_disable_prof_flag is not present, the following applies:
– If sps_affine_prof_enabled_flag is equal to 1, the value of ph_disable_prof_flag is inferred to be equal to 0.
– Otherwise (sps_affine_prof_enabled_flag is equal to 0), the value of ph_disable_prof_flag is inferred to be equal to 1.
ph_qp_delta specifies the initial value of $Qp_Y$ to be used for the coding blocks in the picture until modified by the value of CuQpDeltaVal in the coding unit layer.
When qp_delta_info_in_ph_flag is equal to 1, the initial value of the $Qp_Y$ quantization parameter for all slices of the picture, $SliceQp_Y$, is derived as follows:
$$SliceQp_Y = 26 + init\_qp\_minus26 + ph\_qp\_delta \quad (88)$$
The value of $SliceQp_Y$ shall be in the range of −QpBdOffset to +63, inclusive.
ph_joint_cbcr_sign_flag specifies whether, in transform units with
tu_joint_cbcr_residual_flag[ x0 ][ y0 ] equal to 1, the collocated residual samples of both chroma components have inverted signs. When tu_joint_cbcr_residual_flag[ x0 ][ y0 ] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.
ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.
ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.
ph_dep_quant_enabled_flag equal to 0 specifies that dependent quantization is disabled for the current picture, ph_dep_quant_enabled_flag equal to 1 specifies that dependent quantization is enabled for the current picture. When ph_dep_quant_enabled_flag is not present, it is inferred to be equal to 0.
pic_sign_data_hiding_enabled_flag equal to 0 specifies that sign bit hiding is disabled

TABLE 11-continued

Picture header structure semantics for the current picture, pic_sign_data_hiding_enabled_flag equal to 1 specifies that sign bit hiding is enabled for the current picture. When pic_sign_data_hiding_enabled_flag is not present, it is inferred to be equal to 0.
ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.
ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.
ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.
ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.
ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.
ph_extension_length specifies the length of the PH extension data in bytes, not including the bits used for signalling ph_extension_length itself The value of ph_extension_length shall be in the range of 0 to 256, inclusive. When not present, the value of ph_extension_length is inferred to be equal to 0.
ph_extension_data_byte may have any value. Decoders conforming to this version of this Specification shall ignore the value of ph_extension_data_byte. Its value does not affect decoder conformance to profiles specified in this version of specification.

Improvements to Syntax Elements

In current VVC, when there are similar syntax elements for intra and inter prediction respectively, in some places the syntax elements related to inter prediction are defined prior to those related to intra prediction. Such an order may not be preferable, given the fact that intra prediction is allowed in all picture/slice types while inter prediction is not. It would be beneficial from a standardization point of view to always define intra prediction related syntaxes prior to those for inter prediction.

It is also observed that in the current VVC, some syntax elements that are highly correlated to each other are defined at different places in a spread manner. It would also be beneficial from a standardization point of view to group some syntaxes together.

Proposed Methods

Methods are provided to simplify and/or further improve the existing design of the high-level syntax. It is noted that the invented methods could be applied independently or jointly.

Grouping the Partition Constraint Syntax Elements by Prediction Type

In this disclosure, it is proposed to rearrange the syntax elements so that the intra prediction related syntax elements are defined before those related to inter prediction. According to the disclosure, the partition constraint syntax elements are grouped by prediction type, with intra prediction related first, followed by inter prediction related. In one embodiment, the order of the partition constraint syntax elements in SPS is consistent with the order of the partition constraint syntax elements in the picture header. An example of the decoding process on VVC Draft is illustrated in Table 12 below. The changes to the VVC Draft are shown using the bold and italicized font.

TABLE 12

Proposed sequence parameter set RBSP syntax

| seq_parameter_set_rbsp( ) { | Descriptor |
|---|---|
| ... | |
|   if(ChromaArrayType != 0 ) | |
|     qtbtt_dual_tree_intra_flag | u (1) |
|   log2_min_luma_coding_block_size_minus2 | ue (v) |
|   partition_constraints_override_enabled_flag | u (1) |
|   sps_log2_diff_min_qt_min_cb_intra_slice_luma | ue (v) |
|   sps_max_mtt_hierarchy_depth_intra_slice_luma | ue (v) |
|   if( sps_max_mtt_hierarchy_depth_intra_slice_luma != 0 ) { | |

TABLE 12-continued

Proposed sequence parameter set RBSP syntax

| seq_parameter_set_rbsp( ) { | Descriptor |
|---|---|
|     sps_log2_diff_max_bt_min_qt_intra_slice_luma | ue (v) |
|     sps_log2_diff_max_tt_min_qt_intra_slice_luma | ue (v) |
|   } | |
|   *if( qtbtt_dual_tree_intra_flag ) {* | |
|     *sps_log2_diff_min_qt_min_cb_intra_slice_chroma* | *ue(v)* |
|     *sps_max_mtt_hierarchy_depth_intra_slice_chroma* | *ue(v)* |
|     *if( sps_max_mtt_hierarchy_depth_intra_slice_chroma != 0 ) {* | |
|       *sps_log2_diff_max_bt_min_qt_intra_slice_chroma* | *ue(v)* |
|       *sps_log2_diff_max_tt_min_qt_intra_slice_chroma* | *ue(v)* |
|     *}* | |
|   *}* | |
|   sps_log2_diff_min_qt_min_cb_inter_slice | ue (v) |
|   sps_max_mtt_hierarchy_depth_inter_slice | ue (v) |
|   if( sps_max_mtt_hierarchy_depth_inter_slice != 0 ) { | |
|     sps_log2_diff_max_bt_min_qt_inter_slice | ue (v) |
|     sps_log2_diff_max_tt_min_qt_inter_slice | ue (v) |
|   } | |
|   ~~if( qtbtt_dual_tree_intra_flag ) {~~ | |
|     ~~sps_log2_diff_min_qt_min_cb_intra_slice_chroma~~ | ~~ue(v)~~ |
|     ~~sps_max_mtt_hierarchy_depth_intra_slice_chroma~~ | ~~ue(v)~~ |
|     ~~if( sps_max_mtt_hierarchy_depth_intra_slice_chroma != 0 ) {~~ | |
|       ~~sps_log2_diff_max_bt_min_qt_intra_slice_chroma~~ | ~~ue(v)~~ |
|       ~~sps_log2_diff_max_tt_min_qt_intra_slice_chroma~~ | ~~ue(v)~~ |
|     ~~}~~ | |
|   ~~}~~ | |
|   ... | |
| } | |

Grouping the Dual-Tree Chroma Syntax Elements

In this disclosure, it is proposed to group the syntax elements related to dual-tree chroma type. In one embodiment, the partition constraint syntax elements for dual-tree chroma in SPS should be signaled together under dual-tree chroma cases. An example of the decoding process on VVC Draft is illustrated in Table 13 below. The changes to the VVC Draft are shown using bold and italicized font.

TABLE 13

Proposed sequence parameter set RBSP syntax

| seq_parameter_set_rbsp( ) { | Descriptor |
|---|---|
|   ... | |
|   ~~if( ChromaArrayType != 0 )~~ | |
|     ~~qtbtt_dual_tree_intra_flag~~ | ~~u(1)~~ |
|   log2_min_luma_coding_block_size_minus2 | ue (v) |
|   partition_constraints_override_enabled_flag | u (1) |
|   sps_log2_diff_min_qt_min_cb_intra_slice_luma | ue (v) |
|   sps_max_mtt_hierarchy_depth_intra_slice_luma | ue (v) |
|   if( sps_max_mtt_hierarchy_depth_intra_slice_luma != 0 ) { | |
|     sps_log2_diff_max_bt_min_qt_intra_slice_luma | ue (v) |
|     sps_log2_diff_max_tt_min_qt_intra_slice_luma | ue (v) |
|   } | |
|   sps_log2_diff_min_qt_min_cb_inter_slice | ue (v) |
|   sps_max_mtt_hierarchy_depth_inter_slice | ue (v) |
|     if( sps_max_mtt_hierarchy_depth_inter_slice != 0 ) { | |
|       sps_log2_diff_max_bt_min_qt_inter_slice | ue (v) |
|       sps_log2_diff_max_tt_min_qt_inter_slice | ue (v) |
|     } | |
|   *if( ChromaArrayType != 0 ) {* | |
|   *qtbtt_dual_tree_intra_flag* | *u(1)* |
|     if( qtbtt_dual_tree_intra_flag ) { | |
|       sps_log2_diff_min_qt_min_cb_intra_slice_chroma | ue (v) |
|       sps_max_mtt_hierarchy_depth_intra_slice_chroma | ue (v) |
|       if( sps_max_mtt_hierarchy_depth_intra_slice_chroma != 0 ) { | |
|         sps_log2_diff_max_bt_min_qt_intra_slice_chroma | ue (v) |
|         sps_log2_diff_max_tt_min_qt_intra_slice_chroma | ue (v) |
|       } | |
|     } | |
|   *}* | |
|   ... | |
| } | |

If also considering defining intra prediction related syntaxes prior to those related to inter prediction, according to the method of the disclosure, another example of the decoding process on VVC Draft is illustrated in Table 14 below. The changes to the VVC Draft are shown using bold and italicized font.

TABLE 14

Proposed sequence parameter set RBSP syntax

| seq_parameter_set_rbsp( ) { | Descriptor |
|---|---|
| ... | |
| ~~if( ChromaArrayType != 0 )~~ | |
| ~~qtbtt_dual_tree_intra_flag~~ | ~~u(1)~~ |
| log2_min_luma_coding_block_size_minus2 | ue (v) |
| partition_constraints_override_enabled_flag | u (1) |
| sps_log2_diff_min_qt_min_cb_intra_slice_luma | ue (v) |
| sps_max_mtt_hierarchy_depth_intra_slice_luma | ue (v) |
| if( sps_max_mtt_hierarchy_depth_intra_slice_luma != 0 ) { | |
|   sps_log2_diff_max_bt_min_qt_intra_slice_luma | ue (v) |
|   sps_log2_diff_max_tt_min_qt_intra_slice_luma | ue (v) |
| } | |
| *if( ChromaArrayType != 0 ) {* | |
|   *qtbtt_dual_tree_intra_flag* | *u(1)* |
|   *if( qtbtt_dual_tree_intra_flag ) {* | |
|     *sps_log2_diff_min_qt_min_cb_intra_slice_chroma* | *ue(v)* |
|     *sps_max_mtt_hierarchy_depth_intra_slice_chroma* | *ue(v)* |
|     *if( sps_max_mtt_hierarchy_depth_intra_slice_chroma != 0 ) {* | |
|       *sps_log2_diff_max_bt_min_qt_intra_slice_chroma* | *ue(v)* |
|       *sps_log2_diff_max_tt_min_qt_intra_slice_chroma* | |
|     *}* | |
|   *}* | |
| *}* | |
| sps_log2_diff_min_qt_min_cb_inter_slice | ue (v) |
| sps_max_mtt_hierarchy_depth_inter_slice | ue (v) |
| if( sps_max_mtt_hierarchy_depth_inter_slice != 0 ) { | |
|   sps_log2_diff_max_bt_min_qt_inter_slice | ue (v) |
|   sps_log2_diff_max_tt_min_qt_inter_slice | ue (v) |
| } | |
| ~~if( qtbtt_dual_tree_intra_flag ) {~~ | |
|   ~~sps_log2_diff_min_qt_min_cb_intra_slice_chroma~~ | ~~ue(v)~~ |
|   ~~sps_max_mtt_hierarchy_depth_intra_slice_chroma~~ | ~~ue(v)~~ |
|   ~~if( sps_max_mtt_hierarchy_depth_intra_slice_chroma != 0 ) {~~ | |
|     ~~sps_log2_diff_max_bt_min_qt_intra_slice_chroma~~ | ~~ue(v)~~ |
|     ~~sps_log2_diff_max_tt_min_qt_intra_slice_chroma~~ | ~~ue(v)~~ |
|   ~~}~~ | |
| ~~}~~ | |
| ... | |
| } | |

Conditionally Signaling Inter-Prediction Related Syntax Elements

As mentioned in the earlier description, according to the current VVC, intra prediction is allowed in all picture/slice types while inter prediction is not. According to this disclosure, it is proposed to add a flag in VVC syntax at a certain coding level to indicate whether inter prediction is allowed or not in a sequence, picture, and/or slice. In case inter prediction is not allowed, inter-prediction related syntaxes are not signaled at the corresponding coding level, e.g., sequence, picture, and/or slice level.

It is also proposed to add a flag in VVC syntax at a certain coding level to indicate whether inter slices such as P-slice and B-slice are allowed or not in a sequence, picture, and/or slice. In case inter slices are not allowed, inter slices related syntaxes are not signaled at the corresponding coding level, e.g., sequence, picture, and/or slice level.

Some examples are given based on the proposed inter slices allowed flags in the following section. And, the proposed inter prediction allowed flags can be used in a similar way.

When the proposed inter slice allowed flags are added at different levels. These flags can be signaled in a hierarchical manner. When the signaled flag at a higher level indicates that inter slice is not allowed, the flag at lower levels has no need to be signaled and can be inferred as 0 (which means inter slice is not allowed).

In one or more examples, a flag is added in SPS to indicate if inter slice is allowed in coding the current video sequence. In case it is not allowed, inter slice related syntax elements are not signaled in SPS. An example of the decoding process on VVC Draft is illustrated in Table 15 below. The changes to the VVC Draft are shown using bold and italicized font. It is noted that there are syntax elements other than those introduced in the example. For example, there are many inter slice (or inter prediction tools) related syntax elements such as sps_weighted_pred_flag, sps_temporal_mvp_enabled_flag, sps_amvr_enabled_flag, sps_bdof enabled_flag and so on; there are also syntax elements related to the reference picture lists such as long_term_ref_pics_flag, inter_layer_ref_pics_present_flag, sps_idr_rpl_present_flag and so on. All these syntax elements related to inter prediction can selectively be controlled by the proposed flag.

TABLE 15

| Proposed sequence parameter set RBSP syntax | |
| --- | --- |
| seq_parameter_set_rbsp( ) { | Descriptor |
|     sps_seq_parameter_set_id | u (4) |
|     sps_video_parameter_set_id | u (4) |
|     sps_max_sublayers_minus1 | u (3) |
|     sps_reserved_zero_4bits | u (4) |
|     sps_ptl_dpb_hrd_params_present_flag | u (1) |
|     if( sps_ptl_dpb_hrd_params_present_flag ) | |
|         profile_tier_level( 1, sps_max_sublayers_minus1 ) | |
|     gdr_enabled_flag | u (1) |
|     chroma_format_idc | u (2) |
|     if( chroma_format_idc = = 3 ) | |
|         separate_colour_plane_flag | u (1) |
|     res_change_in_clvs_allowed_flag | u (1) |
|     pic_width_max_in_luma_samples | ue (v) |
|     pic_height_max_in_luma_samples | ue (v) |
|     sps_conformance_window_flag | u (1) |
|     if( sps_conformance_window_flag ) { | |
|         sps_conf_win_left_offset | ue (v) |
|         sps_conf_win_right_offset | ue (v) |
|         sps_conf_win_top_offset | ue (v) |
|         sps_conf_win_bottom_offset | ue (v) |
|     } | |
|     sps_log2_ctu_size_minus5 | u (2) |
|     subpic_info_present_flag | u (1) |
|     if( subpic_info_present_flag ) { | |
|         sps_num_subpics_minus1 | ue (v) |
|         sps_independent_subpics_flag | u (1) |
|         for( i = 0; sps_num_subpics_minus1 > 0&& i <= sps_num_subpics_minus1; i++ ) { | |
|             if( i > 0 && pic_width_max_in_luma_samples > CtbSizeY ) | |
|                 subpic_ctu_top_left_x[ i ] | u (v) |
|             if( i > 0 && pic_height_max_in_luma_samples > CtbSizeY ) { | |
|                 subpic_ctu_top_left_y[ i ] | u (v) |
|             if( i < sps_num_subpics_minus1 && | |
|                 pic_width_max_in_luma_samples > CtbSizeY ) | |
|                 subpic_width_minus1[ i ] | u (v) |
|             if( i < sps_num_subpics_minus1 && | |
|                 pic_height_max_in_luma_samples > CtbSizeY ) | |
|                 subpic_height_minus1[ i ] | u (v) |
|             if( !sps_independent_subpics_flag) { | |
|                 subpic_treated_as_pic_flag[ i ] | u (1) |
|                 loop_filter_across_subpic_enabled_flag[ i ] | u (1) |
|             } | |
|         } | |
|         sps_subpic_id_len_minus1 | ue (v) |
|         subpic_id_mapping_explicitly_signalled_flag | u (1) |
|         if( subpic_id_mapping_explicitly_signalled_flag ) { | |
|             subpic_id_mapping_in_sps_flag | u (1) |
|             if( subpic_id_mapping_in_sps_flag ) | |
|                 for(i = 0;i <= sps_num_subpics_minus1; i++ ) | |
|                     sps_subpic_id[ i ] | u (v) |
|         } | |
|     } | |
|     bit_depth_minus8 | ue (v) |
|     sps_entropy_coding_sync_enabled_flag | u (1) |
|     if( sps_entropy_coding_sync_enabled_flag ) | |
|         sps_wpp_entry_point_offsets_present_flag | u (1) |
|     *sps_inter_slice_allowed_flag* | *u(1)* |
|     *if(sps_inter_slice_allowed_flag ) {* | |
|     sps_weighted_pred_flag | u (1) |
|     sps_weighted_bipred_flag | u (1) |
|     *}* | |
|     log2_max_pic_order_cnt_lsb_minus4 | u (4) |
|     sps_poc_msb_flag | u (1) |
|     if( sps_poc_msb_flag ) | |
|         poc_msb_len_minus1 | ue (v) |
|     num_extra_ph_bits_bytes | u (2) |
|     extra_ph_bits_struct( num_extra_ph_bits_bytes ) | |
|     num_extra_sh_bits_bytes | u (2) |
|     extra_sh_bits_struct( num_extra_sh_bits_bytes ) | |
|     if( sps_max_sublayers_minus1 > 0 ) | |
|         sps_sublayer_dpb_params_flag | u (1) |
|     if( sps_ptl_dpb_hrd_params_present_flag ) | |
|         dpb_parameters( sps_max_sublayers_minus1, sps_sublayer_dpb_params_flag ) | |
|     long_term_ref_pics_flag | u (1) |
|     inter_layer_ref_pics_present_flag | u (1) |

TABLE 15-continued

Proposed sequence parameter set RBSP syntax

| seq_parameter_set_rbsp( ) { | Descriptor |
|---|---|
| sps_idr_rpl_present_flag | u (1) |
| rpl1_same_as_rpl0_flag | u (1) |
| for( i = 0; i < rpl1_same_as_rpl0_flag ? 1 : 2; i++ ) { | |
|   num_ref_pic_lists_in_sps[ i ] | ue (v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u (1) |
| log2_min_luma_coding_block_size_minus2 | ue (v) |
| partition_constraints_override_enabled_flag | u (1) |
| sps_log2_diff_min_qt_min_cb_intra_slice_luma | ue (v) |
| sps_max_mtt_hierarchy_depth_intra_slice_luma | ue (v) |
| if( sps_max_mtt_hierarchy_depth_intra_slice_luma != 0 ) { | |
|   sps_log2_diff_max_bt_min_qt_intra_slice_luma | ue (v) |
|   sps_log2_diff_max_tt_min_qt_intra_slice_luma | ue (v) |
| } | |
| *if(sps_inter_slice_allowed_flag ) {* | |
| sps_log2_diff_min_qt_min_cb_inter_slice | ue (v) |
| sps_max_mtt_hierarchy_depth_inter_slice | ue (v) |
| if( sps_max_mtt_hierarchy_depth_inter_slice != 0 ) { | |
|   sps_log2_diff_max_bt_min_qt_inter_slice | ue (v) |
|   sps_log2_diff_max_tt_min_qt_inter_slice | ue (v) |
| } | |
| } | |
| if( qtbtt_dual_tree_intra_flag ) { | |
|   sps_log2_diff_min_qt_min_cb_intra_slice_chroma | ue (v) |
|   sps_max_mtt_hierarchy_depth_intra_slice_chroma | ue (v) |
|   if( sps_max_mtt_hierarchy_depth_intra_slice_chroma != 0 ) { | |
|     sps_log2_diff_max_bt_min_qt_intra_slice_chroma | ue (v) |
|     sps_log2_diff_max_tt_min_qt_intra_slice_chroma | ue (v) |
|   } | |
| } | |
| sps_max_luma_transform_size_64_flag | u (1) |
| if( ChromaArrayType != 0 ) { | |
|   sps_joint_cbcr_enabled_flag | u (1) |
|   same_qp_table_for_chroma | u (1) |
|   numQpTables = same_qp_table_for_chroma ? 1 : | |
| ( sps_joint_cbcr_enabled_flag ? 3 : 2 ) | |
|   for( i = 0; i < numQpTables; i++ ) { | |
|     qp_table_start_minus26[ i ] | se (v) |
|     num_points_in_qp_table_minus1[ i ] | ue (v) |
|     for( j = 0; j <= num_points_in_qp_table_minus1[ i ]; j++ ) { | |
|       delta_qp_in_val_minus1[ i ][ j ] | ue (v) |
|       delta_qp_diff_val[ i ][ j ] | ue (v) |
|     } | |
|   } | |
| } | |
| sps_sao_enabled_flag | u (1) |
| sps_alf_enabled_flag | u (1) |
| if( sps_alf_enabled_flag && ChromaArrayType != 0 ) | |
|   sps_cc_alf_enabled_flag | u (1) |
| sps_transform_skip_enabled_flag | u (1) |
| if( sps_transform_skip_enabled_flag ) { | |
|   log2_transform_skip_max_size_minus2 | ue (v) |
|   sps_bdpcm_enabled_flag | u (1) |
| } | |
| *if(sps_inter_slice_allowed_flag ) {* | |
| sps_ref_wraparound_enabled_flag | u (1) |
| sps_temporal_mvp_enabled_flag | u (1) |
| if( sps_temporal_mvp_enabled_flag ) | |
|   sps_sbtmvp_enabled_flag | u (1) |
| sps_amvr_enabled_flag | u (1) |
| sps_bdof_enabled_flag | u (1) |
| if( sps_bdof_enabled_flag ) | |
|   sps_bdof_pic_present_flag | u (1) |
| sps_smvd_enabled_flag | u (1) |
| sps_dmvr_enabled_flag | u (1) |
| if( sps_dmvr_enabled_flag ) | |
|   sps_dmvr_pic_present_flag | u (1) |
| sps_mmvd_enabled_flag | u (1) |
| *}* | |
| sps_isp_enabled_flag | u (1) |
| sps_mrl_enabled_flag | u (1) |
| sps_mip_enabled_flag | u (1) |
| if( ChromaArrayType != 0 ) | |

TABLE 15-continued

Proposed sequence parameter set RBSP syntax

| seq_parameter_set_rbsp( ) { | Descriptor |
|---|---|
|    sps_cclm_enabled_flag | u (1) |
|    if( chroma_format_idc = = 1 ) { | |
|      sps_chroma_horizontal_collocated_flag | u (1) |
|      sps_chroma_vertical_collocated_flag | u (1) |
|    } | |
|    sps_mts_enabled_flag | u (1) |
|    if( sps_mts_enabled_flag ) { | |
|      sps_explicit_mts_intra_enabled_flag | u (1) |
|      *if(sps_inter_slice_allowed_flag )* | |
|      sps_explicit_mts_inter_enabled_flag | u (1) |
|    } | |
|    *if(sps_inter_slice_allowed_flag ) {* | |
|      six_minus_max_num_merge_cand | ue (v) |
|      sps_sbt_enabled_flag | u (1) |
|      sps_affine_enabled_flag | u (1) |
|      if( sps_affine_enabled_flag ) { | |
|         five_minus_max_num_subblock_merge_cand | ue (v) |
|         sps_affine_type_flag | u (1) |
|         if( sps_amvr_enabled_flag ) | |
|            sps_affine_amvr_enabled_flag | u (1) |
|         sps_affine_prof_enabled_flag | u (1) |
|         if( sps_affine_prof_enabled_flag ) | |
|            sps_prof_pic_present_flag | u (1) |
|      } | |
|    *}* | |
|    sps_palette_enabled_flag | u (1) |
|    if(ChromaArrayType = = 3 | |
|    && !sps_max_luma_transform_size_64_flag ) | |
|      sps_act_enabled_flag | u (1) |
|    if( sps_transform_skip_enabled_flag \|\| sps_palette_enabled_flag ) | |
|      min_qp_prime_ts_minus4 | ue (v) |
| *if(sps_inter_slice_allowed_flag )* | |
|    sps_bcw_enabled_flag | u (1) |
|    sps_ibc_enabled_flag | u (1) |
|    if( sps_ibc_enabled_flag ) | |
|      six_minus_max_num_ibc_merge_cand | ue (v) |
| *if(sps_inter_slice_allowed_flag ) {* | |
|    sps_ciip_enabled_flag | u (1) |
|    if( sps_mmvd_enabled_flag ) | |
|      sps_fpel_mmvd_enabled_flag | u (1) |
|    if( MaxNumMergeCand >= 2 ) { | |
|      sps_gpm_enabled_flag | u (1) |
|      if( sps_gpm_enabled_flag && MaxNumMergeCand >= 3 ) | |
|         max_num_merge_cand_minus_max_num_gpm_cand | ue (v) |
|    } | |
| *}* | |
|    sps_lmcs_enabled_flag | u (1) |
|    sps_lfnst_enabled_flag | u (1) |
|    sps_ladf_enabled_flag | u (1) |
|    if( sps_ladf_enabled_flag ) { | |
|      sps_num_ladf_intervals_minus2 | u (2) |
|      sps_ladf_lowest_interval_qp_offset | se (v) |
|      for( i = 0; i < sps_num_ladf_intervals_minus2 + 1; i++ ) { | |
|         sps_ladf_qp_offset[ i ] | se (v) |
|         sps_ladf_delta_threshold_minus1[ i ] | ue (v) |
|      } | |
|    } | |
| *if(sps_inter_slice_allowed_flag )* | |
|    log2_parallel_merge_level_minus2 | ue (v) |
|    sps_explicit_scaling_list_enabled_flag | u (1) |
|    sps_dep_quant_enabled_flag | u (1) |
|    if( !sps_dep_quant_enabled_flag ) | |
|      sps_sign_data_hiding_enabled_flag | u (1) |
|    sps_virtual_boundaries_enabled_flag | u (1) |
|    if( sps_virtual_boundaries_enabled_flag ) { | |
|      sps_virtual_boundaries_present_flag | u (1) |
|      if( sps_virtual_boundaries_present_flag ) { | |
|         sps_num_ver_virtual_boundaries | u (2) |
|         for( i = 0; i < sps_num_ver_virtual_boundaries; i++ ) | |
|            sps_virtual_boundaries_pos_x[ i ] | u (13) |
|         sps_num_hor_virtual_boundaries | u (2) |
|         for( i = 0; i < sps_num_hor_virtual_boundaries; i++ ) | |
|            sps_virtual_boundaries_pos_y[ i ] | u (13) |
|      } | |
|    } | |
|    if( sps_ptl_dpb_hrd_params_present_flag ) { | |

TABLE 15-continued

| Proposed sequence parameter set RBSP syntax | |
|---|---|
| seq_parameter_set_rbsp( ) { | Descriptor |
|    sps_general_hrd_params_present_flag | u (1) |
|    if( sps_general_hrd_params_present_flag ) { | |
|       general_hrd_parameters( ) | |
|       if( sps_max_sublayers_minus1 > 0 ) | |
|          sps_sublayer_cpb_params_present_flag | u (1) |
|       firstSubLayer = sps_sublayer_cpb_params_present_flag ? 0 : | |
|          sps_max_sublayers_minus1 | |
|       ols_hrd_parameters( firstSubLayer, sps_max_sublayers_minus1 ) | |
|    } | |
| } | |
| field_seq_flag | u (1) |
| vui_parameters_present_flag | u (1) |
| if( vui_parameters_present_flag ) | |
|    vui_parameters( ) /* Specified in ITU-T H.SEI \| ISO/IEC 23002-7 */ | |
| sps_extension_flag | u (1) |
| if( sps_extension_flag ) | |
|    while( more_rbsp_data( ) ) | |
|       sps_extension_data_flag | u (1) |
| rbsp_trailing_bits( ) | |
| } | |

7.4.3.3 Sequence Parameter Set RBSP Semantics sps_inter_slice_allowed_flag equal to 0 specifies that all coded slices of the video sequence have slice type equal to 2 (which indicates that the coded slice is I slice). sps_inter_slice_allowed_flag equal to 1 specifies that there may or may not be one or more coded slices in the video sequence that have slice type equal to 0 (which indicates that the coded slice is P slice) or 1 (which indicates that the coded slice is B slice).

In another example, according to the method of the disclosure, a flag is added in picture parameter set PPS to indicate if inter slice is allowed in coding the pictures associated with this PPS. In case it is not allowed, the selected inter prediction related syntax elements are not signaled in PPS.

In yet another example, according to the method of the disclosure, the inter slice allowed flags can be signaled in a hierarchical manner. A flag is added in SPS to indicate if inter slice is allowed in coding the pictures associated with this SPS, e.g., sps_inter_slice_allowed_flag. When sps_inter_slice_allowed_flag is equal to 0 (which means inter slice is not allowed), the inter slice allowed flag in picture header can be omitted for signaling and be inferred as 0. An example of the decoding process on VVC Draft is illustrated in Table 16 below. The changes to the VVC Draft are shown using bold and italicized font.

TABLE 16

| Proposed sequence parameter set RBSP syntax | |
|---|---|
| picture_header_structure( ) { | Descriptor |
| ... | |
|   *if(sps_inter_slice_allowed_flag )* | |
|     ph_inter_slice_allowed_flag | u (1) |
|   if( ph_inter_slice_allowed_flag ) | |
|     ph_intra_slice_allowed_flag | u (1) |
| ... | |
| } | |

7.4.3.7 Picture Header Structure Semantics ph_inter_slice_allowed_flag equal to 0 specifies that all coded slices of the picture have slice type equal to 2. ph_inter_slice_allowed_flag equal to 1 specifies that there may or may not be one or more coded slices in the picture that have slice type equal to 0 or 1. When not present, the value of ph_inter_slice_allowed_flag is inferred to be equal to 0.

Figure 4:
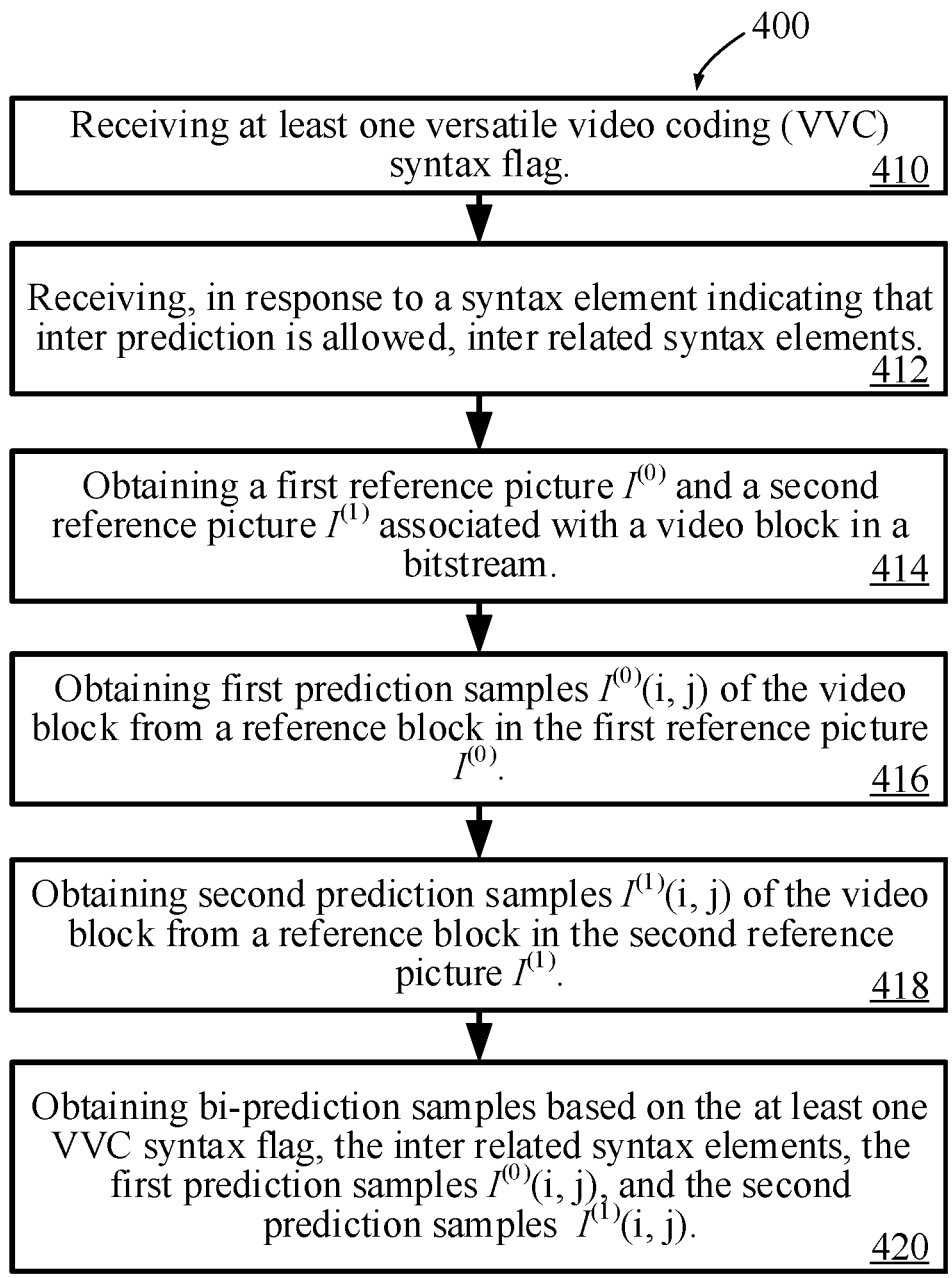
FIG. 4 is a method for decoding a video signal, according to an example of the present disclosure.

FIG. 4 shows a method for decoding a video signal in accordance with the present disclosure. The method may be, for example, applied to a decoder.

In step 410, the decoder may receive at least one VVC syntax flag. The at least one VVC syntax flag may include a first VVC syntax flag that indicates whether inter prediction is allowed in a corresponding coding level.

In step 412, the decoder may receive, in response to a syntax element indicating that inter prediction is allowed, inter related syntax elements.

In step 414, the decoder may obtain a first reference picture $I^{(0)}$ and a second reference picture $I^{(1)}$ associated with a video block in a bitstream. The first reference picture) $I^{(0)}$ is before a current picture and the second reference picture $I^{(1)}$ is after the current picture in display order.

In step 416, the decoder may obtain first prediction samples $I^{(0)}(i,j)$ of the video block from a reference block in the first reference picture $I^{(0)}$. The i and j represent a coordinate of one sample with the current picture.

In step 418, the decoder may obtain second prediction samples $I^{(1)}(i,j)$ of the video block from a reference block in the second reference picture $I^{(1)}$.

In step 420, the decoder may obtain bi-prediction samples based on the at least one VVC syntax flag, the inter related syntax elements, the first prediction samples $I^{(0)}(i,j)$, and the second prediction samples $I^{(1)}(i,j)$.

Grouping the Inter-Related Syntax Elements

In this disclosure, it is proposed to rearrange the syntax elements so that the inter prediction related syntax elements are grouping in VVC syntax at certain coding level, e.g., sequence, picture, and/or slice level. According to the disclosure, it is proposed to rearrange the syntax elements related to inter slices in the sequence parameter set (SPS). An example of the decoding process on VVC Draft is illustrated in Table 17 below. The changes to the VVC Draft are shown below. The added parts are shown using bold and italicized font while the deleted parts are shown in strike-through font.

TABLE 17

| Proposed sequence parameter set RBSP syntax | |
| --- | --- |
| seq_parameter_set_rbsp( ) { | Descriptor |
|     sps_seq_parameter_set_id | u (4) |
|     sps_video_parameter_set_id | u (4) |
|     sps_max_sublayers_minus1 | u (3) |
|     sps_reserved_zero_4bits | u (4) |
|     sps_ptl_dpb_hrd_params_present_flag | u (1) |
|     if( sps_ptl_dpb_hrd_params_present_flag ) | |
|        profile_tier_level( 1, sps_max_sublayers_minus1 ) | |
|     gdr_enabled_flag | u (1) |
|     chroma_format_idc | u (2) |
|     if( chroma_format_idc = = 3 ) | |
|        separate_colour_plane_flag | u (1) |
|     res_change_in_clvs_allowed_flag | u (1) |
|     pic_width_max_in_luma_samples | ue (v) |
|     pic_height_max_in_luma_samples | ue (v) |
|     sps_conformance_window_flag | u (1) |
|     if( sps_conformance_window_flag ) { | |
|        sps_conf_win_left_offset | ue (v) |
|        sps_conf_win_right_offset | ue (v) |
|        sps_conf_win_top_offset | ue (v) |
|        sps_conf_win_bottom_offset | ue (v) |
|     } | |
|     sps_log2_ctu_size_minus5 | u (2) |
|     subpic_info_present_flag | u (1) |
|     if( subpic_info_present_flag ) { | |
|        sps_num_subpics_minus1 | ue (v) |
|        sps_independent_subpics_flag | u (1) |
|        for( i = 0; sps_num_subpics_minus1 > 0 && i <= sps_num_subpics_minus1; i++ ) { | |
|           if( i > 0 && pic_width_max_in_luma_samples > CtbSizeY ) | |
|              subpic_ctu_top_left_x[ i ] | u (v) |
|           if( i > 0 && pic_height_max_in_luma_samples > CtbSizeY ) { | |
|              subpic_ctu_top_left_y[ i ] | u (v) |
|           if( i < sps_num_subpics_minus1 && pic_width_max_in_luma_samples > CtbSizeY ) | |
|              subpic_width_minus1[ i ] | u (v) |
|           if( i < sps_num_subpics_minus1 && pic_height_max_in_luma_samples > CtbSizeY ) | |
|              subpic_height_minus1[ i ] | u (v) |
|           if( !sps_independent_subpics_flag) { | |
|              subpic_treated_as_pic_flag[ i ] | u (1) |
|              loop_filter_across_subpic_enabled_flag[ i ] | u (1) |
|           } | |
|        } | |
|        sps_subpic_id_len_minus1 | ue (v) |
|        subpic_id_mapping_explicitly_signalled_flag | u (1) |
|        if( subpic_id_mapping_explicitly_signalled_flag ) { | |
|           subpic_id_mapping_in_sps_flag | u (1) |
|           if( subpic_id_mapping_in_sps_flag ) | |
|              for( i = 0; i <= sps_num_subpics_minus1; i++ ) | |
|                 sps_subpic_id[ i ] | u (v) |
|        } | |
|     } | |
|     bit_depth_minus8 | ue (v) |
|     sps_entropy_coding_sync_enabled_flag | u (1) |
|     if( sps_entropy_coding_sync_enabled_flag ) | |
|        sps_wpp_entry_point_offsets_present_flag | u (1) |
|     ~~sps_weighted_pred_flag~~ | ~~u(1)~~ |
|     ~~sps_weighted_bipred_flag~~ | ~~u(1)~~ |
|     log2_max_pic_order_cnt_lsb_minus4 | u (4) |
|     sps_poc_msb_flag | u (1) |
|     if( sps_poc_msb_flag ) | |
|        poc_msb_len_minus1 | ue (v) |
|     num_extra_ph_bits_bytes | u (2) |
|     extra_ph_bits_struct( num_extra_ph_bits_bytes ) | |
|     num_extra_sh_bits_bytes | u (2) |
|     extra_sh_bits_struct( num_extra_sh_bits_bytes ) | |
|     if( sps_max_sublayers_minus1 > 0 ) | |
|        sps_sublayer_dpb_params_flag | u (1) |
|     if( sps_ptl_dpb_hrd_params_present_flag ) | |
|        dpb_parameters( sps_max_sublayers_minus1, sps_sublayer_dpb_params_flag ) | |
|     ~~long_term_ref_pics_flag~~ | ~~u(1)~~ |
|     ~~inter_layer_ref_pics_present_flag~~ | ~~u(1)~~ |
|     ~~sps_idr_rpl_present_flag~~ | ~~u(1)~~ |
|     ~~rpl1_same_as_rpl0_flag~~ | ~~u(1)~~ |

TABLE 17-continued

Proposed sequence parameter set RBSP syntax

| seq_parameter_set_rbsp( ) { | Descriptor |
|---|---|
| ~~for( i = 0; i < rpl1_same_as_rp10_flag ? 1 : 2; i++ ) {~~ | |
| ~~num_ref_pic_lists_in_sps[ i ]~~ | ~~ue(v)~~ |
| ~~for( j = 0; j < num_ref_pic_lists_in_sps[ i ]; j++ )~~ | |
| ~~ref_pic_list_struct( i, j )~~ | |
| ~~}~~ | |
| if( ChromaArrayType != 0 ) | |
|   qtbtt_dual_tree_intra_flag | u (1) |
| log2_min_luma_coding_block_size_minus2 | ue (v) |
| partition_constraints_override_enabled_flag | u (1) |
| sps_log2_diff_min_qt_min_cb_intra_slice_luma | ue (v) |
| sps_max_mtt_hierarchy_depth_intra_slice_luma | ue (v) |
| if( sps_max_mtt_hierarchy_depth_intra_slice_luma != 0 ) { | |
|   sps_log2_diff_max_bt_min_qt_intra_slice_luma | ue (v) |
|   sps_log2_diff_max_tt_min_qt_intra_slice_luma | ue (v) |
| } | |
| sps_log2_diff_min_qt_min_cb_inter_slice | ~~ue(v)~~ |
| sps_max_mtt_hierarchy_depth_inter_slice | ~~ue(v)~~ |
| if( sps_max_mtt_hierarchy_depth_inter_slice != 0 ) { | |
|   sps_log2_diff_max_bt_min_qt_inter_slice | ~~ue(v)~~ |
|   sps_log2_diff_max_tt_min_qt_inter_slice | ~~ue(v)~~ |
| } | |
| if( qtbtt_dual_tree_intra_flag ) { | |
|   sps_log2_diff_min_qt_min_cb_intra_slice_chroma | ue (v) |
|   sps_max_mtt_hierarchy_depth_intra_slice_chroma | ue (v) |
|   if( sps_max_mtt_hierarchy_depth_intra_slice_chroma != 0 ){ | |
|     sps_log2_diff_max_bt_min_qt_intra_slice_chroma | ue (v) |
|     sps_log2_diff_max_tt_min_qt_intra_slice_chroma | ue (v) |
|   } | |
| } | |
| sps_max_luma_transform_size_64_flag | u (1) |
| if( ChromaArrayType != 0 ) { | |
|   sps_joint_cbcr_enabled_flag | u (1) |
|   same_qp_table_for_chroma | u (1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se (v) |
|     num_points_in_qp_table_minus1[ i ] | ue (v) |
|     for( j = 0; j <= num_points_in_qp_table_minus1[ i ]; j++ ) { | |
|       delta_qp_in_val_minus1[ i ][ j ] | ue (v) |
|       delta_qp_diff_val[ i ][ j ] | ue (v) |
|     } | |
|   } | |
| } | |
| sps_sao_enabled_flag | u (1) |
| sps_alf_enabled_flag | u (1) |
| if( sps_alf_enabled_flag && ChromaArrayType != 0 ) | |
|   sps_ccalf_enabled_flag | u (1) |
| sps_transform_skip_enabled_flag | u (1) |
| if( sps_transform_skip_enabled_flag) { | |
|   log2_transform_skip_max_size_minus2 | ue (v) |
|   sps_bdpcm_enabled_flag | u (1) |
| } | |
| *long_term_ref_pics_flag* | *u(1)* |
| *inter_layer_ref_pics_present_flag* | *u(1)* |
| *sps_idr_rpl_present_flag* | *u(1)* |
| *rpl1_same_as_rpl0_flag* | *u(1)* |
| *for( i = 0; i < rpl1_same_as_rpl0_flag ? 1 : 2; i++ ) {* | |
|   *num_ref_pic_lists_in_sps[ i ]* | *ue(v)* |
|   *for( j = 0; j < num_ref_pic_lists_in_sps[ i ]; j++)* | |
|     *ref_pic_list_struct( i, j )* | |
| *}* | |
| *sps_weighted_pred_flag* | *u(1)* |
| *sps_weighted_bipred_flag* | *u(1)* |
| sps_ref_wraparound_enabled_flag | u (1) |
| sps_temporal_mvp_enabled_flag | u (1) |
| if( sps_temporal_mvp_enabled_flag ) | |
|   sps_sbtmvp_enabled_flag | u (1) |
| sps_amvr_enabled_flag | u (1) |
| sps_bdof_enabled_flag | u (1) |
| if( sps_bdof_enabled_flag ) | |
|   sps_bdof_pic_present_flag | u (1) |
| sps_smvd_enabled_flag | u (1) |
| sps_dmvr_enabled_flag | u (1) |
| if( sps_dmvr_enabled_flag) | |
|   sps_dmvr_pic_present_flag | u (1) |

TABLE 17-continued

| Proposed sequence parameter set RBSP syntax | |
|---|---|
| seq_parameter_set_rbsp( ) { | Descriptor |
|   sps_mmvd_enabled_flag | u (1) |
|   *six_minus_max_num_merge_cand* | *ue(v)* |
|   *sps_sbt_enabled_flag* | *u(1)* |
|   *sps_affine_enabled_flag* | *u(1)* |
|   *if( sps_affine_enabled_flag ) {* | |
|     *five_minus_max_num_subblock_merge_cand* | *ue(v)* |
|     *sps_affine_type_flag* | *u(1)* |
|     *if( sps_amvr_enabled_flag )* | |
|       *sps_affine_amvr_enabled_flag* | *u(1)* |
|     *sps_affine_prof_enabled_flag* | *u(1)* |
|     *if( sps_affine_prof_enabled_flag )* | |
|       *sps_prof_pic_present_flag* | *u(1)* |
|   *}* | |
|   *sps_bcw_enabled_flag* | *u(1)* |
|   *sps_ciip_enabled_flag* | *u(1)* |
|   *if( sps_mmvd_enabled_flag )* | |
|     *sps_fpel_mmvd_enabled_flag* | *u(1)* |
|   *if( MaxNumMergeCand >= 2 ) {* | |
|     *sps_gpm_enabled_flag* | *u(1)* |
|     *if( sps_gpm_enabled_flag &&MaxNumMergeCand >= 3 )* | |
|       *max_num_merge_cand_minus_max_num_gpm_cand* | *ue(v)* |
|   *}* | |
|   *log2_parallel_merge_level_minus2* | *ue(v)* |
|   sps_isp_enabled_flag | u (1) |
|   sps_mrl_enabled_flag | u (1) |
|   sps_mip_enabled_flag | u (1) |
|   if( ChromaArrayType != 0 ) | |
|     sps_cclm_enabled_flag | u (1) |
|   if( chroma_format_idc = = 1 ) { | |
|     sps_chroma_horizontal_collocated_flag | u (1) |
|     sps_chroma_vertical_collocated_flag | u (1) |
|   } | |
|   sps_mts_enabled_flag | u (1) |
|   if( sps_mts_enabled_flag ) { | |
|     sps_explicit_mts_intra_enabled_flag | u (1) |
|     sps_explicit_mts_inter_enabled_flag | u (1) |
|   } | |
|   ~~six_minus_max_num_merge_cand~~ | ~~ue(v)~~ |
|   ~~sps_sbt_enabled_flag~~ | ~~u(1)~~ |
|   ~~sps_affine_enabled_flag~~ | ~~u(1)~~ |
|   ~~if( sps_affine_enabled_flag ) {~~ | |
|     ~~five_minus_max_num_subblock_merge_cand~~ | ~~ue(v)~~ |
|     ~~sps_affine_type_flag~~ | ~~u(1)~~ |
|     ~~if( sps_amvr_enabled_flag )~~ | |
|       ~~sps_affine_amvr_enabled_flag~~ | ~~u(1)~~ |
|     ~~sps_affine_prof_enabled_flag~~ | ~~u(1)~~ |
|     ~~if( sps_affine_prof_enabled_flag )~~ | |
|       ~~sps_prof_pic_present_flag~~ | ~~u(1)~~ |
|   ~~}~~ | |
|   sps_palette_enabled_flag | u (1) |
|   if( ChromaArrayType = = 3 && | |
|   ! sps_max_luma_transform_size_64_flag ) | |
|     sps_act_enabled_flag | u (1) |
|   if( sps_transform_skip_enabled_flag \|\| sps_palette_enabled_flag ) | |
|     min_qp_prime_ts_minus4 | ue (v) |
|   ~~sps_bcw_enabled_flag~~ | ~~u(1)~~ |
|   sps_ibc_enabled_flag | u (1) |
|   if( sps_ibc_enabled_flag ) | |
|     six_minus_max_num_ibc_merge_cand | ue (v) |
|   ~~sps_ciip_enabled_flag~~ | ~~u(1)~~ |
|   ~~if( sps_mmvd_enabled_flag )~~ | |
|     ~~sps_fpel_mmvd_enabled_flag~~ | ~~u(1)~~ |
|   ~~if( MaxNumMergeCand >= 2 ) {~~ | |
|     ~~sps_gpm_enabled_flag~~ | ~~u(1)~~ |
|     ~~if( sps_gpm_enabled_flag && MaxNumMergeCand >= 3 )~~ | |
|       ~~max_num_merge_cand_minus_max_num_gpm_cand~~ | ~~ue(v)~~ |
|   ~~}~~ | |
|   sps_lmcs_enabled_flag | u (1) |
|   sps_lfnst_enabled_flag | u (1) |
|   sps_ladf_enabled_flag | u (1) |
|   if( sps_ladf_enabled_flag ) { | |
|     sps_num_ladf_intervals_minus2 | u (2) |
|     sps_ladf_lowest_interval_qp_offset | se (v) |
|     for( i = 0; i < sps_num_ladf_intervals_minus2 + 1; i++ ) { | |
|       sps_ladf_qp_offset[ i ] | se (v) |
|       sps_ladf_delta_threshold_minus1[ i ] | ue (v) |

TABLE 17-continued

Proposed sequence parameter set RBSP syntax

| seq_parameter_set_rbsp( ) { | Descriptor |
|---|---|
|     } | |
|   } | |
|   ~~log2_parallel_merge_level_minus2~~ | ~~ue(v)~~ |
|   sps_explicit_scaling_list_enabled_flag | u (1) |
|   sps_dep_quant_enabled_flag | u (1) |
|   if( !sps_dep_quant_enabled_flag ) | |
|     sps_sign_data_hiding_enabled_flag | u (1) |
|   sps_virtual_boundaries_enabled_flag | u (1) |
|   if( sps_virtual_boundaries_enabled_flag ) { | |
|     sps_virtual_boundaries_present_flag | u (1) |
|     if( sps_virtual_boundaries_present_flag ) { | |
|       sps_num_ver_virtual_boundaries | u (2) |
|       for( i = 0; i < sps_num_ver_virtual_boundaries; i++ ) | |
|         sps_virtual_boundaries_pos_x[ i ] | u (13) |
|       sps_num_hor_virtual_boundaries | u (2) |
|       for( i = 0; i < sps_num_hor_virtual_boundaries; i++ ) | |
|         sps_virtual_boundaries_pos_y[ i ] | u (13) |
|     } | |
|   } | |
|   if( sps_ptl_dpb_hrd_params_present_flag ) { | |
|     sps_general_hrd_params_present_flag | u (1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u (1) |
|       firstSubLayer = sps_sublayer_cpb_params_present_flag ? 0 : | |
|         sps_max_sublayers_minus1 | |
|       ols_hrd_parameters( firstSubLayer, sps_max_sublayers_minus1 ) | |
|     } | |
|   } | |
|   field_seq_flag | u (1) |
|   vui_parameters_present_flag | u (1) |
|   if( vui_parameters_present_flag ) | |
|     vui_parameters( ) /* Specified in ITU-T H.SEI ISO/IEC 23002-7 */ | |
|   sps_extension_flag | u (1) |
|   if( sps_extension_flag ) | |
|     while( more_rbsp_data( ) ) | |
|       sps_extension_data_flag | u (1) |
|   rbsp_trailing_bits( ) | |
| } | |

Figure 5:
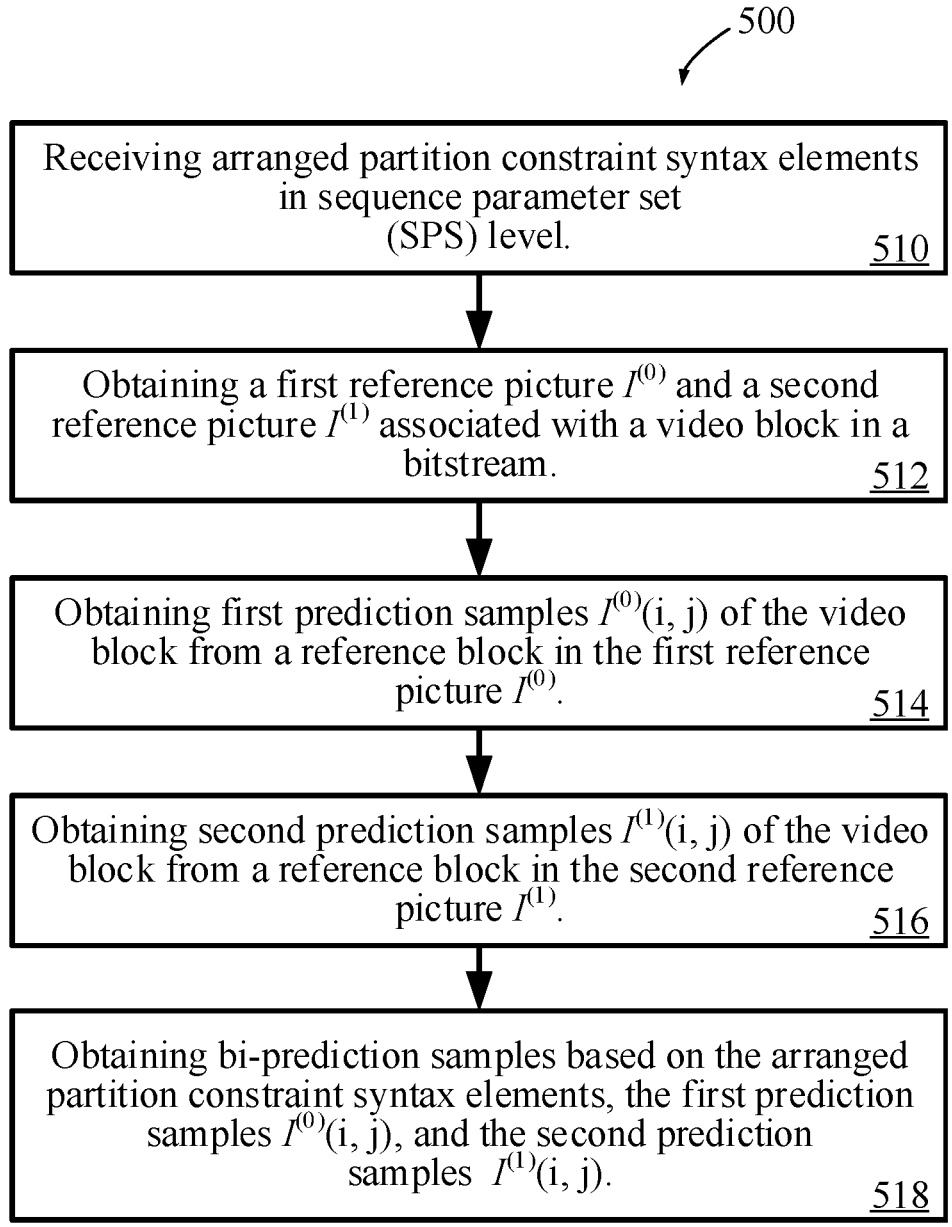
FIG. 5 is a method for decoding a video signal, according to an example of the present disclosure.

FIG. 5 shows a method for decoding a video signal in accordance with the present disclosure. The method may be, for example, applied to a decoder.

In step 510, the decoder may receive arranged partition constraint syntax elements in SPS level. The arranged partition constraint syntax elements are arranged so that inter prediction related syntax elements are grouped in VVC syntax at a coding level.

In step 512, the decoder may obtain a first reference picture $I^{(0)}$ and a second reference picture $I^{(1)}$ associated with a video block in a bitstream. The first reference picture) $I^{(0)}$ is before a current picture and the second reference picture $I^{(1)}$ is after the current picture in display order.

In step 514, the decoder may obtain first prediction samples $I^{(0)}(i,j)$ of the video block from a reference block in the first reference picture $I^{(0)}$. The i and j represent a coordinate of one sample with the current picture.

In step 516, the decoder may obtain second prediction samples $I^{(1)}(i,j)$ of the video block from a reference block in the second reference picture $I^{(1)}$.

In step 518, the decoder may obtain bi-prediction samples based on the arranged partition constraint syntax elements, the first prediction samples $I^{(0)}(i,j)$, and the second prediction samples $I^{(1)}(i,j)$.

In another example of the decoding process on VVC Draft is illustrated in Table 18 below. The changes to the VVC Draft are shown below. The added parts are shown using bold and italicized font, while the deleted parts are shown in strikethrough font.

TABLE 18

Proposed sequence parameter set RBSP syntax

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |

TABLE 18-continued

Proposed sequence parameter set RBSP syntax

| seq_parameter_set_rbsp( ) { | Descriptor |
|---|---|
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for(i = 0;i <= sps_num_subpics_minus1; i++ ) | |
|           sps_subpic_id[ i ] | u(v) |
|     } | |
|   } | |
|   bit_depth_minus8 | ue(v) |
|   sps_entropy_coding_sync_enabled_flag | u(1) |
|   if( sps_entropy_coding_sync_enabled_flag ) | |
|     sps_wpp_entry_point_offsets_present_flag | u(1) |
|   ~~sps_weighted_pred_flag~~ | ~~u(1)~~ |
|   ~~sps_weighted_bipred_flag~~ | ~~u(1)~~ |
|   log2_max_pic_order_cnt_lsb_minus4 | u(4) |
|   sp_poc_msb_flag | u(1) |
|   if( sps_poc_msb_flag ) | |
|     poc_msb_len_minus1 | ue(v) |
|   num_extra_ph_bits_bytes | u(2) |
|   extra_ph_bits_struct( num_extra_ph_bits_bytes ) | |
|   num_extra_sh_bits_bytes | u(2) |
|   extra_sh_bits_struct( num_extra_sh_bits_bytes ) | |
|   if( sps_max_sublayers_minus1 > 0 ) | |
|     sps_sublayer_dpb_params_flag | u(1) |
|   if( sps__ptl_dpb_hrd_params_present_flag ) | |
|     dpb_parameters( sps_max_sublayers_minus1, sps_sublayer_dpb_params_flag ) | |
|   ~~long_term_ref_pics_flag~~ | ~~u(1)~~ |
| ~~inter_layer_ref_pics_present_flag~~ | ~~u(1)~~ |
| ~~sps_idr_rpl_present_flag~~ | ~~u(1)~~ |
| ~~rpl1_same_as_rpl0_flag~~ | ~~u(1)~~ |
| ~~for( i = 0; i < rpl1_same_as_rpl0_flag ? 1 : 2; i++ ) {~~ | |
| ~~num_ref_pic_lists_in_sps[ i ]~~ | ~~ue(v)~~ |
| ~~for( j = 0; j < num_ref_pic_lists_in_sps[ i ]; j++)~~ | |
| ~~ref_pic_list_struct( i, j )~~ | |
| ~~}~~ | |
|   if( ChromaArrayType != 0 ) | |
|     qtbtt_dual_tree_intra_flag | u(1) |

TABLE 18-continued

Proposed sequence parameter set RBSP syntax

| seq_parameter_set_rbsp( ) { | Descriptor |
|---|---|
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ){ | |
|     sps_log2_diff_max_bt_min_qt_intra_slice_luma | ue(v) |
|     sps_log2_diff_max_tt_min_qt_intra_slice_luma | ue(v) |
|   } | |
|   ~~sps_log2_diff_min_qt_min_cb_inter_slice~~ | ~~ue(v)~~ |
|   ~~sps_max_mtt_hierarchy_depth_inter_slice~~ | ~~ue(v)~~ |
|   ~~if( sps_max_mtt_hierarchy_depth_inter_slice != 0 ) {~~ | |
|     ~~sps_log2_diff_max_bt_min_qt_inter_slice~~ | ~~ue(v)~~ |
|     ~~sps_log2_diff_max_tt_min_qt_inter_slice~~ | ~~ue(v)~~ |
|   ~~}~~ | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0 ) | |
|     sps_ccalf_enabled_flag | u(1) |
|   sps_transform_skip_enabled_flag | u(1) |
|   if( sps_transform_skip_enabled_flag ) { | |
|     log2_transform_skip_max_size_minus2 | ue(v) |
|     sps_bdpcm_enabled_flag | u(1) |
|   } | |
|   *sps_mts_enabled_flag* | *u(1)* |
|   *if( sps_mts_enabled_flag )* | |
|     *sps_explicit_mts_intra_enabled_flag* | *u(1)* |
|   *sps_inter_slice_allowed_flag* | *u(1)* |
|   *if(sps_inter_slice_allowed_flag ) {* | |
|     *if( sps_mts_enabled_flag )* | |
|     *sps_explicit_mts_inter_enabled_flag* | *u(1)* |
|   *long_term_ref_pic_flag* | *u(1)* |
|   *inter_layer_ref_pics_present_flag* | *u(1)* |
|   *sps_idr_rpl_present_flag* | *u(1)* |
|   *rpl1_same_as_rpl0_flag* | *u(1)* |
|   *for( i = 0 i < rpl1_same_as_rpl0_flag ? 1 : 2; i++) {* | |
|     *num_ref_pic_lists_in_sps[ i ]* | *ue(v)* |
|     *for(j = 0; j < num_ref_pic__lists_in_sps[ i ]; j++)* | |
|       *ref_pic_list_struct( i, j )* | |
|   *}* | |
|   *sps_log2_diff_min_qt_min_cb_inter_slice* | *ue(v)* |
|   *sps_max_mtt_hierarchy_depth_inter_slice* | *ue(v)* |
|   *if( sps_max_mtt_hierarchy_depth_inter_slice != 0 ) {* | |
|     *sps_log2_diff_max_bt_min_qt_inter_slice* | *ue(v)* |
|     *sps_log2_diff_max_tt_min_qt_inter_slice* | *ue(v)* |
|   *}* | |
|   *sps_weighted_pred_flag* | *u(1)* |
|   *sps_weighted_bipred_flag* | *u(1)* |
|   sps_ref_wraparound_enabled_flag | u(1) |
|   sps_temporal_mvp_enabled_flag | u(1) |
|   if( sps_temporal_mvp_enabled_flag ) | |

TABLE 18-continued

| Proposed sequence parameter set RBSP syntax | |
|---|---|
| seq_parameter_set_rbsp( ) { | Descriptor |
|     sps_sbtmvp_enabled_flag | u(1) |
|     sps_amvr_enabled_flag | u(1) |
|     sps_bdof_enabled_flag | u(1) |
|     if( sps_bdof_enabled_flag ) | |
|       sps_bdof_pic_present_flag | u(1) |
|     sps_smvd_enabled_flag | u(1) |
|     sps_dmvr_enabled_flag | u(1) |
|     if( sps_dmvr_enabled_flag) | |
|       sps_dmvr_pic present_flag | u(1) |
|     sps_mmvd_enabled_flag | u(1) |
|     *six_minus_max_num_merge_cand* | *ue(v)* |
|     *sps_sbt_enabled_flag* | *u(1)* |
|     *sps_affine_enabled_flag* | *u(1)* |
|     *if( sps_affine_enabled_flag ) {* | |
|       *five_minus_max_num_subblock_merge_cand* | *ue(v)* |
|       *sps_affine_type_flag* | *u(1)* |
|       *if( sps_amvr_enabled_flag )* | |
|         *sps_affine_amvr_enabled_flag* | *u(1)* |
|       *sps_affine_prof_enabled_flag* | *u(1)* |
|       *if( sps_affine_prof_enabled_flag )* | |
|         *sps_prof_pic_present_flag* | *u(1)* |
|     *}* | |
|     *sps_bcw_enabled_flag* | *u(1)* |
|     *sps_ciip_enabled_flag* | *u(1)* |
|     *if( sps_mmvd_enabled_flag )* | |
|     *sps_fpel_mmvd_enabled_flag* | *u(1)* |
|     *if( MaxNumMergeCand >= 2 ) {* | |
|       *sps_gpm_enabled_flag* | *u(1)* |
|       *if( sps_gpm_enabled_flag &&MaxNumMergeCand >= 3 )* | |
|         *max_num_merge_cand_minus_max_num_gpm_cand* | *ue(v)* |
|     *}* | |
|     *log2_parallel_merge_level_minus2* | *ue(v)* |
|     sps_isp_enabled_flag | u(1) |
|     sps_mrl_enabled_flag | u(1) |
|     sps_mip_enabled_flag | u(1) |
|     if( ChromaArrayType != 0 ) | |
|       sps_cclm_enabled_flag | u(1) |
|     if( chroma_format_idc == 1 ) { | |
|       sps_chroma_horizontal_collocated_flag | u(1) |
|       sps_chroma_vertical_collocated_flag | u(1) |
|     } | |
|     ~~sps_mts_enabled_flag~~ | ~~u(1)~~ |
|     ~~if( sps_mts_enabled_flag ) {~~ | |
|       ~~sps_explicit_mts_intra_enabled_flag~~ | ~~u(1)~~ |
|       ~~sps_explicit_mts_inter_enabled_flag~~ | ~~u(1)~~ |
|     ~~}~~ | |
|     ~~six_minus_max_num_merge_cand~~ | ~~ue(v)~~ |
|     ~~sps_sbt_enabled_flag~~ | ~~u(1)~~ |
|     ~~sps_affine_enabled_flag~~ | ~~u(1)~~ |
|     ~~if( sps_affine_enabled_flag ) {~~ | |
|       ~~five_minus_max_num_subblock_merge_cand~~ | ~~ue(v)~~ |
|       ~~sps_affine_type_flag~~ | ~~u(1)~~ |
|       ~~if( sps_amvr_enabled_flag )~~ | |
|         ~~sps_affine_amvr_enabled_flag~~ | ~~u(1)~~ |
|       ~~sps_affine_prof_enabled_flag~~ | ~~u(1)~~ |
|       ~~if( sps_affine_prof_enabled_flag )~~ | |
|         ~~sps_prof_pic_present_flag~~ | ~~u(1)~~ |
|     ~~}~~ | |
|     sps _palette_enabled_flag | u(1) |
|     if( ChromaArrayType == 3 && !sps_max_luma_transform_size_64_flag ) | |
|       sps_act_enabled_flag | u(1) |
|     if( sps_transform_skip_enabled_flag || sps_palette_enabled_flag ) | |
|       min_qp_prime_ts_minus4 | ue(v) |
|     ~~sps_bcw_enabled_flag~~ | ~~u(1)~~ |
|     sps_ibc_enabled_flag | u(1) |
|     if( sps_ibc_enabled_flag ) | |
|       six_minus_max_num_ibc_merge_cand | ue(v) |
|     ~~sps_ciip_enabled_flag~~ | ~~u(1)~~ |
|     ~~if( sps_mmvd_enabled_flag )~~ | |
|     ~~sps_fpel_mmvd_enabled_flag~~ | ~~u(1)~~ |
|     ~~if( MaxNumMergeCand >= 2 ) {~~ | |
|       ~~sps_gpm_enabled_flag~~ | ~~u(1)~~ |

TABLE 18-continued

Proposed sequence parameter set RBSP syntax

| seq_parameter_set_rbsp( ) { | Descriptor |
|---|---|
| ~~if( sps_gpm_enabled_flag && MaxNumMergeCand >= 3 )~~ | |
|   ~~max_num_merge_cand_minus_max_num_gpm_cand~~ | ~~ue(v)~~ |
| ~~}~~ | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| ~~log2_parallel_merge_level_minus2~~ | ue(v) |
| sps_explicit_scaling_list_enabled_flag | u(1) |
| sps_dep_quant_enabled_flag | u(1) |
| if( !sps_dep_quant_enabled flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_param_present flag | u(1) |
|     firstSubLayer = sps_sublayer_cpb params present flag ? 0 : | |
|       sps_max_sublayers_minus1 | |
|     ols_hrd_parameters | |
|     ( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| | |
|   ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

According to this disclosure, it is also proposed to add a flag in VVC syntax at certain coding level to indicate whether inter slices such as P-slice and B-slice are allowed or not in a sequence, picture, and/or slice. In case inter slices are not allowed, inter slices related syntaxes are not signaled at the corresponding coding level, e.g., sequence, picture, and/or slice level. In one example, according to the method of the disclosure, a flag, sps_inter_slice_allowed_flag, is added in SPS to indicate if inter slice is allowed in coding the current video sequence. In case it is not allowed, inter slice related syntax elements are not signaled in SPS. An example of the decoding process on VVC Draft is illustrated in Table 19 below. The added parts are shown using bold and italicized font, while the deleted parts are shown in strike-through font.

TABLE 19

Proposed sequence parameter set RBSP syntax

| seq_parameter_set_rbsp( ) { | Descriptor |
|---|---|
| sps_seq_parameter_set_id | u(4) |
| sps_video_parameter_set_id | u(4) |

TABLE 19-continued

| Proposed sequence parameter set RBSP syntax | |
|---|---|
| seq_parameter_set_rbsp( ) { | Descriptor |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc == 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic-enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for(i = 0;i <= sps_num_subpics_minus1; i++ ) | |
|           sps_subpic_id[ i ] | u(v) |
|     } | |
|   } | |
|   bit_depth_minus8 | ue(v) |
|   sps_entropy_coding_sync-enabled_flag | u(1) |
|   if( sps_entropy_coding_sync_enabled_flag ) | |
|     sps_wpp_entry_point_offsets_present_flag | u(1) |
|   ~~sps_weighted_pred_flag~~ | ~~u(1)~~ |
|   ~~sps_weighted_bipred_flag~~ | ~~u(1)~~ |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|   extra_ph_bits_struct( num_extra_ph_bits_bytes ) | |
|   num_extra_sh_bits_bytes | u(2) |
|   extra_sh_bits_struct( num_extra_sh_bits_bytes ) | |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( sps_max_sublayers_minus1, sps_sublayer_dpb_params_flag ) | |
|   ~~long_term_ref_pics_flag~~ | ~~u(1)~~ |
|   ~~inter_layer_ref_pics_present_flag~~ | ~~u(1)~~ |
|   ~~sps_idr_rpl_present_flag~~ | ~~u(1)~~ |
|   ~~rpl1_same_as_rpl0_flag~~ | ~~u(1)~~ |
|   ~~for( i = 0; i < rpl1_same_as_rpl0_flag ? 1 : 2; i++ ) {~~ | |
|     ~~num_ref_pic_lists_in_sps[ i ]~~ | ~~ue(v)~~ |
|     ~~for( j = 0; j < num_ref_pic_list_in_sps[ i ]; j++)~~ | |

TABLE 19-continued

| Proposed sequence parameter set RBSP syntax | |
|---|---|
| seq_parameter_set_rbsp( ) { | Descriptor |
| ~~ref_pic_list_struct( i, j )~~ | |
| ~~}~~ | |
| *sps_inter_slice_allowed_flag* | *u(1)* |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ){ | |
|     sps_log2_difF_max_bt_min_qt_intra_slice_luma | ue(v) |
|     sps_log2_difF_max_tt_min_qt_intra_slice_luma | ue(v) |
|   } | |
| *if(sps_inter_slice_allowed_flag ) {* | |
|   sps_log2_diff_min_qt_min_cb_inter_slice | ue(v) |
|   sps_max_mtt_hierarchy_depth_inter_slice | ue(v) |
|   if( sps max mtt hierarchy depth inter slice != 0 ) { | |
|     sps_log2_difF_max_bt_min_qt_inter_slice | ue(v) |
|     sps_log2_difF_max_tt_min_qt_inter_slice | ue(v) |
|   } | |
| *}* | |
|   if( qtbtt_dual_tree_intra_flag ) { | |
|     sps_log2_difF_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : | |
| ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0) | |
|     sps_ccalf_enabled_flag | u(1) |
|   sps_transform_skip_enabled_flag | u(1) |
|   if( sps_transform_skip_enabled_flag ) { | |
|     log2_transform_skip_max_size_minus2 | ue(v) |
|     sps_bdpcm_enabled_flag | u(1) |
|   } | |
| *if(sps_inter_slice_allowed_flag ) {* | |
| *long_term_ref_pics_flag* | *u(1)* |
| *inter_layer_ref_pics_present_flag* | *u(1)* |
| *sps_idr_rpl_present_flag* | *u(1)* |
| *rpl1_same_as_rpl0_flag* | *u(1)* |
| *for( i = 0; i < rpl1_same_as_rpl0_flag ? 1 : 2; i++ ) {* | |
|   *num_ref_pic_lists_in_sps[ i ]* | |
|   *for( j = 0; j < num_ref_pic_lists_in_sps[ i ]; j++)* | |
| *ref_pic_list_struct( i, j )* | |
| *}* | |
| *sps_weighted_pred_flag* | *u(1)* |
| *sps_weighted_bipred_flag* | *u(1)* |
|   sps_ref_wraparound_enabled_flag | u(1) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   if( sps_bdof_enabled_flag ) | |
|     sps_bdof_pic_present_flag | u(1) |
|   sps_smvd_enabled_flag | u(1) |
|   sps_dmvr_enabled_flag | u(1) |
|   if( sps_dmvr_enabled_flag) | |

TABLE 19-continued

Proposed sequence parameter set RBSP syntax

| seq_parameter_set_rbsp( ) { | Descriptor |
|---|---|
|     sps_dmvr_pic_present_flag | u(1) |
|     sps_mmvd_enabled_flag | u(1) |
|     *six_minus_max_num_merge_cand* | *ue(v)* |
|     *sps_sbt_enabled_flag* | *u(1)* |
|     *sps_affine_enabled_flag* | *u(1)* |
|     *if( sps_affine_enabled_flag ) {* | |
|         *five_minus_max_num_subblock_merge_cand* | *ue(v)* |
|         *sps_affine_type_flag* | *u(1)* |
|         *if( sps_amvr_enabled_flag )* | |
|             *sps_affine_amvr_enabled_flag* | *u(1)* |
|         *sps_affine_prof_enabled_flag* | *u(1)* |
|         *if( sps_affine_prof_enabled_flag )* | |
|             *sps_prof_pic_present_flag* | *u(1)* |
|     *}* | |
|     *sps_bcw_enabled_flag* | *u(1)* |
|     *sps_ciip_enabled_flag* | *u(1)* |
|     *if( sps_mmvd_enabled_flag )* | |
|         *sps_fpel_mmvd_enabled_flag* | *u(1)* |
|     *if( MaxNumMergeCand >= 2 )* | |
|         *sps_gpm_enabled_flag* | *u(1)* |
|         *if( sps_gpm_enabled_flag &&MaxNumMergeCand >= 3 )* | |
|             *max_num_merge_cand_minus_max_num_gpm_cand* | *ue(v)* |
|     *}* | |
|     *log2_parallel_merge_level_minus2* | *ue(v)* |
|     *}* | |
|     sps_isp_enabled_flag | u(1) |
|     sps_mrl_enabled_flag | u(1) |
|     sps_mip_enabled_flag | u(1) |
|     if( ChromaArrayType != 0 ) | |
|         sps_cclm_enabled_flag | u(1) |
|     if( chroma_format_idc = = 1 ) { | |
|         sps_chroma_horizontal_collocated_flag | u(1) |
|         sps_chroma_vertical_collocated_flag | u(1) |
|     } | |
|     sps_mts_enabled_flag | u(1) |
|     if( sps_mts_enabled_flag ) { | |
|         sps_explicit_mts_intra_enabled_flag | u(1) |
|         *if(sps_inter_slice_allowed_flag )* | |
|         sps_explicit_mts_inter_enabled_flag | u(1) |
|     } | |
|     ~~six_minus_max_num_merge_cand~~ | ~~ue(v)~~ |
|     ~~sps_sbt_enabled_flag~~ | ~~u(1)~~ |
|     ~~sps_affine_enabled_flag~~ | ~~u(1)~~ |
|     ~~if( sps_affine_enabled_flag ) {~~ | |
|         ~~five_minus_max_num_subblock_merge_cand~~ | ~~ue(v)~~ |
|         ~~sps_affine_type_flag~~ | ~~u(1)~~ |
|         ~~if( sps_amvr_enabled_flag )~~ | |
|         ~~sps_affine_amvr_enabled_flag~~ | ~~u(1)~~ |
|         ~~sps_affine_prof_enabled_flag~~ | ~~u(1)~~ |
|         ~~if( sps_affine_prof_enabled_flag )~~ | |
|         ~~sps_prof_pic_present_flag~~ | ~~u(1)~~ |
|     ~~}~~ | |
|     sps_palette_enabled_flag | u(1) |
|     if( ChromaArrayType = = 3 && !sps_max_luma_transform_size_64_flag ) | |
|         sps_act_enabled_flag | u(1) |
|     if( sps_transform_skip_enabled_flag || sps_palette_enabled_flag ) | |
|         min_qp_prime_ts_minus4 | ue(v) |
|     ~~sps_bcw_enabled_flag~~ | ~~u(1)~~ |
|     sps_ibc_enabled_flag | u(1) |
|     if( sps_ibc_enabled_flag ) | |
|         six_minus_max_num_ibc_merg_cand | ue(v) |
|     ~~sps_ciip_enabled_flag~~ | ~~u(1)~~ |
|     ~~if( sps_mmvd_enabled_flag )~~ | |
|         ~~sps_fpel_mmvd_enabled_flag~~ | ~~u(1)~~ |
|     ~~if( MaxNumMergeCand >= 2 ) {~~ | |
|         ~~sps_gpm_enabled_flag~~ | ~~u(1)~~ |
|         ~~if( sps_gpm_enabled_flag && ( MaxNumMergeCand >= 3 )~~ | |
|             ~~max_num_merge_cand_~~minus_max_num_gpm_cand | ue(v) |
|     ~~}~~ | |
|     sps_lmcs_enabled_flag | u(1) |
|     sps_lfnst_enabled_flag | u(1) |
|     sps_ladf_enabled_flag | u(1) |
|     if( sps_ladf_enabled_flag ) { | |

TABLE 19-continued

Proposed sequence parameter set RBSP syntax

| seq_parameter_set_rbsp( ) { | Descriptor |
|---|---|
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   ~~log2_parallel_merge_level_minus2~~ | ~~ue(v)~~ |
|   sps_explicit_scaling_list_enabled_flag | u(1) |
|   sps_dep_quant_enabled_flag | u(1) |
|   if( !sps_dep_quant_enabled_flag ) | |
|     sps_sign_data_hiding_enabled_flag | u(1) |
|   sps_virtual_boundaries_enabled_flag | u(1) |
|   if( sps_virtual_boundaries_enabled_flag ) { | |
|     sps_virtual_boundaries_present_flag | u(1) |
|     if( sps_virtual_boundaries_present_flag ) { | |
|       sps_num_ver_virtual_boundaries | u(2) |
|       for( i = 0; i < sps_num_ver_virtual_boundaries; i++ ) | |
|         sps_virtual_boundaries_pos_x[ i ] | u(13) |
|       sps_num_hor_virtual_boundaries | u(2) |
|       for( i = 0; i < sps_num_hor_virtual_boundaries; i++ ) | |
|         sps_virtual_boundaries_pos_y[ i ] | u(13) |
|     } | |
|   } | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u(1) |
|       firstSubLayer = sps_sublayer_cpb_params_present_flag ? 0 : | |
|         sps_max_sublayers_minus1 | |
|       ols_hrd_parameters | |
|         ( firstSubLayer, sps_max_sublayers_minus1 ) | |
|     } | |
|   } | |
|   field_seq_flag | u(1) |
|   vui_parameters_present_flag | u(1) |
|   if( vui_parameters_present_flag ) | |
|     vui_parameters( ) /* Specified in ITU-T H.SEI \| | |
|     ISO/IEC 23002-7 */ | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

In another example of the decoding process on VVC Draft is illustrated in Table 20 below. The changes to the VVC Draft are shown below. The added parts are shown using bold and italicized font while the deleted parts are shown in strikethrough font.

TABLE 20

Proposed sequence parameter set RBSP syntax

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_jolane_flag | u(1) |
|   res_change_in_clvs_allowed_flag | u(1) |
|   pic_width_max_in_luma_samples | ue(v) |

TABLE 20-continued

| Proposed sequence parameter set RBSP syntax | |
|---|---|
| seq_parameter_set_rbsp( ) { | Descriptor |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= | |
|         sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for(i = 0;i <= sps_num_subpics_minus1; i++ ) | |
|         sps_subpic_id[ i ] | u(v) |
|     } | |
|   } | |
|   bit_depth_minus8 | ue(v) |
|   sps_entropy_coding_sync_enabled_flag | u(1) |
|   if( sps_entropy_coding_sync_enabled_flag ) | |
|     sps_wpp_entry_point_offsets_present_flag | u(1) |
|   ~~sps_weighted_pred_flag~~ | ~~u(1)~~ |
|   ~~sps_weighted_bipred_flag~~ | ~~u(1)~~ |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|   extra_ph_bits_struct( num_extra_ph_bits_bytes ) | |
|   num_extra_sh_bits_bytes | u(2) |
|   extra_sh_bits_struct( num_extra_sh_bits_bytes ) | |
|   if( sps_max_sublayers_minus1> 0 ) | |
|     sps_sublayer_dpb_params_flag | u(1) |
|   if( sps_ptl_dpb_hrd_params_present_flag ) | |
|     dpb_parameters( sps_max_sublayers_minus1, | |
| sps_sublayer_dpb_params_flag ) | |
|   ~~long_term_ref_pics_flag~~ | ~~u(1)~~ |
|   ~~inter_layer_ref_pics_present_flag~~ | ~~u(1)~~ |
|   ~~sps_idr_rpl_present_flag~~ | ~~u(1)~~ |
|   ~~rpl1_same_as_rpl0_flag~~ | ~~u(1)~~ |
|   ~~for( i = 0; i < rpl1_same_as_rpl0_flag ? 1 : 2; i++ ) {~~ | |
|     ~~num_ref_pic_lists_in_sps[ i ]~~ | ~~ue(v)~~ |
|     ~~for( j = 0; j < num_ref_pic_lists_in_sps[ i ]; j++)~~ | |
|       ~~ref_pic_list_struct( i, j )~~ | |
|   ~~}~~ | |
|   *sps_inter_slice_allowed_flag* | *u(1)* |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ){ | |
|     sps_log2_diff_max_bt_min_qt_intra_slice_luma | ue(v) |

TABLE 20-continued

| Proposed sequence parameter set RBSP syntax | |
|---|---|
| seq_parameter_set_rbsp( ) { | Descriptor |
|     sps_log2_diff_max_tt_min_qt_intra_slice_luma | ue(v) |
|   } | |
|   ~~sps_log2_diff_min_qt_min_cb_inter_slice~~ | ~~ue(v)~~ |
|   ~~sps_max_mtt_hierarchy_depth_inter_slice~~ | ~~ue(v)~~ |
|   ~~if( sps_max_mtt_hierarchy_depth_inter_slice != 0 ) {~~ | |
|     ~~sps_log2_diff_max_bt_min_qt_inter_slice~~ | ~~ue(v)~~ |
|     ~~sps_log2_diff_max_tt_min_qt_inter_slice~~ | ~~ue(v)~~ |
|   ~~}~~ | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0 ) | |
|     sps_ccalf_enabled_flag | u(1) |
|   sps_transform_skip_enabled_flag | u(1) |
|   if( sps_transform_skip_enabled_flag ) { | |
|     log2_transform_skip_max_size_minus2 | ue(v) |
|     sps_bdpcm_enabled_flag | u(1) |
|   } | |
|   *if(sps_inter_slice_allowed_flag ) {* | |
|   *sps_mts_enabled_flag* | *u(1)* |
|   *if( sps_mts_enabled_flag )* | |
|     *sps_explicit_mts_intra_enabled_flag* | *u(1)* |
|   *sps_inter_slice_allowed_flag* | |
|   *if(sps_inter_slice_allowed_flag ) {* | u(1) |
|   *if(sps_mts_enabled_flag )* | |
|     *sps_explicit_mts_inter_enabled_flag* | *u(1)* |
|   *long_term_ref_pics_flag* | *u(1)* |
|   *inter_layer_ref_pics_present_flag* | *u(1)* |
|   *sps_idr_rpl_present_flag* | *u(1)* |
|   *rpl1_same_as_rpl0_flag* | *u(1)* |
|   *for( i = 0; i < rpl1_same_as_rpl0_flag ? 1 : 2; i++ ) {* | |
|     *num_ref_pic_lists_in_sps[ i ]* | *ue(v)* |
|     *for( j = 0; j < num_ref_pic_lists_in_sps[ i ]; j++)* | |
|       *ref_pic_list_struct( i, j )* | |
|   *}* | |
|   *sps_log2_diff_min_qt_min_cb_inter_slice* | *ue(v)* |
|   *sps_max_mtt_hierarchy_depth_inter_slice* | *ue(v)* |
|   *if( sps_max_mtt_hierarchy_depth_inter_slice != 0 ) {* | |
|     *sps_log2_diff_max_bt_min_qt_inter_slice* | *ue(v)* |
|     *sps_log2_diff_max_tt_min_qt_inter_slice* | *ue(v)* |
|   *}* | |
|   *sps_weighted_pred_flag* | *u(1)* |
|   *sps_weighted_bipred_flag* | *u(1)* |
|   sps_ref_wraparound_enabled_flag | u(1) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   if( sps_bdof_enabled_flag ) | |
|     sps_bdof_pic_present_flag | u(1) |
|   sps_smvd_enabled_flag | u(1) |
|   sps_dmvr_enabled_flag | u(1) |

TABLE 20-continued

| Proposed sequence parameter set RBSP syntax | |
|---|---|
| seq_parameter_set_rbsp( ) { | Descriptor |
|    if( sps_dmvr_enabled_flag) | |
|      sps_dmvr_pic present_flag | u(1) |
|    sps_mmvd_enabled_flag | u(1) |
|    six_minus_max_num_merge_cand | ue(v) |
|    sps_sbt_enabled_flag | u(1) |
|    sps_affine_enabled_flag | u(1) |
|    if( sps_affine_enabled_flag ) { | |
|      five_minus_max_num_subblock_merge_cand | ue(v) |
|      sps_affine_type_flag | u(1) |
|      if( sps_amvr_enabled_flag ) | |
|         sps_affine_amvr_enabled_flag | u(1) |
|      sps_affine_prof_enabled_flag | u(1) |
|      if( sps_affine_prof_enabled_flag ) | |
|         sps_prof_pic_present_flag | u(1) |
|    } | |
|    sps_bcw_enabled_flag | u(1) |
|    sps_ciip_enabled_flag | u(1) |
|    if( sps_mmvd_enabled_flag | |
|      sps_fpel_mmvd_enabled_flag | u(1) |
|    if( MaxNumMergeCand >= 2 ) { | |
|      sps_gpm_enabled_flag | u(1) |
|      if( sps_gpm_enabled_flag && MaxNumMergeCand >= 3 ) | |
|         max_num_merge_cand_minus_max_num_gpm_cand | ue(v) |
|    } | |
|    log2_parallel_merge_level_minus2 | ue(v) |
| } | |
|    sps_isp_enabled_flag | u(1) |
|    sps_mrl_enabled_flag | u(1) |
|    sps_mip_enabled_flag | u(1) |
|    if( ChromaArrayType != 0 ) | |
|      sps_cclm_enabled_flag | u(1) |
|    if( chroma_format_idc = = 1 ) { | |
|      sps_chroma_horizontal_collocated_flag | u(1) |
|      sps_chroma_vertical_collocated_flag | u(1) |
|    } | |
|    ~~sps_mts_enabled_flag~~ | ~~u(1)~~ |
|      ~~if( sps_mts_enabled_flag ) {~~ | |
|      ~~sps_explicit_mts_intra_enabled_flag~~ | ~~u(1)~~ |
|      ~~sps_explicit_mts_inter_enabled_flag~~ | ~~u(1)~~ |
|    ~~}~~ | |
|    ~~sinus_minus_max_num_merge_cand~~ | ~~ue(v)~~ |
|    ~~sps_sbt_enabled_flag~~ | ~~u(1)~~ |
|    ~~sps_affine_enabled_flag~~ | ~~u(1)~~ |
|    ~~if( sps_affine_enabled_flag ) {~~ | |
|      ~~five_minus_max_num_subblock_merge_cand~~ | ~~ue(v)~~ |
|      ~~sps_affine_type_flag~~ | ~~u(1)~~ |
|      ~~if( sps_amvr_enabled_flag )~~ | |
|         ~~sps_affine_amvr_enabled_flag~~ | ~~u(1)~~ |
|      ~~sps_affine_prof_enabled_flag~~ | ~~u(1)~~ |
|      ~~if( sps_affine_prof_enabled_flag )~~ | |
|         ~~sps_prof_pic_present_flag~~ | ~~u(1)~~ |
|    ~~}~~ | |
|    sps_palette_enabled_flag | u(1) |
|    if( ChromaArrayType = = 3 && | |
|    !sps_max_luma_transform_size_64 flag ) | |
|      sps_act_enabled_flag | u(1) |
|    if( sps_transform_skip_enabled_flag \|\| sps_palette_enabled_flag ) | |
|      min_qp_prime_ts_minus4 | ue(v) |
|    ~~sps_bcw_enabled_flag~~ | ~~u(1)~~ |
|    sps_ibc_enabled_flag | u(1) |
|    if( sps_ibc_enabled_flag ) | |
|      six_minus_max_num_ibc_merge_cand | ue(v) |
|    ~~sps_ciip_enabled_flag~~ | ~~u(1)~~ |
|      ~~if( sps_mmvd_enabled_flag )~~ | |
|         ~~sps_fpel_mmvd_enabled_flag~~ | ~~u(1)~~ |
|      ~~if( MaxNumMergeCand >= 2 ) {~~ | |
|      ~~( sps_gpm_enabled_flag~~ | ~~u(1)~~ |
|      ~~if( sps_gpm_enabled_flag && MaxNumMergeCand >= 3 )~~ | |
|         ~~max_num_merge_cand_minus_max_num_gpm_cand~~ | ~~ue(v)~~ |
|    ~~}~~ | |
|    sps_lmcs_enabled_flag | u(1) |
|    sps_lfnst_enabled_flag | u(1) |
|    sps_ladf_enabled_flag | u(1) |

TABLE 20-continued

Proposed sequence parameter set RBSP syntax

| seq_parameter_set_rbsp( ) { | Descriptor |
|---|---|
|   if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   ~~log2_parallel_merge_level_minus2~~ | ~~ue(v)~~ |
|   sps_explicit_scaling_list_enabled_flag | u(1) |
|   sps_dep_quant_enabled_flag | u(1) |
|   if( !sps_dep_quant_enabled_flag ) | |
|     sps_sign_data_hiding_enabled_flag | u(1) |
|   sps_virtual_boundaries_enabled_flag | u(1) |
|   if( sps_virtual_boundaries_enabled_flag ) { | |
|     sps_virtual_boundaries_present_flag | u(1) |
|     if( sps_virtual_boundaries_present_flag ) { | |
|       sps_num_ver_virtual_boundaries | u(2) |
|       for( i = 0; i < sps_num_ver_virtual_boundaries; i++ ) | |
|         sps_virtual_boundaries_pos_x[ i ] | u(13) |
|       sps_num_hor_virtual_boundaries | u(2) |
|       for( i = 0; i < sps_num_hor_virtual_boundaries; i++ ) | |
|         sps_virtual_boundaries_pos_y[ i ] | u(13) |
|     } | |
|   } | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u(1) |
|       firstSubLayer = sps_sublayer_cpb_params_present_flag ? 0 : | |
|         sps_max_sublayers_minus1 | |
|       ols_hrd_parameters( firstSubLayer, sps_max_sublayers_minus1 ) | |
|     } | |
|   } | |
|   field_seq_flag | u(1) |
|   vui_parameters_present_flag | u(1) |
|   if( vui_parameters_present_flag) | |
|     vui_parameters( ) /* Specified in ITU-T H.SEI \| ISO/IEC 23002-7 */ | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

Figure 6:
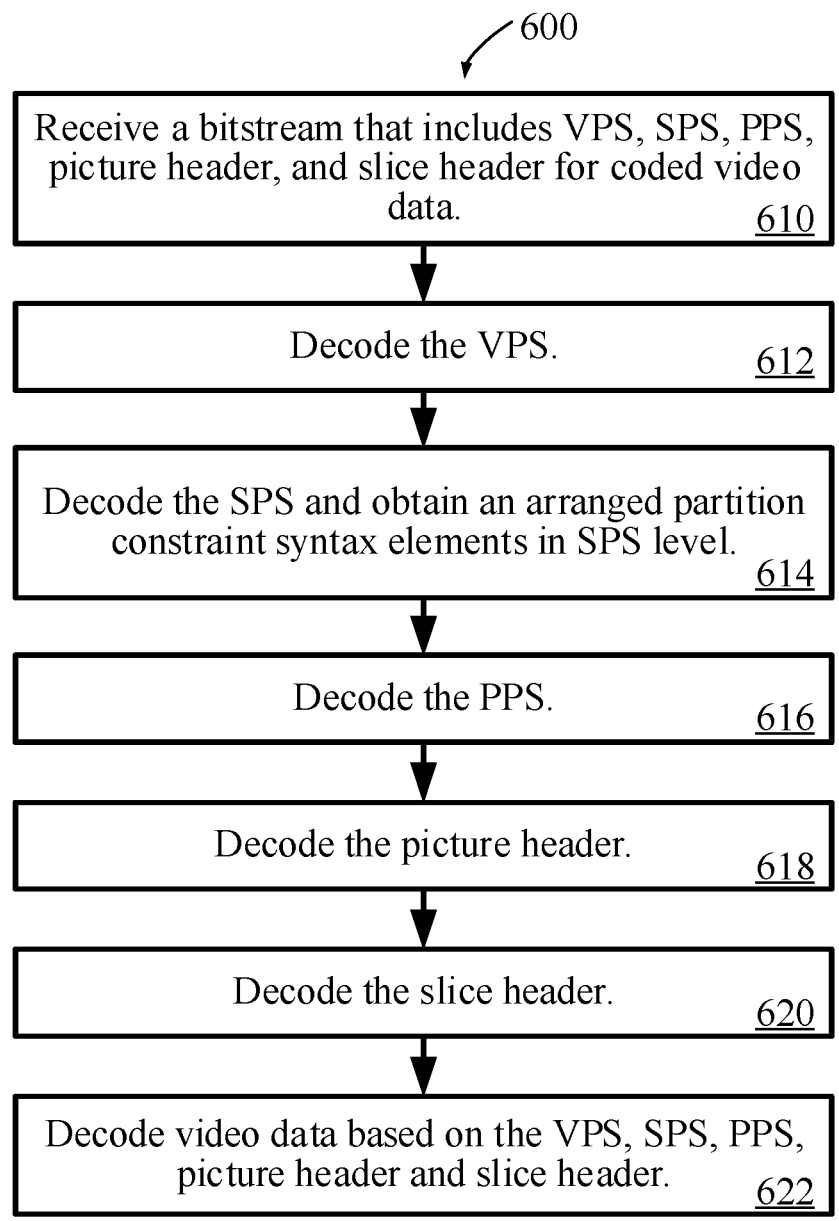
FIG. 6 is a method for decoding a video signal, according to an example of the present disclosure.

FIG. 6 shows a method for decoding a video signal in accordance with the present disclosure. The method may be, for example, applied to a decoder.

In step 610, the decoder may receive a bitstream that includes VPS, SPS, PPS, picture header, and slice header for coded video data.

In step 612, the decoder may decode the VPS.

In step 614, the decoder may decode the SPS and obtain an arranged partition constraint syntax elements in SPS level.

In step 616, the decoder may decode the PPS.

In step 618, the decoder may decode the picture header.

In step 620, the decoder may decode the slice header.

In step 622, the decoder may decode the video data based on VPS, SPS, PPS, picture header and slice header.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

FIG. 7 shows a computing environment 710 coupled with a user interface 760. The computing environment 710 can be part of a data processing server. The computing environment 710 includes processor 720, memory 740, and I/O interface 750.

The processor 720 typically controls overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, a GPU, or the like.

The memory 740 is configured to store various types of data to support the operation of the computing environment 710. Memory 740 may include predetermine software 742. Examples of such data include instructions for any applications or methods operated on the computing environment 710, video datasets, image data, etc. The memory 740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 750 provides an interface between the processor 720 and peripheral interface modules, such as a keyboard, a click wheel, buttons, and the like. The buttons may include but are not limited to, a home button, a start scan button, and a stop scan button. The I/O interface 750 can be coupled with an encoder and decoder.

In some embodiments, there is also provided a non-transitory computer-readable storage medium comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for decoding a video signal, comprising:
receiving, by a decoder, inter prediction related syntax elements in sequence parameter set (SPS) level, wherein the inter prediction related syntax elements are sequentially arranged at a coding level, and wherein the inter prediction related syntax elements are arranged by: signaling an sps weighted pred flag flag; signaling an sps weighted bipred flag flag; signaling an sps mmvd enabled flag flag; setting a six minus max num merge cand value; and setting a log 2 parallel merge level minus2 value;
obtaining, by the decoder, a first reference picture and a second reference picture associated with a video block in a bitstream, wherein the first reference picture is before a current picture and the second reference picture is after the current picture in a display order;
obtaining, by the decoder, first prediction samples of the video block from the first reference picture;
obtaining, by the decoder, second prediction samples of the video block from the second reference picture; and
obtaining, by the decoder, bi-prediction samples based on at least one of the inter prediction related syntax elements, the first prediction samples, and the second prediction samples.

2. The method of claim 1, further comprising:
receiving an sps_isp_enabled_flag flag after the log 2_parallel_merge_level_minus2.

3. The method of claim 1, further comprising:
receiving an sps_wpp_entry_point_offsets_present_flag flag and log 2_max_pic_order_cnt_lsb_minus4 in succession.

4. The method of claim 3, wherein receiving the inter prediction related syntax elements comprises:
receiving the sps_weighted_pred_flag flag after the log 2_max_pic_order_cnt_lsb_minus4.

5. A computing device, comprising:
one or more processors; and
a non-transitory computer-readable storage medium storing instructions executable by the one or more processors, wherein the one or more processors are configured to:
receive inter prediction related syntax elements in sequence parameter set (SPS) level, wherein the inter prediction related syntax elements are sequentially arranged at a coding level, and wherein the inter prediction related syntax elements are arranged by: signaling an sps weighted pred flag flag; signaling an sps weighted bipred flag flag; signaling an sps mmvd enabled flag flag; setting a six minus max num merge cand value; and setting a log 2 parallel merge level minus2 value;
obtain a first reference picture and a second reference picture associated with a video block in a bitstream, wherein the first reference picture is before a current picture and the second reference picture is after the current picture in a display order;
obtain first prediction samples of the video block from the first reference picture;
obtain second prediction samples of the video block from the second reference picture; and
obtain bi-prediction samples based on at least one of the inter prediction related syntax elements, the first prediction samples, and the second prediction samples.

6. The computing device of claim 5, further comprising:
receiving an sps_isp_enabled_flag flag after the log 2_parallel_merge_level_minus2.

7. The computing device of claim 5, further comprising:
receiving an sps_wpp_entry_point_offsets_present_flag flag and log 2_max_pic_order_cnt_lsb_minus4 in succession.

8. The computing device of claim 7, wherein receiving the inter prediction related syntax elements comprises:
receiving the sps_weighted_pred_flag flag after the log 2_max_pic_order_cnt_lsb_minus4.

9. A non-transitory computer-readable storage medium storing a bitstream to be decoded by acts comprising:
receiving, by a decoder, inter prediction related syntax elements in sequence parameter set (SPS) level, wherein the inter prediction related syntax elements are sequentially arranged at a coding level, and wherein the inter prediction related syntax elements are arranged by: signaling an sps weighted pred flag flag; signaling an sps weighted bipred flag flag; signaling an sps mmvd enabled flag flag; setting a six minus max num merge cand value; and setting a log 2 parallel merge level minus2 value;

obtaining, by the decoder, a first reference picture and a second reference picture associated with a video block in a bitstream, wherein the first reference picture is before a current picture and the second reference picture is after the current picture in a display order;

obtaining, by the decoder, first prediction samples of the video block from the first reference picture;

obtaining, by the decoder, second prediction samples of the video block from the second reference picture; and obtaining, by the decoder, bi-prediction samples based on at least one of the inter prediction related syntax elements, the first prediction samples, and the second prediction samples.

10. The non-transitory computer-readable storage medium of claim 9, wherein the acts further comprise:
receiving an sps_isp_enabled_flag flag after the log 2_parallel_merge_level_minus2.

11. The non-transitory computer-readable storage medium of claim 9, wherein the acts further comprise:
receiving an sps_wpp_entry_point_offsets_present_flag flag and log 2_max_pic_order_cnt_lsb_minus4 in succession.

12. The non-transitory computer-readable storage medium of claim 11, wherein the acts further comprise:
receiving the sps_weighted_pred_flag flag after the log 2_max_pic_order_cnt_lsb_minus4.

* * * * *